(12) United States Patent
Campello De Souza et al.

(10) Patent No.: US 10,812,341 B1
(45) Date of Patent: Oct. 20, 2020

(54) SCALABLE RECURSIVE COMPUTATION ACROSS DISTRIBUTED DATA PROCESSING NODES

(71) Applicant: EMC IP Holding Company LLC, Hopkinton, MA (US)

(72) Inventors: Fernanda M. Campello De Souza, Edmonton (CA); Patricia Gomes Soares Florissi, Briarcliff Manor, NY (US); Omar Mahmoud, Cairo (EG); Ahmed Nader, Cairo (EG); Ahmed Osama, Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/900,218

(22) Filed: Feb. 20, 2018

Related U.S. Application Data

(63) Continuation-in-part of application No. 15/827,903, filed on Nov. 30, 2017, which is a
(Continued)

(51) Int. Cl.
*G06F 15/173* (2006.01)
*H04L 12/24* (2006.01)
(Continued)

(52) U.S. Cl.
CPC .......... *H04L 41/22* (2013.01); *G06F 21/6245* (2013.01); *H04L 67/10* (2013.01); *G06F 3/04847* (2013.01)

(58) Field of Classification Search
CPC ..... H04L 41/22; H04L 67/10; G06F 21/6245; G06F 3/04847
(Continued)

(56) References Cited

U.S. PATENT DOCUMENTS

| 6,112,225 A | 8/2000 | Kraft et al. |
| 6,516,350 B1 | 2/2003 | Lumelsky et al. |

(Continued)

OTHER PUBLICATIONS

U.S. Appl. No. 15/827,663 filed in the name of Patricia Gomes Soares Florissi et al. on Nov. 30, 2017 and entitled "Global Benchmarking and Statistical Analysis at Scale."

(Continued)

*Primary Examiner* — Thuong Nguyen
(74) *Attorney, Agent, or Firm* — Ryan, Mason & Lewis, LLP

(57) ABSTRACT

An apparatus in one embodiment comprises at least one processing device having a processor coupled to a memory. The processing device is configured to receive results of intermediate percentile computations performed on respective ones of a plurality of datasets in respective ones of a plurality of distributed processing nodes configured to communicate over at least one network. The processing device is further configured to perform at least one global percentile computation based at least in part on the results of the intermediate percentile computations, and to utilize results of the intermediate and global percentile computations to populate an interactive user interface associated with at least a given one of the distributed processing nodes. The distributed processing nodes are illustratively associated with respective distinct data zones in which the respective datasets are locally accessible to the respective distributed processing nodes. At least a subset of the receiving, performing and utilizing may be repeated in each of a plurality of iterations.

20 Claims, 26 Drawing Sheets

Related U.S. Application Data continuation-in-part of application No. 14/982,351, filed on Dec. 29, 2015.

(60) Provisional application No. 62/143,404, filed on Apr. 6, 2015, provisional application No. 62/143,685, filed on Apr. 6, 2015.

(51) Int. Cl.
  *G06F 21/62* (2013.01)
  *H04L 29/08* (2006.01)
  *G06F 3/0484* (2013.01)

(58) Field of Classification Search
  USPC .......... 709/224, 206; 455/556.2, 566, 575.8, 455/458; 370/260
  See application file for complete search history.

(56) References Cited

U.S. PATENT DOCUMENTS

| | | | |
|---|---|---|---|
| 7,010,163 B1* | 3/2006 | Weiss | G06T 5/20 382/168 |
| 7,657,537 B1 | 2/2010 | Corbett | |
| 7,934,018 B1 | 4/2011 | Lavallee et al. | |
| 7,934,248 B1 | 4/2011 | Yehuda et al. | |
| 8,224,825 B2 | 7/2012 | Wang et al. | |
| 8,499,331 B1 | 7/2013 | Yehuda et al. | |
| 8,732,118 B1 | 5/2014 | Cole et al. | |
| 8,806,061 B1 | 8/2014 | Lobo et al. | |
| 8,938,416 B1 | 1/2015 | Cole et al. | |
| 9,020,802 B1 | 4/2015 | Florissi et al. | |
| 9,031,992 B1 | 5/2015 | Florissi et al. | |
| 9,130,832 B1 | 9/2015 | Boe et al. | |
| 9,158,843 B1 | 10/2015 | Florissi et al. | |
| 9,229,952 B1 | 1/2016 | Meacham et al. | |
| 9,235,446 B2 | 1/2016 | Bruno et al. | |
| 9,239,711 B1 | 1/2016 | Mistry | |
| 9,280,381 B1 | 3/2016 | Florissi et al. | |
| 9,298,613 B2* | 3/2016 | Kim | G06F 12/0292 |
| 9,338,218 B1 | 5/2016 | Florissi et al. | |
| 9,361,263 B1 | 6/2016 | Florissi et al. | |
| 9,418,085 B1 | 8/2016 | Shih et al. | |
| 9,489,233 B1 | 11/2016 | Florissi et al. | |
| 9,678,497 B2 | 6/2017 | Karypis et al. | |
| 9,697,262 B2 | 7/2017 | Chandramouli et al. | |
| 9,747,127 B1 | 8/2017 | Florissi et al. | |
| 9,747,128 B1 | 8/2017 | Vijendra et al. | |
| 9,767,149 B2 | 9/2017 | Ozcan et al. | |
| 9,832,068 B2 | 11/2017 | McSherry et al. | |
| 9,838,410 B2 | 12/2017 | Muddu et al. | |
| 9,848,041 B2 | 12/2017 | Einkauf et al. | |
| 9,996,662 B1 | 6/2018 | Florissi et al. | |
| 10,015,106 B1 | 7/2018 | Florissi et al. | |
| 10,111,492 B2 | 10/2018 | Florissi et al. | |
| 10,114,923 B1 | 10/2018 | Florissi et al. | |
| 10,122,806 B1 | 11/2018 | Florissi et al. | |
| 10,127,352 B1 | 11/2018 | Florissi et al. | |
| 10,270,707 B1 | 4/2019 | Florissi et al. | |
| 10,277,668 B1 | 4/2019 | Florissi | |
| 10,311,363 B1 | 6/2019 | Florissi et al. | |
| 10,331,380 B1 | 6/2019 | Florissi et al. | |
| 10,348,810 B1 | 7/2019 | Florissi et al. | |
| 2002/0073167 A1 | 6/2002 | Powell et al. | |
| 2003/0212741 A1 | 11/2003 | Glasco | |
| 2004/0247198 A1 | 12/2004 | Ghosh et al. | |
| 2005/0010712 A1 | 1/2005 | Kim et al. | |
| 2005/0102354 A1 | 5/2005 | Hollenbeck et al. | |
| 2005/0114476 A1 | 5/2005 | Chen et al. | |
| 2005/0132297 A1 | 6/2005 | Milic-Frayling et al. | |
| 2005/0153686 A1 | 7/2005 | Kall et al. | |
| 2005/0165925 A1 | 7/2005 | Dan et al. | |
| 2005/0266420 A1* | 12/2005 | Pusztai | C12Q 1/6883 435/6.16 |
| 2006/0002383 A1 | 1/2006 | Jeong et al. | |
| 2006/0122927 A1 | 6/2006 | Huberman et al. | |
| 2006/0126865 A1* | 6/2006 | Blamey | H03G 3/32 381/102 |
| 2006/0173628 A1* | 8/2006 | Sampas | G06K 9/32 702/19 |
| 2007/0026426 A1 | 2/2007 | Fuernkranz et al. | |
| 2007/0076703 A1 | 4/2007 | Yoneda et al. | |
| 2007/0088703 A1 | 4/2007 | Kasiolas et al. | |
| 2008/0027954 A1 | 1/2008 | Gan et al. | |
| 2008/0028086 A1 | 1/2008 | Chetuparambil et al. | |
| 2008/0077607 A1 | 3/2008 | Gatawood et al. | |
| 2008/0155100 A1 | 6/2008 | Ahmed et al. | |
| 2008/0279167 A1 | 11/2008 | Cardei et al. | |
| 2009/0062623 A1 | 3/2009 | Cohen et al. | |
| 2009/0076651 A1 | 3/2009 | Rao | |
| 2009/0150084 A1 | 6/2009 | Colwell et al. | |
| 2009/0198389 A1* | 8/2009 | Kirchhof-Falter | G06F 9/485 701/1 |
| 2009/0310485 A1 | 12/2009 | Averi et al. | |
| 2009/0319188 A1 | 12/2009 | Otto | |
| 2010/0042809 A1 | 2/2010 | Schenfeld et al. | |
| 2010/0076856 A1 | 3/2010 | Mullins | |
| 2010/0122065 A1 | 5/2010 | Dean et al. | |
| 2010/0131639 A1 | 5/2010 | Narayana et al. | |
| 2010/0018409 A1 | 7/2010 | Donovan et al. | |
| 2010/0184093 A1 | 7/2010 | Donovan et al. | |
| 2010/0229178 A1 | 9/2010 | Ito | |
| 2010/0250646 A1 | 9/2010 | Dunagan et al. | |
| 2010/0290468 A1 | 11/2010 | Lynam et al. | |
| 2010/0293334 A1* | 11/2010 | Xun | G06F 16/9014 711/129 |
| 2010/0299437 A1 | 11/2010 | Moore | |
| 2011/0020785 A1 | 1/2011 | Lowery, Jr. et al. | |
| 2011/0029999 A1 | 2/2011 | Foti | |
| 2011/0103364 A1 | 5/2011 | Li | |
| 2011/0145828 A1* | 6/2011 | Takahashi | H04L 67/1029 718/102 |
| 2011/0314002 A1 | 12/2011 | Oliver et al. | |
| 2012/0030599 A1 | 2/2012 | Butt et al. | |
| 2012/0071774 A1* | 3/2012 | Osorio | A61B 5/02405 600/512 |
| 2013/0035956 A1 | 2/2013 | Carmeli et al. | |
| 2013/0044925 A1 | 2/2013 | Kozuka et al. | |
| 2013/0054670 A1 | 2/2013 | Keyes et al. | |
| 2013/0194928 A1 | 8/2013 | Iqbal | |
| 2013/0246460 A1 | 9/2013 | Maltbie et al. | |
| 2013/0282897 A1 | 10/2013 | Siegel et al. | |
| 2013/0290249 A1* | 10/2013 | Merriman | G06F 16/273 707/610 |
| 2013/0291118 A1 | 10/2013 | Li et al. | |
| 2013/0318257 A1 | 11/2013 | Lee et al. | |
| 2013/0346229 A1 | 12/2013 | Martin et al. | |
| 2013/0346988 A1 | 12/2013 | Bruno et al. | |
| 2014/0012843 A1 | 1/2014 | Soon-Shiong | |
| 2014/0025393 A1 | 1/2014 | Wang et al. | |
| 2014/0075161 A1 | 3/2014 | Zhang et al. | |
| 2014/0081984 A1 | 3/2014 | Sitsky et al. | |
| 2014/0082178 A1 | 3/2014 | Boldyrev et al. | |
| 2014/0173331 A1 | 6/2014 | Martin et al. | |
| 2014/0173618 A1 | 6/2014 | Neuman et al. | |
| 2014/0188596 A1* | 7/2014 | Nangle, III | G06Q 30/0246 705/14.45 |
| 2014/0280298 A1 | 9/2014 | Petride et al. | |
| 2014/0280363 A1 | 9/2014 | Heng et al. | |
| 2014/0280604 A1 | 9/2014 | Ahiska et al. | |
| 2014/0280695 A1* | 9/2014 | Sharma | H04N 21/242 709/217 |
| 2014/0280880 A1* | 9/2014 | Tellis | H04L 41/5009 709/224 |
| 2014/0280990 A1 | 9/2014 | Dove et al. | |
| 2014/0310258 A1 | 10/2014 | Tian | |
| 2014/0310718 A1 | 10/2014 | Gerphagnon et al. | |
| 2014/0320497 A1 | 10/2014 | Vojnovic et al. | |
| 2014/0325041 A1 | 10/2014 | Xu et al. | |
| 2014/0358999 A1 | 12/2014 | Rabinowitz et al. | |
| 2014/0365518 A1 | 12/2014 | Calo et al. | |
| 2014/0372611 A1 | 12/2014 | Matsuda et al. | |
| 2014/0379722 A1 | 12/2014 | Mysur et al. | |

(56) References Cited

U.S. PATENT DOCUMENTS

| | | |
|---|---|---|
| 2015/0006619 A1 | 1/2015 | Banadaki et al. |
| 2015/0019710 A1 | 1/2015 | Shaashua et al. |
| 2015/0039586 A1 | 2/2015 | Kerschbaum et al. |
| 2015/0039667 A1 | 2/2015 | Shah et al. |
| 2015/0066646 A1 | 3/2015 | Sriharsha et al. |
| 2015/0081877 A1 | 3/2015 | Sethi et al. |
| 2015/0088786 A1 | 3/2015 | Anandhakrishnan |
| 2015/0120791 A1 | 4/2015 | Gummaraju et al. |
| 2015/0121371 A1* | 4/2015 | Gummaraju .......... G06F 9/45533 718/1 |
| 2015/0169683 A1 | 6/2015 | Chandramouli et al. |
| 2015/0170616 A1* | 6/2015 | Corpet .................. G01C 21/32 345/629 |
| 2015/0178052 A1 | 6/2015 | Gupta et al. |
| 2015/0254344 A1 | 9/2015 | Kulkarni et al. |
| 2015/0254558 A1 | 9/2015 | Arnold et al. |
| 2015/0262268 A1* | 9/2015 | Padmanabhan ........ G06Q 30/04 705/34 |
| 2015/0269230 A1 | 9/2015 | Kardes et al. |
| 2015/0277791 A1 | 10/2015 | Li et al. |
| 2015/0278513 A1 | 10/2015 | Krasin et al. |
| 2015/0295781 A1 | 10/2015 | Maes |
| 2015/0302075 A1 | 10/2015 | Schechter et al. |
| 2015/0339210 A1 | 11/2015 | Kopp et al. |
| 2015/0355946 A1 | 12/2015 | Kang |
| 2015/0369618 A1 | 12/2015 | Barnard et al. |
| 2016/0004827 A1 | 1/2016 | Silva et al. |
| 2016/0006628 A1* | 1/2016 | Herring .............. H04L 41/0618 709/224 |
| 2016/0063191 A1 | 3/2016 | Vesto et al. |
| 2016/0072726 A1 | 3/2016 | Soni et al. |
| 2016/0087909 A1 | 3/2016 | Chatterjee et al. |
| 2016/0098021 A1 | 4/2016 | Zornio et al. |
| 2016/0098472 A1 | 4/2016 | Appleton |
| 2016/0098662 A1 | 4/2016 | Voss et al. |
| 2016/0112531 A1 | 4/2016 | Milton et al. |
| 2016/0132576 A1 | 5/2016 | Qi et al. |
| 2016/0170882 A1 | 6/2016 | Choi et al. |
| 2016/0179642 A1 | 6/2016 | Cai |
| 2016/0179979 A1 | 6/2016 | Aasman et al. |
| 2016/0182305 A1 | 6/2016 | Martin et al. |
| 2016/0182327 A1 | 6/2016 | Coleman, Jr. et al. |
| 2016/0188594 A1 | 6/2016 | Ranganathan |
| 2016/0196324 A1 | 7/2016 | Haviv et al. |
| 2016/0205106 A1 | 7/2016 | Yacoub et al. |
| 2016/0241893 A1 | 8/2016 | Allhands et al. |
| 2016/0246981 A1 | 8/2016 | Nakagawa et al. |
| 2016/0260023 A1 | 9/2016 | Miserendino, Jr. et al. |
| 2016/0261727 A1 | 9/2016 | Yang et al. |
| 2016/0267132 A1 | 9/2016 | Castellanos et al. |
| 2016/0269228 A1 | 9/2016 | Franke et al. |
| 2016/0323377 A1 | 11/2016 | Einkauf et al. |
| 2016/0328661 A1 | 11/2016 | Reese et al. |
| 2016/0337473 A1 | 11/2016 | Rao |
| 2016/0350157 A1 | 12/2016 | Necas |
| 2017/0006135 A1 | 1/2017 | Siebel et al. |
| 2017/0032263 A1 | 2/2017 | Yuan et al. |
| 2017/0083573 A1 | 3/2017 | Rogers et al. |
| 2017/0109299 A1 | 4/2017 | Belair et al. |
| 2017/0116289 A1 | 4/2017 | Deshmukh et al. |
| 2017/0187785 A1 | 6/2017 | Johnson et al. |
| 2017/0220646 A1 | 8/2017 | Schechter et al. |
| 2017/0272458 A1 | 9/2017 | Muddu et al. |
| 2017/0323028 A1 | 11/2017 | Jonker et al. |
| 2018/0054355 A1 | 2/2018 | Balser et al. |
| 2018/0101583 A1 | 4/2018 | Li et al. |
| 2018/0189296 A1 | 7/2018 | Ashour et al. |
| 2018/0308585 A1 | 10/2018 | Holmes et al. |

OTHER PUBLICATIONS

Dell, "Dell Boomi Platform: Connect Every Part of Your Business to Transform How You do Business," https://marketing.boomi.com/rs/777-AVU-348/images/Boomi-Integration-Cloud.pdf, 2017, 4 pages.

X. Wu et al., "Privacy Preserving Data Mining Research: Current Status and Key Issues," Proceedings of the 7th International Conference on Computational Science, Part III: ICCS 2007, May 2007, pp. 762-772.

A.F. Kulkarni et al., "Survey on Hadoop and Introduction to YARN," International Journal of Emerging Technology and Advanced Engineering, May 2014, pp. 82-87, vol. 4, No. 5.

V.K. Vavilapalli et al., "Apache Hadoop YARN: Yet Another Resource Negotiator," Proceedings of the 4th Annual Symposium on Cloud Computing (SOCC), Article No. 5, Oct. 2013, 16 pages.

A.C. Murthy et al., "Apache Hadoop YARN: Moving beyond MapReduce and Batch Processing with Apache Hadoop 2," Addison-Wesley Professional, Mar. 29, 2014, 78 pages.

Global Alliance for Genomics and Health, "Beacons," https://genomicsandhealth.org/work-products-demonstration-projects/beacons, Jun. 27, 2014, 2 pages.

Data Working Group, "Global Alliance Genomics API," http://ga4gh.org/#documentation, Dec. 28, 2015, 2 pages.

Aaron Krol, "Beacon Project Cracks the Door for Genomic Data Sharing," http://www.bio-itworld.com/2015/8/14/beacon-project-cracks-door-genomic-data-sharing.html, Aug. 14, 2015, 3 pages.

U.S. Appl. No. 14/982,341 filed in the name of Patricia Gomes Soares Florissi et al., on Dec. 29, 2015 and entitled "Multi-Cluster Distributed Data Processing Platform."

U.S. Appl. No. 14/982,351 filed in the name of Patricia Gomes Soares Florissi et al., on Dec. 29, 2015 and entitled "Distributed Catalog Service for Multi-Cluster Data Processing Platform."

U.S. Appl. No. 15/395,340 filed in the name of Bryan Duerk et al., on Dec. 30, 2016 and entitled "Data-Driven Automation Mechanism for Analytics Workload Distribution."

Wikipedia, "Apache Spark," https://en.wikipedia.org/wiki/Apache_Spark, Apr. 10, 2017, 6 pages.

U.S. Appl. No. 15/485,843 filed in the name of Patricia Gomes Soares Florissi et al., on Apr. 12, 2017 and entitled "Scalable Distributed In-Memory Computation."

U.S. Appl. No. 15/582,743 filed in the name of Patricia Gomes Soares Florissi et al., on Apr. 30, 2017 and entitled "Scalable Distributed In-Memory Computation Utilizing Batch Mode Extensions."

M.K. Gardner et al., "Parellel Genomic Sequence-Searching on an Ad-Hoc Grid: Experiences, Lessons Learned, and Implications," Proceedings of the 2006 ACM/IEEE SC/06 Conference, IEEE Computer Society, 2006, 14 pages.

A.G. Craig et al., "Ordering of Cosmid Clones Covering the Herpes Simplex Virus Type I (HSV-I) Genome: A Test Case for Fingerprinting by Hybridisation," Nucleic Acids Research, vol. 18, 1990, pp. 2653-2660.

T.R. Golub et al., "Molecular classification of Cancer: Class Discovery and Class Prediction by Gene Expression Monitoring," Science, vol. 286, Oct. 15, 1999, pp. 531-537.

D. Singh et al., "Gene Expression Correlates of Clinical Prostate Cancer Behavior," Cancer Cell, vol. 1, Mar. 2002, pp. 203-209.

U.S. Appl. No. 15/281,248 filed in the name of Patricia Gomes Soares Florissi et al., on Sep. 30, 2016 and entitled "Methods and Apparatus Implementing Data Model for Disease Monitoring, Characterization and Investigation."

P.P. Jayaraman et al., "Analytics-as-a-Service in a Multi-Cloud Environment Through Semantically-Enabled Hierarchical Data Processing," Software: Practice and Experience, Aug. 2017, pp. 1139-1156, vol. 47, No. 8.

J.Y.L. Lee et al., "Sufficiency Revisited: Rethinking Statistical Algorithms in the Big Data Era," The American Statistician, Dec. 15, 2016, 22 pages.

S. Wang et al., "Genome Privacy: Challenges, Technical Approaches to Mitigate Risk, and Ethical Considerations in the United States," Annals of the New York Academy of Sciences, Jan. 2017, pp. 73-83, vol. 1387, No. 1.

K. Xu et al., "Privacy-Preserving Machine Learning Algorithms for Big Data Systems," IEEE 35th International Conference on Distributed Computing Systems (ICDCS), Jun. 29-Jul. 2, 2015, pp. 318-327.

R.R. Miller et al., "Metagenomics for Pathogen Detection in Public Health," Genome Medicine, Sep. 20, 2013, 14 pages, vol. 5, No. 81.

(56) References Cited

OTHER PUBLICATIONS

T. Thomas et al., "Metagenomics—A Guide from Sampling to Data Analysis," Microbial Informatics and Experimentation, Oct. 13, 2012, 12 pages, vol. 2, No. 3.

E.R. Ganser et al., "A Technique for Drawing Directed Graphs," IEEE Transactions on Software Engineering, Mar. 1993, pp. 214-230, vol. 19, No. 3.

J. Leskovec, "Graphs Over Time: Densification Laws, Shrinking Diameters and Possible Explanations," Proceedings of the Eleventh ACM SIGKDD International Conference on Knowledge Discovery in Data Mining, Aug. 21-24, 2005, pp. 177-187.

H. Zha et al., "Bipartite Graph Partitioning and Data Clustering," Proceedings of the Tenth International Conference on Information and Knowledge Management, Oct. 5-10, 2001, pp. 25-32.

A. Oghabian et al., "Biclustering Methods: Biological Relevance and Application in Gene Expression Analysis," Plos One, Mar. 20, 2014, 10 pages, vol, 9, No. 3.

S. Ryza, "How to: Tune Your Apache Spark Jobs," https://blog.cloudera.com/blog/2015/03/how-to-tune-your-apache-spark-jobs-part-1/, Mar. 9, 2015, 23 pages.

T. White, "Hadoop: The Definitive Guide." O'Reilly Media, Inc., Fourth Edition, Sebastopol, CA, Apr. 2015, 756 pages.

L. Shashank, "Spark on Yarn," https://www.slideshare.net/datamantra/spark-on-yarn-54201193, Oct. 21, 2015, 47 pages.

\* cited by examiner

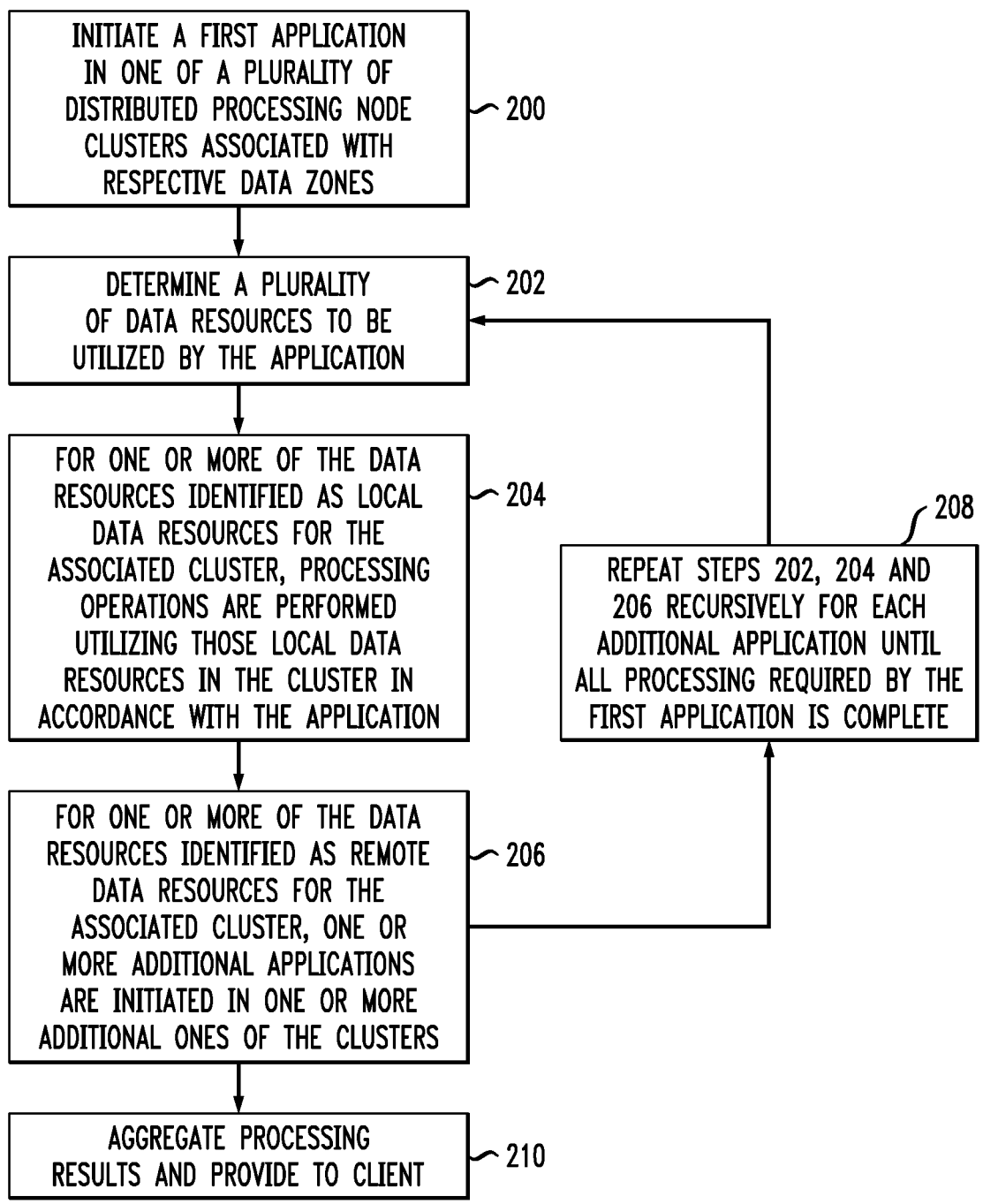

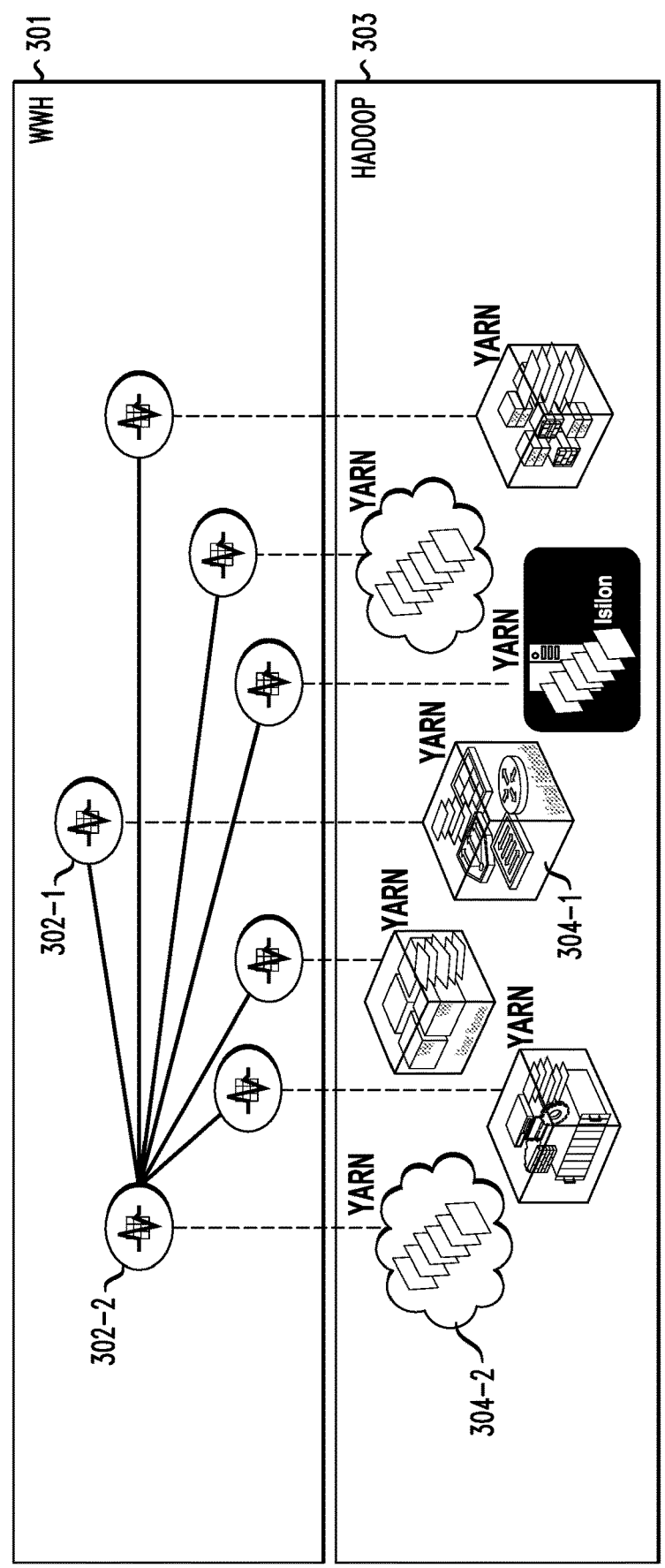

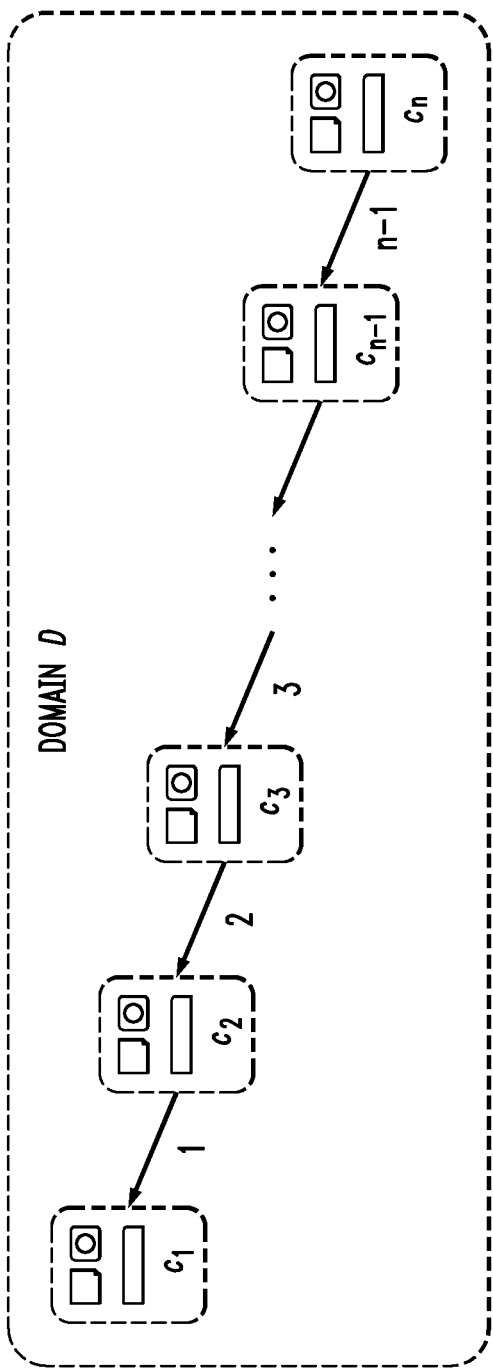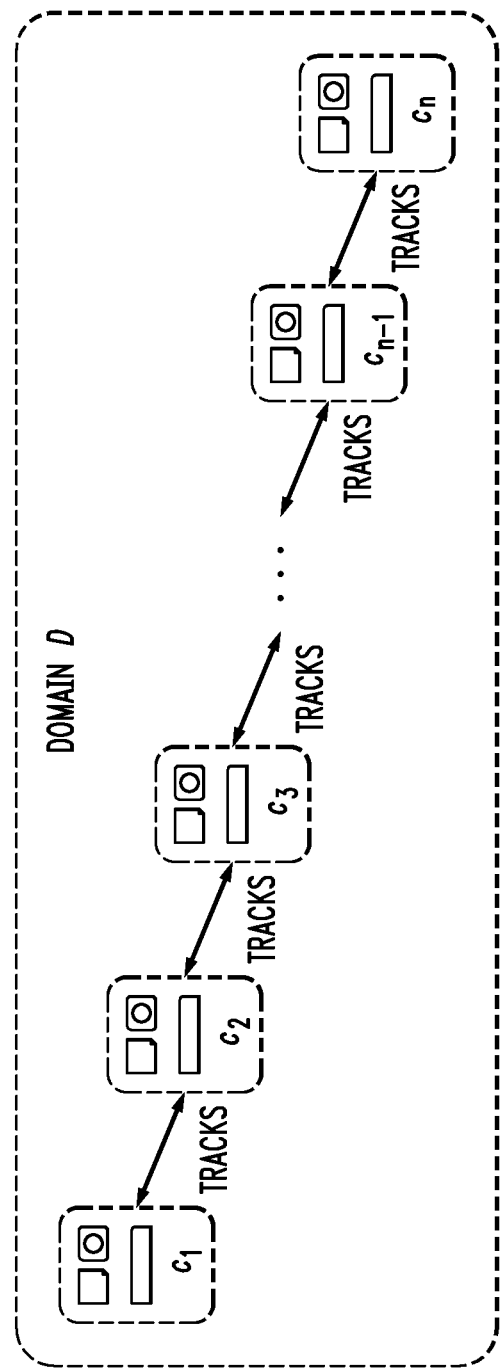
FIG. 29
FIG. 30

FIG. 34

| | DATASET $d_1$ | | | | | DATASET $d_2$ | | | | | DATASET $d_N$ | | | |
|---|---|---|---|---|---|---|---|---|---|---|---|---|---|---|
| VARIABLE | $x_{1,1}$ | $x_{2,1}$ | ... | $x_{L,1}$ | | $x_{1,2}$ | $x_{2,2}$ | ... | $x_{L,2}$ | | $x_{1,N}$ | $x_{2,N}$ | ... | $x_{L,N}$ |
| OBSERVATION 1 | $x^1_{1,1}$ | $x^1_{2,1}$ | ... | $x^1_{L,1}$ | | $x^1_{1,2}$ | $x^1_{2,2}$ | ... | $x^1_{L,2}$ | | $x^1_{1,N}$ | $x^1_{2,N}$ | ... | $x^1_{L,N}$ |
| OBSERVATION 2 | $x^2_{1,1}$ | $x^2_{2,1}$ | ... | $x^2_{L,1}$ | | $x^2_{1,2}$ | $x^2_{2,2}$ | ... | $x^2_{L,2}$ | | $x^2_{1,N}$ | $x^2_{2,N}$ | ... | $x^2_{L,N}$ |
| ... | ... | ... | ... | ... | | ... | ... | ... | ... | | ... | ... | ... | ... |
| OBSERVATION $n_i$ | $x^{n_1}_{1,1}$ | $x^{n_1}_{2,1}$ | ... | $x^{n_1}_{L,1}$ | | $x^{n_2}_{1,1}$ | $x^{n_2}_{2,2}$ | ... | $x^{n_2}_{L,2}$ | | $x^{n_N}_{1,N}$ | $x^{n_N}_{2,N}$ | ... | $x^{n_N}_{L,N}$ |

SCALABLE RECURSIVE COMPUTATION ACROSS DISTRIBUTED DATA PROCESSING NODES

RELATED APPLICATIONS

The present application is a continuation-in-part of U.S. patent application Ser. No. 15/827,903, filed Nov. 30, 2017 and entitled "Distributed Catalog Service for Data Processing Platform," which is incorporated by reference herein in its entirety, and which is a continuation-in-part of U.S. patent application Ser. No. 14/982,351, filed Dec. 29, 2015 and entitled "Distributed Catalog Service for Multi-Cluster Data Processing Platform," which is incorporated by reference herein in its entirety, and which claims priority to U.S. Provisional Patent Application Ser. No. 62/143,404, entitled "World Wide Hadoop Platform," and U.S. Provisional Patent Application Ser. No. 62/143,685, entitled "Bioinformatics," both filed Apr. 6, 2015, and incorporated by reference herein in their entirety.

FIELD

The field relates generally to information processing systems, and more particularly to information processing systems that implement distributed processing across a plurality of processing nodes.

BACKGROUND

The need to extract knowledge from data collected on a global scale continues to grow. In many cases the data may be dispersed across multiple geographic locations, owned by different entities, and in different formats. Although numerous distributed data processing frameworks exist today, these frameworks have significant drawbacks. For example, data-intensive computing tasks often use data processing frameworks such as MapReduce or Spark. However, these frameworks typically require deployment of a distributed file system shared by all of the processing nodes, and are therefore limited to data that is accessible via the shared distributed file system. Such a shared distributed file system can be difficult to configure and maintain over multiple local sites that are geographically dispersed and possibly also subject to the above-noted differences in ownership and data format. In the absence of a shared distributed file system, conventional arrangements may require that data collected from sources in different geographic locations be copied from their respective local sites to a single centralized site configured to perform data analytics. Such an arrangement is not only slow and inefficient, but it can also raise serious privacy concerns regarding the copied data.

SUMMARY

Illustrative embodiments of the present invention provide information processing systems that are configured to execute distributed applications over multiple distributed processing nodes associated with respective distinct data zones. These and other similar arrangements disclosed herein can be advantageously configured to provide analytics functionality in a decentralized and privacy-preserving manner, so as to overcome the above-noted drawbacks of conventional systems. This is achieved in some embodiments by orchestrating execution of distributed applications across the multiple nodes. The nodes in some embodiments may be part of respective clusters of multiple nodes. Computations associated with data available locally to a given node or set of nodes are performed within that node or nodes. Accordingly, instead of moving data from local sites to a centralized site, computations are performed within the local sites where the needed data is available. Such arrangements can provide significant advantages in terms of both performance and privacy, while also conserving bandwidth and reducing energy consumption. Additional advantages are provided in terms of security, governance, risk and compliance.

Some illustrative embodiments utilize distributed processing nodes to implement scalable recursive computations, such as computations of percentiles. Other types of computations can be performed in a scalable and recursive manner using a distributed data processing platform in other embodiments.

In one illustrative embodiment implementing scalable recursive percentile computation functionality, an apparatus comprises at least one processing device having a processor coupled to a memory. The processing device is configured to receive results of intermediate percentile computations performed on respective ones of a plurality of datasets in respective ones of a plurality of distributed processing nodes configured to communicate over at least one network. The processing device is further configured to perform at least one global percentile computation based at least in part on the results of the intermediate percentile computations, and to utilize results of the intermediate and global percentile computations to populate an interactive user interface associated with at least a given one of the distributed processing nodes.

The intermediate and global percentile computations in some embodiments comprise respective $k^{th}$ percentile computations for which a value of k is selectable by a user via the interactive user interface.

Additionally or alternatively, the intermediate and global percentile computations in some embodiments comprise respective privacy-preserving percentile computations in which corresponding results are expressed as respective ranges of values. One or more ranges for the privacy-preserving percentile computations may be selectable by a user via the interactive user interface.

The distributed processing nodes are associated with respective distinct data zones in which the respective datasets are locally accessible to the respective distributed processing nodes. For example, the distributed processing nodes may be implemented in respective cloud-based data centers each configured to store locally accessible datasets of its corresponding data zone.

At least a subset of the receiving, performing and utilizing operations implemented by the processing device are repeated in each of a plurality of iterations, and a result of the global percentile computation in a first one of the iterations is passed as an input to the intermediate percentile computations in a second one of the iterations. For example, results of local computations performed by respective ones of the distributed processing nodes can be shared with other ones of the distributed processing nodes and utilized to perform a wide variety of other computations over multiple iterations.

These and other illustrative embodiments include, without limitation, methods, apparatus, systems, and processor-readable storage media.

BRIEF DESCRIPTION OF THE DRAWINGS

FIG. 2 is a flow diagram of an exemplary process implemented in the multi-cluster distributed data processing platform of FIG. 1.

FIGS. 3A and 3B show relationships between WWH nodes and associated Hadoop YARN clusters in another illustrative embodiment. These two figures are collectively referred to herein as FIG. 3.

FIG. 29 illustrates sequential catalog registrations in a given domain.

FIG. 30 illustrates an awareness sequence representing linear tracking based on the sequential catalog registrations of FIG. 29.

FIG. 34 shows example variables and observations for each of a plurality of datasets in respective data zones in an illustrative embodiment.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a plurality of data centers each comprising one or more clouds hosting multiple tenants that share cloud resources.

Figure 1:
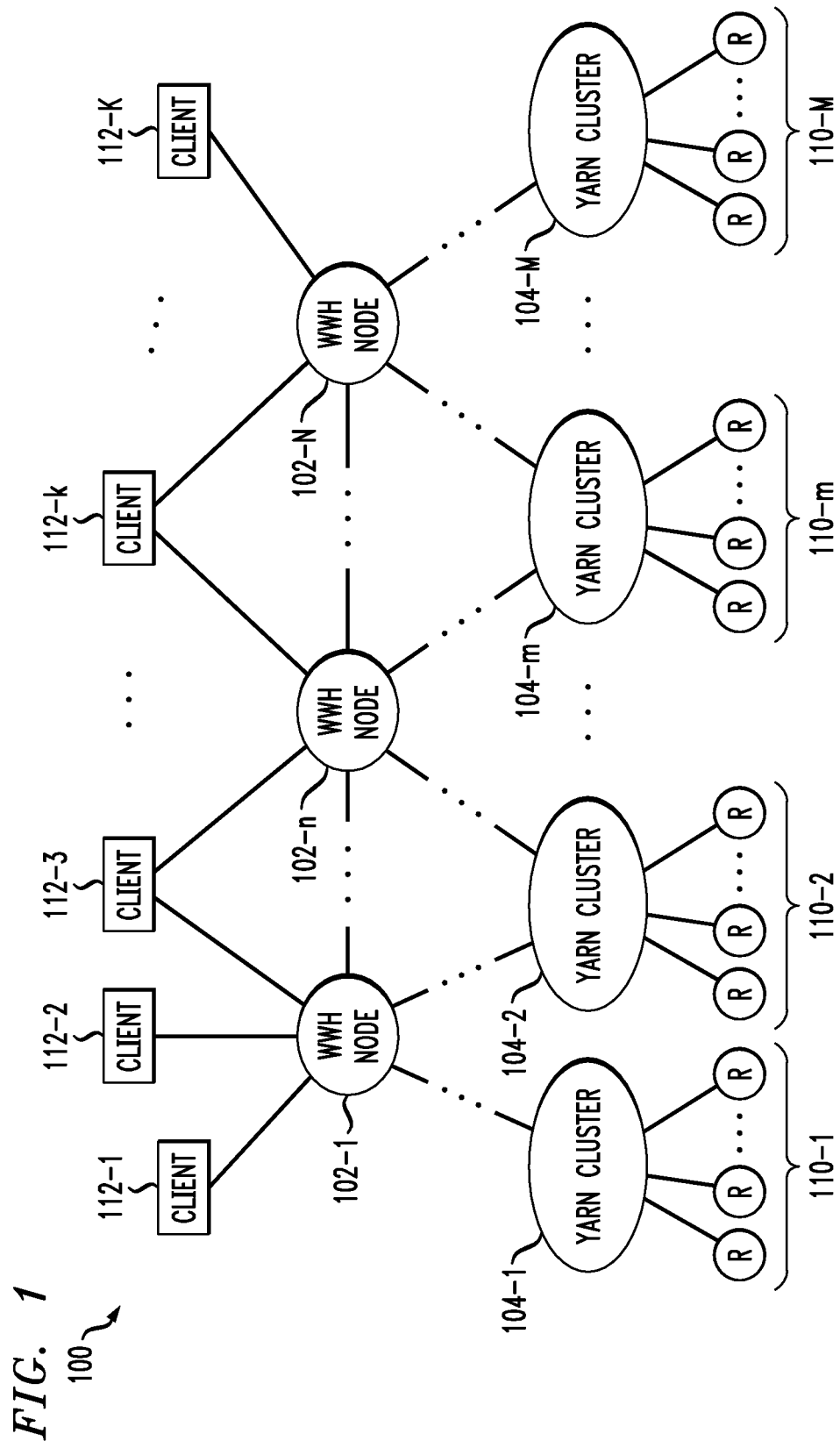
FIG. 1 is a block diagram of an information processing system comprising a multi-cluster distributed data processing platform in an illustrative embodiment of the invention.

FIG. 1 shows an information processing system 100 comprising a multi-cluster distributed data processing platform in an illustrative embodiment. The system 100 comprises a plurality of processing nodes 102, individually denoted as 102-1, . . . 102-n, . . . 102-N, each of which communicates with one or more Apache Hadoop YARN ("Yet Another Resource Negotiator") clusters, individually denoted as 104-1, 104-2, . . . 104-m, . . . 104-M. The processing nodes 102 are configured to communicate with one another and with their associated YARN clusters 104 over one or more networks that are not explicitly shown in the figure. Apache Hadoop YARN is also referred to as Hadoop 2.0, and is described in, for example, V. K. Vavilapalli et al., "Apache Hadoop YARN: Yet Another Resource Negotiator," Proceedings of the 4th Annual Symposium on Cloud Computing, SOCC '13, pp. 5:1-5:16, ACM, New York, N.Y., USA, 2013, which is incorporated by reference herein. Alternatively, the nodes 104-1, 104-2, . . . 104-m, . . . 104-M could represent any arrangement of distributed processing nodes, not necessarily supporting the YARN framework.

The processing nodes 102 are illustratively implemented as respective worldwide data nodes, and more particularly as respective worldwide Hadoop (WWH) nodes, although numerous alternative processing node types can be used in other embodiments, and other embodiments need not utilize WWH, YARN or Hadoop. The WWH nodes in the present embodiment are assumed to be configured to perform operations in accordance with any framework supported by Hadoop YARN clusters comprising respective ones of the YARN clusters 104. Examples of frameworks supported by each of the Hadoop YARN clusters include MapReduce, Spark, Hive, MPI and numerous others.

The acronym WWH as used herein is additionally or alternatively intended to refer to a "worldwide herd" arrangement where the term "herd" in this context illustratively connotes multiple geographically-distributed Hadoop platforms, although as indicated previously, references herein to Hadoop and YARN are by way of example only. More generally, WWH in illustrative embodiments is used to denote a worldwide data processing platform potentially comprising multiple clusters. Numerous other arrangements of distributed processing nodes not involving WWH, YARN or Hadoop can be used in implementing illustrative embodiments as disclosed herein.

In the FIG. 1 embodiment, the multi-cluster distributed data processing platform more particularly comprises a WWH platform having one or more layers of WWH nodes 102 and a plurality of potentially geographically-distributed YARN clusters 104. Each of the YARN clusters 104 comprises a corresponding cluster of distributed processing nodes. The WWH platform is illustratively configured for worldwide scale, geographically-dispersed computations and other types of cluster-based processing based on locally-accessible data resources, as will be described in more detail elsewhere herein.

It is to be appreciated that a wide variety of other types of processing nodes 102 can be used in other embodiments. Accordingly, the use of WWH nodes in the FIG. 1 embodiment and other embodiments disclosed herein is by way of illustrative example only, and should not be construed as limiting in any way.

It should also be noted that one or more of the WWH nodes 102 in some embodiments can be part of a corresponding one of the YARN clusters 104. For example, in some embodiments of a WWH platform as disclosed herein, the YARN clusters 104 themselves each comprise one or more layers of WWH nodes. Accordingly, these and other embodiments need not include a separate layer of WWH nodes 102 above the YARN clusters 104. The WWH nodes 102 may be viewed as examples of what are more generally referred to herein as distributed processing nodes. The YARN clusters 104 are each also assumed to comprise a plurality of additional or alternative distributed processing nodes.

Each YARN cluster 104 includes a resource manager for that cluster, and from a larger perspective YARN can be viewed as a cluster-wide operating system that allows applications to utilize the dynamic and parallel resource infrastructure a computer cluster offers. However, conventional YARN implementations are generally configured to operate in single-cluster environments, and do not provide any support for managing distributed applications which span across more than one cluster.

The WWH platform in the FIG. 1 embodiment is an example of what is more generally referred to herein as a "multi-cluster distributed data processing platform." This WWH platform and other WWH platforms disclosed herein advantageously extends YARN to multi-cluster environments. For example, the WWH platform in some embodiments is configured to orchestrate the execution of distributed WWH applications on a worldwide scale, across multiple, potentially geographically-distributed YARN clusters. The WWH platform therefore provides a platform for running distributed applications across multiple data zones each having a corresponding YARN cluster.

Other types of multi-cluster distributed data processing platforms may be implemented in other embodiments. Accordingly, references herein to a WWH platform, YARN clusters and associated features are intended as illustrative examples only, and should not be construed as limiting in any way. For example, other embodiments can be implemented without using WWH nodes or YARN clusters. Accordingly, it should be understood that the distributed data processing techniques disclosed herein are more generally applicable to a wide variety of other types of multi-cluster platforms. Also, embodiments are not limited to clusters but can more generally be implemented using processing platforms configured to provide any arrangement of distributed processing nodes. The distributed processing nodes communicate with one another over one or more networks.

Each of the YARN clusters 104 in the system 100 is associated with a corresponding set of local data resources 110, individually denoted as local data resources sets 110-1, 110-2, . . . 110-m, . . . 110-M. The local data resource sets each provide one or more local data resources to the corresponding YARN cluster for analytics processing. Results of the processing performed within a given YARN cluster utilizing one or more locally available data resources accessible to that YARN cluster are illustratively provided to one or more other ones of the YARN clusters or to an associated one of the WWH nodes 102 for additional processing associated with provisioning of analytics functionality within the system 100.

The data resources of each of the sets 110 of data resources are individually identified using the letter R in FIG. 1. Although these data resources are illustratively shown as being external to the YARN clusters 104, this is by way of example only and it is assumed in some embodiments that at least a subset of the data resources of a given set 110 are within the corresponding YARN cluster 104. Accordingly, a given YARN cluster can perform processing operations using a combination of internal and external local data resources.

The results of the analytics processing performed by a given one of the YARN clusters 104 illustratively comprise results of local analytics processing using YARN frameworks such as MapReduce, Spark and numerous others.

It should be understood that the above-noted analytics results are merely examples of what are more generally referred to herein as "processing results" of a given cluster. Such results can take different forms in different embodiments, as will be readily appreciated by those skilled in the art. For example, such processing results can comprise local analytics results that have been processed in a variety of different ways within a YARN cluster before being provided to one of more of the WWH nodes 102 for additional processing. Numerous other types of processing results can be used in other embodiments.

The WWH nodes 102 are each coupled to one or more clients 112. By way of example, the set of clients 112 may include one or more desktop computers, laptop computers, tablet computers, mobile telephones or other types of communication devices or other processing devices in any combination. The clients are individually denoted in the figure as clients 112-1, 112-2, . . . 112-k, . . . 112-K. The clients 112 may comprise, for example, respective end users or associated hardware entities, software entities or other equipment entities. For example, a "client" as the term is broadly used herein can comprise a software-implemented entity running on a user device or other processing device within the system 100.

The variables N, M and K denote arbitrary values, as embodiments of the invention can be configured using any desired number of WWH nodes 102, YARN clusters 104 and clients 112. For example, some embodiments may include multiple YARN clusters 104 and multiple clients 112 but only a single WWH node 102, or multiple WWH nodes 102 corresponding to respective ones of the YARN clusters 104. Numerous alternative arrangements are possible, including embodiments in which a single system element combines functionality of at least a portion of a WWH node and functionality of at least a portion of a YARN cluster. Thus, alternative embodiments in which the functions of a WWH node and a YARN cluster are at least partially combined into a common processing entity are possible.

The WWH nodes 102 in some embodiments are implemented at least in part as respective analysis nodes. The analysis nodes may comprise respective computers in a cluster of computers associated with a supercomputer or other high performance computing (HPC) system. The term "processing node" as used herein is intended to be broadly construed, and such nodes in some embodiments may comprise respective compute nodes in addition to or in place of providing analysis node functionality.

The system 100 may include additional nodes that are not explicitly shown in the figure. For example, the system 100 may comprise one or more name nodes. Such name nodes may comprise respective name nodes of a Hadoop Distributed File System (HDFS), although other types of name nodes can be used in other embodiments. Particular objects or other stored data of a storage platform can be made accessible to one or more of the WWH nodes 102 via a corresponding name node. For example, such name nodes can be utilized to allow the WWH nodes 102 to address multiple HDFS namespaces within the system 100.

Each of the WWH nodes 102 and YARN clusters 104 is assumed to comprise one or more databases for storing analytics processing results and possibly additional or alternative types of data.

Databases associated with the WWH nodes 102 or the YARN clusters 104 and possibly other elements of the system 100 can be implemented using one or more storage platforms. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise storage arrays such as VNX® and Symmetrix VMAX® storage arrays, both commercially available from EMC Corporation. Other types of storage products that can be used in implementing a given storage platform in an illustrative embodiment include software-defined storage products such as ScaleIO™ and ViPR®, server-based flash storage devices such as DSSD™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

Additionally or alternatively, a given storage platform can implement multiple storage tiers. For example, a storage platform can comprise a 2 TIERS™ storage system from EMC Corporation.

These and other storage platforms can be part of what is more generally referred to herein as a processing platform comprising one or more processing devices each comprising a processor coupled to a memory.

A given processing device may be implemented at least in part utilizing one or more virtual machines or other types of virtualization infrastructure such as Docker containers or other types of Linux containers (LXCs). The WWH nodes 102 and YARN clusters 104, as well as other system components, may be implemented at least in part using processing devices of such processing platforms.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

It is to be appreciated that the particular arrangement of system elements shown in FIG. 1 is for purposes of illustration only, and that other arrangements of additional or alternative elements can be used in other embodiments. For example, numerous alternative system configurations can be used to implement multi-cluster distributed data processing functionality as disclosed herein.

Additional details regarding example processing functionality that may be incorporated in at least a subset of the WWH nodes in illustrative embodiments are described in U.S. Pat. No. 9,020,802, entitled "Worldwide Distributed Architecture Model and Management," and U.S. Pat. No. 9,158,843, entitled "Addressing Mechanism for Data at World Wide Scale," which are commonly assigned herewith and incorporated by reference herein.

The operation of the system 100 will now be described in further detail with reference to the flow diagram of FIG. 2. The process as shown includes steps 200 through 210, and is suitable for use in the system 100 but is more generally applicable to other types of multi-cluster distributed data processing platforms.

In step 200, a first application is initiated in one of a plurality of distributed processing node clusters associated with respective data zones, with each of the clusters being configured to perform processing operations utilizing local data resources locally accessible within its corresponding data zone. With reference to the FIG. 1 embodiment, a first application is initiated in one of the YARN clusters 104, possibly via one of the WWH nodes 102, by a given one of the clients 112. The first application is illustratively what is referred to herein as a WWH application, which is a distributed application for which processing is orchestrated over multiple ones of the YARN clusters 104.

In step 202, a plurality of data resources to be utilized by the application are determined. These data resources in the context of the FIG. 1 embodiment illustratively comprise data resources from multiple ones of the data resource sets 110.

In step 204, for one or more of the plurality of data resources that are identified as local data resources, processing operations are performed utilizing the local data resources in the associated cluster in accordance with the first application. Assuming by way of example that the first application in the FIG. 1 embodiment is initiated in the first YARN cluster 104-1, the data resources identified as local data resources would include one or more of the data resources from the set 110-1.

In step 206, for one or more of the plurality of data resources that are identified as remote data resources, respective additional applications are initiated in one or more additional ones of the plurality of distributed processing node clusters. By way of example, if the first application initiated in cluster 104-1 requires processing operations utilizing remote data resources, such as local data resources of another cluster 104-2, an additional application is initiated in cluster 104-2 so that the processing operations can be performed utilizing the local data resources available to cluster 104-2.

The identification of the local or remote status of particular data resources in steps 204 and 206 illustratively involves accessing a distributed catalog service to identify for each of the plurality of data resources to be utilized by the application whether the data resource is a local data resource or a remote data resource. The distributed catalog service is illustratively distributed over the clusters with each of the clusters having visibility of a corresponding distinct portion of the distributed catalog based on its locally accessible data resources. In some embodiments, the distributed catalog service comprises a distributed WWH catalog having a corresponding instance implemented within each of the clusters. Additional details regarding such a WWH catalog and other types of distributed catalog services that may be used in illustrative embodiments will be provided elsewhere herein.

In step 208, steps 202, 204 and 206 are repeated recursively for each additional application that is initiated from the first application until all processing required by the first application is complete.

For example, assume again with reference to the FIG. 1 embodiment that one of the clients 112 initiates the first application as a first YARN application in the first YARN cluster 104-1. The first cluster 104-1 can then initiate the one or more additional applications in the one or more additional clusters 104-2 through 104-M as respective YARN applications for which the first cluster 104-1 serves as a client such that the one or more additional clusters are unaware that the one or more additional applications are part of a multi-cluster distributed application.

Moreover, at least one of the additional clusters may then determine an additional plurality of data resources to be utilized by the corresponding additional application and identify for each of the plurality of additional data resources to be utilized by the additional application whether the data resource is a local data resource that is locally accessible within the data zone of the additional cluster or a remote data resource that is not locally accessible within the data zone of the additional cluster.

If the additional plurality of data resources includes one or more remote data resources not locally accessible to the additional cluster, the additional cluster initiates one or more other applications in one or more other ones of the clusters that have local access to the one or more remote data resources.

Accordingly, processing operations are performed utilizing the data resources in the corresponding one or more additional clusters in accordance with the one or more additional applications. Each remote data resource identified in a given iteration of step 206 is actually a local data resource in the particular cluster in which the corresponding processing operations are eventually performed. In this embodiment, "all processing" is intended to be broadly construed so as to encompass all cluster-based computations to be performed within the clusters utilizing their respective sets of local data resources.

In step 210, processing results from the first and one or more additional clusters are aggregated and the aggregated processing results are provided to the client that submitted the first application.

The aggregation may be performed in some embodiments by the cluster on which the first application was initiated, which is illustratively YARN cluster 104-1 in the particular example described above. Alternatively, in other embodiments, aggregation can occur incrementally on multiple ones of the clusters.

The processing results from the first and one or more additional clusters advantageously preserve privacy of those clusters in their respective local data resources. For example, the processing results from a given one of the clusters may be permitted to be transmitted to another one of the clusters but the corresponding local data resources of the given cluster that are utilized to obtain the transmitted processing results are not permitted to be transmitted to another one of the clusters.

Similar advantages are provided with regard to other aspects of data protection, including data security.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing multi-cluster distributed data processing functionality. For example, the ordering of the process steps may be varied in other embodiments, or certain steps may be performed concurrently with one another rather than serially. Also, one or more of the process steps may be repeated periodically for different types of analytics functionality, or multiple instances of the process can be performed in parallel with one another on different WWH platforms or other types of platforms implemented within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments can provide a number of significant advantages relative to conventional arrangements.

For example, some embodiments provide WWH platforms that are faster and more efficient than conventional analytics systems. Moreover, multi-cluster distributed data processing platforms in some embodiments are implemented in a decentralized and privacy-preserving manner. These and other multi-cluster distributed data processing platforms advantageously overcome disadvantages of conventional practice, which as indicated previously often rely on copying of local data to a centralized site for analysis, leading to privacy and performance concerns.

In some embodiments, a multi-cluster distributed data processing platform is configured to leverage Big Data profiles and associated Big Data analytics in processing local and remote data resources across multiple geographic regions or other types of data zones.

Additional details regarding Big Data profiles and associated Big Data analytics that can be implemented in illustrative embodiments of the present invention are described in U.S. Pat. No. 9,031,992, entitled "Analyzing Big Data," which is commonly assigned herewith and incorporated by reference herein.

A multi-cluster distributed data processing platform in an illustrative embodiment can utilize the data scattered across multiple regional data centers located worldwide, while preserving data privacy and adjusting for differences in data formats and other factors between the various data centers.

A WWH platform in some embodiments leverages one or more frameworks supported by Hadoop YARN, such as MapReduce, Spark, Hive, MPI and numerous others, to support distributed computations while also minimizing data movement, adhering to bandwidth constraints in terms of speed, capacity and cost, and satisfying security policies as well as policies relating to governance, risk management and compliance.

Figure 3A:
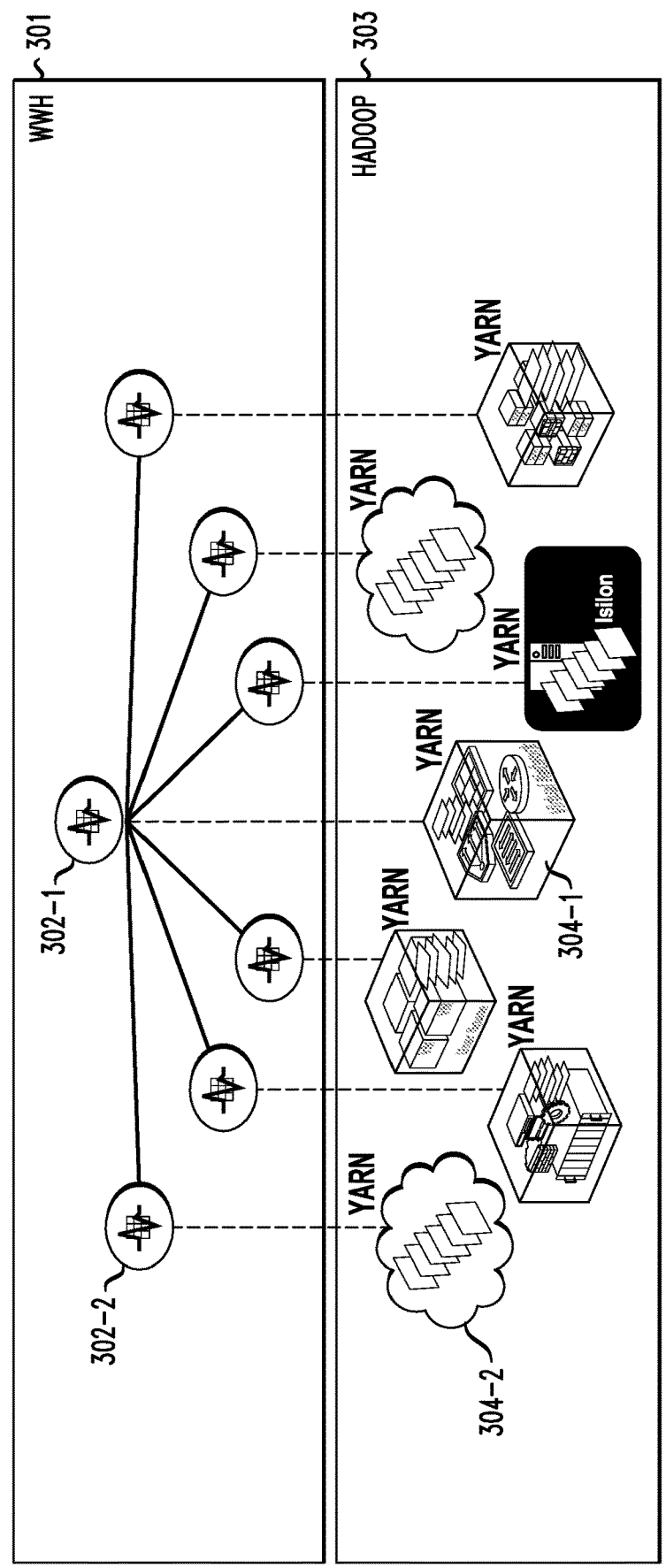

FIGS. 3A and 3B illustrate another information processing system 300 comprising a WWH platform. The WWH platform in this embodiment comprises a WWH node layer 301 that includes multiple WWH nodes 302 such as WWH nodes 302-1 and 302-2. The WWH platform further comprises a YARN cluster layer 303 that includes multiple YARN clusters 304 such as YARN cluster 304-1 and YARN cluster 304-2. The WWH nodes 302 are associated with respective ones of the YARN clusters 304.

The YARN clusters 304 are examples of what are more generally referred to herein as "distributed processing node clusters." Thus, like the YARN clusters 104 of the FIG. 1 embodiment, each of the YARN clusters 304 is assumed to include a cluster of multiple computers or other processing devices. Other types of distributed processing node clusters can be used in other embodiments. The use of Hadoop YARN in the FIG. 3 embodiment is by way of example only, and other embodiments need not utilize Hadoop YARN.

Also, although single layers 301 and 303 of respective sets of WWH nodes 302 and YARN clusters 304 are shown in this figure, other embodiments can include multiple layers of WWH nodes, multiple layers of YARN clusters, or both multiple layers of WWH nodes and multiple layers of YARN clusters.

In the information processing system 300, there is a one-to-one correspondence between the WWH nodes 302 and the respective YARN clusters 304, although this is also by way of illustrative example only. In other embodiments, a given WWH node may be associated with multiple YARN clusters. Additionally or alternatively, a given YARN cluster can be associated with multiple WWH nodes.

It is also possible that one or more of the WWH nodes 302 may each comprise a data processing node of the corresponding YARN cluster 304. Thus, in some embodiments, the separate layers 301 and 303 of the FIG. 3 embodiment are merged into a single layer of YARN clusters one or more of which each include one or more WWH nodes. Such an arrangement is considered yet another illustrative example of a WWH platform, or more generally a multi-cluster distributed data processing platform, as those terms are broadly utilized herein.

The YARN clusters 304 in the FIG. 3 embodiment are assumed to be associated with respective distinct data zones. Each of the YARN clusters 304 is configured to perform processing operations utilizing local data resources locally accessible within its corresponding data zone. The YARN clusters as illustrated in the figure illustratively comprise respective processing platforms including various arrangements of multi-node clouds, virtual infrastructure components such as virtual machines (VMs) and virtual networks, Isilon® platform nodes, and other example arrangements of distributed processing nodes.

By way of example, at least a subset of the YARN clusters 304 may comprise respective geographically-distributed regional data centers each configured to perform analytics processing utilizing the locally accessible data resources of its corresponding data zone. Additional or alternative types of boundaries may be used to separate the system 300 into multiple data zones. Accordingly, geographical distribution of the data zones and their respective clusters is not required.

The WWH nodes 302 illustratively utilize processing results from one or more of the YARN clusters 304 in orchestrating distributed applications over multiple YARN clusters in the system 300. This is achieved in a manner that preserves the privacy of those clusters in their respective local data resources. For example, processing results from a given one of the clusters may be permitted to be transmitted to another one of the clusters while the local data resources of the given cluster that are utilized to obtain the processing results are not permitted to be transmitted to another one of the clusters.

As illustrated in FIG. 3A, the WWH layer 301 may be viewed as comprising an "analytics layer" of the system. The YARN clusters 304 can be interconnected in different ways at that layer through use of different connections between the WWH nodes 302. In this particular figure, a first WWH node 302-1 is shown as being interconnected with each of the other WWH nodes 302 of the WWH layer 301.

FIG. 3B illustrates that alternative interconnections of the WWH nodes 302 are possible, including the arrangement shown in which another WWH node 302-2 initiates connections with each of the other WWH nodes 302 in orchestrating a given distributed application over multiple ones of the YARN clusters 304. It is to be appreciated that, in the FIG. 3 embodiment, any of the WWH nodes 302 can initiate a distributed application on its corresponding one of the YARN clusters 304 and that distributed application can subsequently initiate multiple additional applications involving respective additional ones of the clusters.

Again, the particular arrangements of layers, nodes and clusters shown in FIG. 3 are presented by way of example only, and should not be construed as limiting in any way.

The WWH platform in the FIG. 3 embodiment and one or more other embodiments disclosed herein illustratively adheres to local processing within each cluster using data locally accessible to that cluster. This is achieved without the need for implementing a distributed file system over the multiple clusters. Also, movement of data resources between clusters is avoided. Instead, data resources are processed locally within their respective YARN clusters.

This orchestration of distributed applications over multiple YARN clusters is facilitated in illustrative embodiments through the use of what is referred to herein as a WWH catalog. The WWH catalog is a catalog of data resources, and is an example of what is more generally referred to herein as a "distributed catalog service."

In some embodiments, each cluster that is part of the WWH platform has access to or otherwise comprises an instance of the WWH catalog implemented for that cluster. The WWH catalog instance implemented for a given cluster illustratively contains detailed information regarding local data resources of that cluster, such as, for example, file names and metadata about the files and their content, and references to one or more other clusters in the case of a non-local resource. This creates a hierarchical structure to execution of a WWH application within the WWH platform.

It should be noted that each YARN cluster need not include its own instance of the WWH catalog. For example, in some embodiments, only a subset of the YARN clusters of a multi-cluster distributed data processing platform implement respective instances of a distributed WWH catalog. In such an arrangement, YARN clusters that do not include respective WWH catalog instances can nonetheless participate in performance of computations associated with a distributed WWH application.

A WWH application identifies data files and other input data items from among the various data resources characterized by the WWH catalog. A given such input data item can more particularly comprise, for example, a text file, an XML file, a result relation of a database query or a result of an API query.

Data resources characterized by the WWH catalog can be considered global in the sense that clients are oblivious to the particular location of the resource. For example, a given resource can be comprised of several other resources, each residing in a different data zone. A meta-resource is a piece of data that describes a corresponding data resource. It generally includes the location of the resource and information about how to access the resource.

The WWH catalog is distributed over the clusters of the WWH platform with each of the clusters having visibility of only its corresponding instance of the WWH catalog. In some embodiments, the distributed instances of the WWH catalog are implemented as respective YARN applications running on respective ones of the YARN clusters of the WWH platform.

A given instance of the WWH catalog on a corresponding one of the YARN clusters typically comprises a plurality of entries with each such entry comprising a meta-resource including information characterizing location and accessibility of a corresponding one of the data resources. By way of example, the meta-resource for a given local data resource may comprise a file path to a storage location of that local data resource in the corresponding YARN cluster. Also by way of example, the meta-resource for a given remote data resource may comprise information identifying another cluster for which that data resource is a local data resource.

A given meta-resource of the WWH catalog may additionally or alternatively comprise one or more other types of information, such as, for example, information regarding transformation of the data resource into one or more designated formats, access control information, policy rules, etc.

The WWH catalog therefore illustratively provides a catalog of entries, each comprising a meta-resource. Each meta-resource describes the respective resource and may contain the code or an API required to transform the resource to the format required by the application. End users or other types of clients may browse the WWH catalog via a browsing API or other type of browsing interface in order to obtain information about meta-resources, and WWH applications may query it for information about how to access the data. As noted above, the WWH catalog is assumed to be distributed across multiple data zones and their respective YARN clusters. Such a distributed arrangement helps to provide security and privacy for the underlying data resources.

Although distributed implementations of the WWH catalog are advantageous in some embodiments, it is possible in other embodiments for the WWH catalog to be implemented in only a single cluster of a WWH platform. Other alternative implementations may include distributed implementations in which the WWH catalog is distributed over only a subset of the clusters of a WWH platform, rather than over all of the clusters of the WWH platform.

The WWH platform and its associated WWH catalog in illustrative embodiments implement a recursiveness property that allows a given distributed application initiated on one of the YARN clusters to initiate additional applications on respective additional ones of the YARN clusters. Those additional applications can similarly initiate more applications on other ones of the YARN clusters different than the YARN clusters on which the additional applications were initiated. In this manner, a distributed application can be executed utilizing local data resources of multiple YARN clusters while preserving the privacy of each of the YARN clusters in its local data resources.

In some embodiments, security measures are deployed that prevent the data zones from being accessible to the outside world. For example, firewalls, routers and gateways may prevent public access to a cluster of a given data zone, allowing access to the cluster only from within a certain access point. The WWH platform in illustrative embodiments is configured to allow such "hidden" data zones to take part in both sharing data and computation.

The execution of a WWH application can be represented in some embodiments as a tree or a directed graph. In such an arrangement, each data zone participating in the execution of the application may be viewed as having two roles: (1) it receives a request to execute an application from a client, and (2) it can send requests for execution to other data zones, acting like a client. Role (1) can be represented as a "parent" node in the graph, and role (2) can be represented as an edge from a parent node to one or more "child" nodes. Each data zone may therefore be represented as the parent node of one or more child nodes, but may also be represented as the child node of another parent node representative of another data zone. A given parent node may not have access to data resources needed by a given application, but one or more of its associated child nodes may have access to those resources. The structure of the tree or directed graph representative of a given WWH application can be made visible with appropriate permissions via the distributed WWH catalog.

A WWH platform configured to run applications across multiple clusters associated with respective distinct data zones is advantageous in terms of both privacy and performance. Privacy is provided in that an application submitted to an initial cluster corresponding to a specific data zone accesses the data local to that data zone. The results of the application execution in the initial cluster may be transferred to other clusters corresponding to respective other data zones, but such processing results are typically aggregated and therefore need not include any private information. Furthermore, the recursiveness property mentioned above can in some embodiments be configured so as to hide even the knowledge of which of the clusters participate in the application execution. For similar reasons, performance is greatly improved. Usually raw data stays in its original location and only the results which are of much smaller size may be transferred between clusters. This contributes to improved performance both because of the inherent parallelism and the reduced data transfer between clusters.

As is apparent from the above, the overall privacy and efficiency of the WWH platform is maintained in some embodiments by adhering to local processing within clusters and their associated data zones. In order to keep the processing local, the WWH catalog includes meta-resources that direct the computation to the cluster where the data is stored, such that the computation moves and the data does not.

The WWH platform in illustrative embodiments provides significant advantages relative to conventional systems. For example, the WWH platform in some embodiments is oblivious to the particular local file systems utilized in the respective YARN clusters. Moreover, the WWH platform keeps local raw data private within each of the clusters, does not need a centralized controller or scheduler, and is not limited to use with only the MapReduce framework but is more generally suitable for use with any of a wide variety of frameworks that are supported by YARN.

The WWH platform utilizes a distributed WWH catalog having instances accessible to respective ones of the YARN clusters, and is thus agnostic to where exactly the data resides, and its exact format, and does not require a global file system.

The WWH platform is strongly privacy aware. It supports and encourages local processing of local data and provides simple ways for sending intermediate processing results which do not contain private information between clusters.

The WWH platform provides similar advantages for other aspects of Governance, Risk and Compliance (GRC). For example, by pushing processing closer to where the data is located, the WWH platform facilitates enforcement of policies relating to governance, management of risk, and compliance with regulatory requirements, all at the local level.

The WWH platform supports multiple data zones. A data zone is illustratively a distinct YARN cluster with its own local data. Such a data zone will usually execute a YARN application such as a MapReduce application on its local data. The WWH platform provides a framework which spans across multiple data zones, and enables the combination of processing results based on local data resources of the respective data zones in a global manner. Thus, the WWH platform provides and encourages cooperation between different data zones. However, the WWH platform does not encourage moving raw data between data zones, for both performance and privacy reasons, as well as for other related reasons such as the above-noted facilitation of GRC at the local level.

The WWH platform in some embodiments has an open architecture in the sense that any YARN cluster can join the WWH platform, and therefore the WWH platform in such an embodiment does not require any single centralized controller. Every participating YARN cluster is in control of the data it wishes to share with the outside world. An authorized external client can connect to any data zone supported by the WWH platform and there is no single entry point.

The WWH platform can be illustratively implemented utilizing YARN applications. For example, when a client wishes to run a WWH application it contacts a first one of the clusters, and runs a YARN application on that cluster. When other clusters need to be contacted, one or more containers of the first cluster act like respective clients for the other clusters, and run YARN applications on those other clusters. Thus in each individual cluster the distributed WWH application is seen as an individual YARN application and YARN itself is not aware of the multiple data zone aspects of the WWH application or the WWH platform.

Like YARN itself, the WWH platform in some embodiments is functionally separated into a platform layer and a framework layer. The WWH framework layer can be configured to support WWH frameworks for executing WWH applications that utilize any of a wide variety of underlying YARN frameworks. A developer can write WWH frameworks, and clients will be able to use those WWH frameworks, in a manner similar to how YARN frameworks such as MapReduce or Spark are utilized on single clusters. For example, some embodiments of WWH platforms described herein are provided with a WWH framework for running MapReduce applications in different data zones associated with respective multiple YARN clusters and using a global reducer in a particular YARN cluster to compute the final results. Alternatively, the global reducer can be implemented at least in part outside of the YARN clusters, such as within a given one of the WWH nodes.

Additional details regarding illustrative embodiments of a WWH platform will now be described with reference to FIGS. 4 through 7.

In these embodiments, it is assumed that a WWH application comprises executable code that is configured to process a set of location-dependent data resources using a set of distributed services provided by the WWH platform. The location-dependent data resources can include Big Data or other types of data subject to processing using distributed analytics applications.

Like YARN applications utilizing frameworks such as MapReduce and Spark, WWH applications can utilize corresponding WWH frameworks denoted herein as WWH-MapReduce and WWH-Spark. The WWH applications illustratively include client applications that utilize these and other WWH frameworks. Any framework supported by YARN can have a corresponding WWH framework implemented using the techniques disclosed herein.

Software developers associated with the WWH platform illustratively include the above-noted clients that create applications which benefit from the distributive nature of the WWH platform using the WWH frameworks. For example, such a client may comprise a developer that writes an application comprising Mapper, Reducer and GlobalReducer components and then submits a job using a WWH-MapReduce-GlobalReduce framework.

Other developers include platform developers that write the components which are considered integral parts of the WWH platform, and framework developers that develop the WWH frameworks to be utilized by clients in creating their applications. Examples of WWH frameworks include the above-noted WWH-MapReduce, WWH-Spark and WWH-MapReduce-GlobalReduce frameworks.

Figure 4:
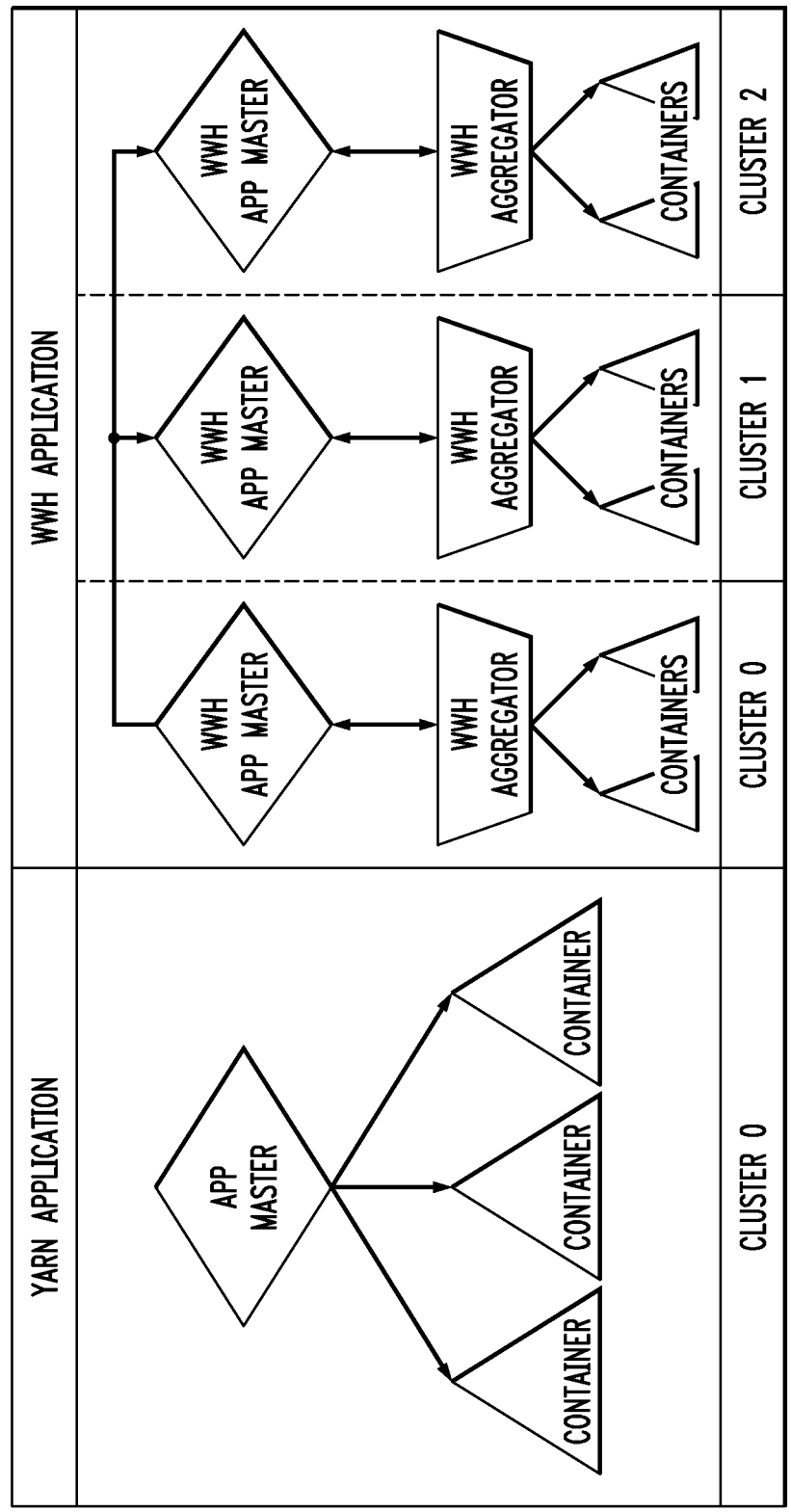
FIG. 4 compares a YARN application running on a single cluster with a distributed WWH application running on multiple clusters in an illustrative embodiment.

Referring now to FIG. 4, a YARN application running on a single cluster denoted Cluster 0 is compared to a WWH application running on multiple clusters including Cluster 0 and two additional clusters denoted Cluster 1 and Cluster 2.

As illustrated in the figure, the YARN application comprises an application master that controls the execution of a corresponding application using multiple containers in the same cluster. The WWH application comprises multiple application masters running on respective ones of Cluster 0, Cluster 1 and Cluster 2. Each of the application masters of the WWH application is associated with an application running in the corresponding cluster and includes a corresponding WWH aggregator. Each of the WWH aggregators is controlled by its application master and utilizes multiple containers within its cluster in conjunction with execution of the associated application.

A given container illustratively comprises a collection of physical resources on a single data processing node, such as memory (e.g., RAM), CPU cores, and disks. There can be multiple containers on a single node, or a single large container on that node. Each node of a given cluster is assumed to comprise one or more containers of a designated minimum memory size (e.g., 512 MB or 1 GB). The application master can request one or more containers as a multiple of the minimum memory size.

The multiple containers utilized by one of the WWH aggregators on a given one of the clusters correspond to respective local data resources that are locally accessible within that cluster. The WWH aggregator is illustratively configured to request initiation of one or more additional applications on one or more respective other ones of the clusters with the additional application utilizing remote data resources locally accessible within the one or more other clusters.

The WWH application master component corresponding to the WWH aggregator may be configured to access a resolving API or other type of resolving interface of the distributed WWH catalog instance of the corresponding cluster in order to determine for each of the plurality of data resources to be utilized by the application whether the data resource is a local data resource or a remote data resource.

Although each WWH application master in this embodiment is shown as interacting with only a single WWH aggregator, this is by way of illustrative example only and in other embodiments a given WWH application master can be configured to control multiple WWH aggregators.

Also, the particular separation between WWH application master and WWH aggregator components is exemplary only, and in other embodiments a given WWH aggregator or its associated functionality can be incorporated at least in part within the corresponding WWH application master rather than external to that WWH application master as illustrated in FIG. 4 and other embodiments herein.

The WWH application masters are also referred to herein as respective WWH-ApplicationMaster ("WAM") components. Such components are assumed to comprise WWH platform components that are "private" and therefore not modifiable by framework developers. These private components are assumed to be defined and implemented by the platform developers.

Other WWH platform components considered private in illustrative embodiments include WWH Node Manager and WWH Catalog Service. These and other WWH platform components will be described in greater detail below.

The WWH aggregators are also referred to herein as WWH-Aggregator components. Such components are assumed to comprise WWH platform components that are "exposed" and therefore are modifiable by framework developers. For example, a framework developer can create an extension to an abstract WWH-Aggregator class. An example of such an extension for a WWH-MapReduce framework is denoted herein as WWH-Aggregator-For-MapReduce. The role of the WWH-Aggregator is generally to aggregate processing results from multiple clusters and to present the aggregated processing results to an end user or other client that initiated the distributed application.

It should be noted that references herein to private and exposed WWH platform components are made by way of example only, and in other embodiments additional or alternative components may be in respective ones of the private and exposed categories. Also, in other embodiments, all or substantially all WWH platform components may be designated as private, or all or substantially all WWH platform components may be designated as exposed.

A given WWH-Application illustratively comprises a set of executable components, such as binaries, classes and other components, including the WWH-ApplicationMaster class and one or more derivatives of the WWH-Aggregator class bundled with associated arguments for a Resource Manager of the corresponding YARN cluster in which the WWH-Application is initiated. These components collectively permit initiation of the corresponding distributed application.

A given WWH-Aggregator may utilize the containers, files and other data resources that are local to the particular cluster on which it runs. In addition, the given WWH-Aggregator may recursively request the execution of a remote WWH-Aggregator in a remote cluster. This may be achieved at least in part utilizing a Representational State Transfer (REST) application programming interface (API) of the corresponding WWH-ApplicationMaster.

As noted above, client applications can be configured to utilize one of a plurality of available WWH frameworks, such as one of the WWH-MapReduce, WWH-Spark and WWH-MapReduce-GlobalReduce frameworks. The latter WWH framework and a corresponding WWH global MapReduce application flow utilizing that framework will be described in greater detail below. The global MapReduce application is just one example of a distributed WWH application that can be executed using a WWH platform as disclosed herein.

Figure 5:
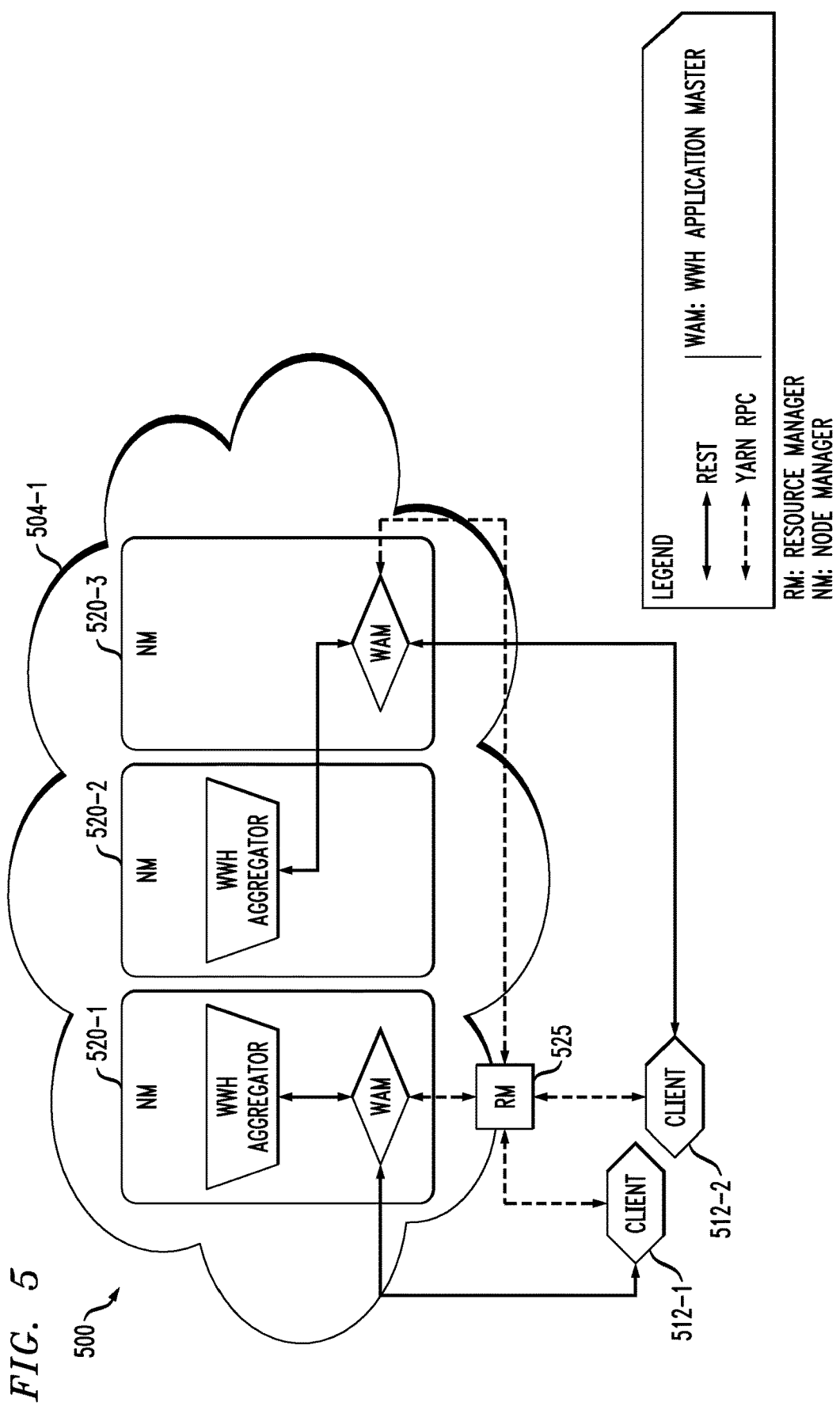
FIGS. 5 and 6 illustrate example arrangements of WWH platform components in respective illustrative embodiments.
Figure 6:
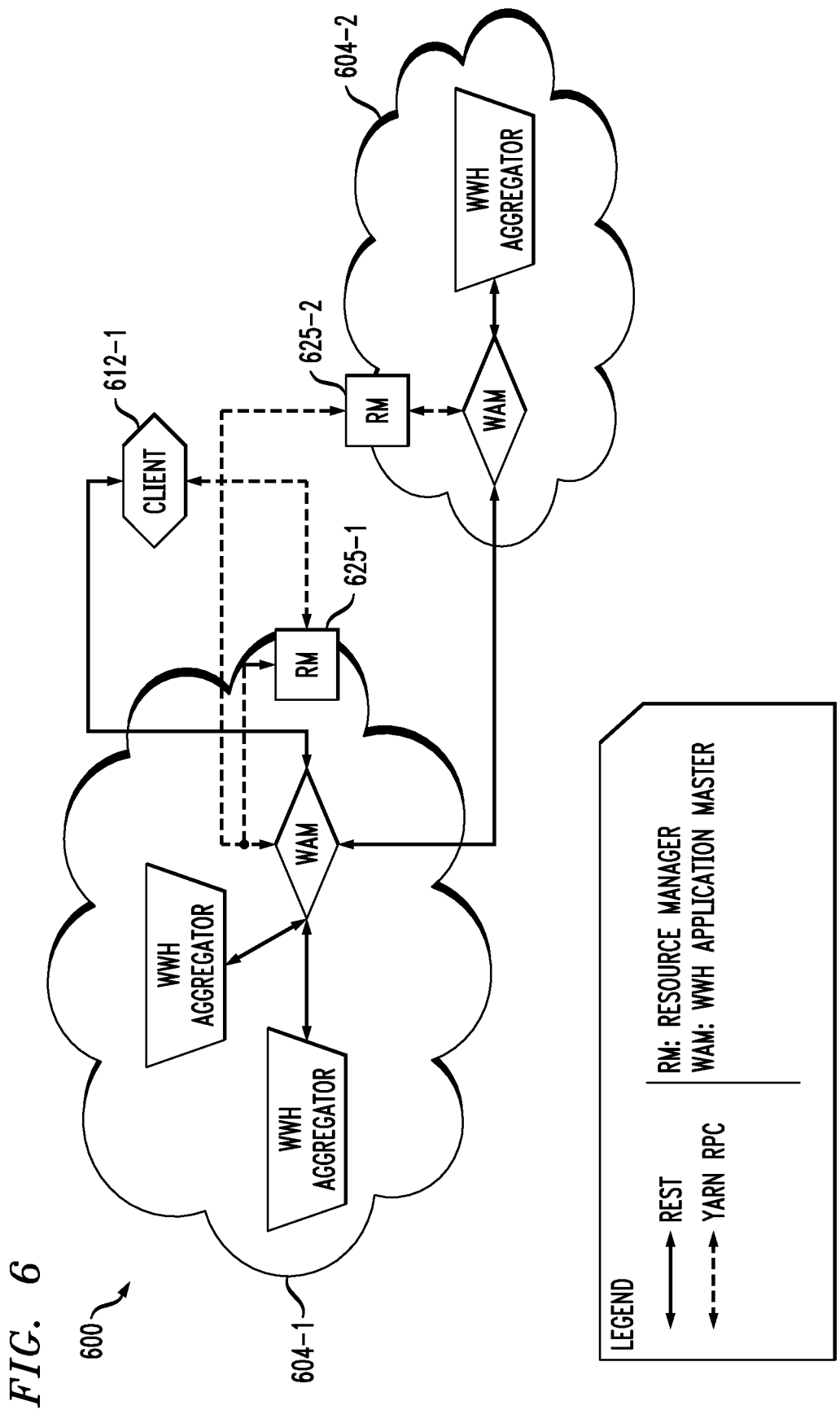

FIGS. 5 and 6 illustrate example arrangements of WWH components in respective illustrative embodiments.

Referring initially to FIG. 5, a portion 500 of a WWH platform is shown. The portion 500 includes only a single YARN cluster 504-1, although it is to be appreciated that the WWH platform is assumed to comprise multiple additional clusters that are not explicitly shown in the figure. Clients 512-1 and 512-2 interact with the cluster 504-1. The cluster 504-1 comprises a plurality of distributed processing nodes having respective node managers (NMs) 520-1, 520-2 and 520-3. The cluster 504-1 has an associated resource manager (RM) 525. The resource manager 525 is assumed to comprise a YARN resource manager. It is responsible for allocating resources and scheduling of containers within its corresponding cluster 504-1.

A given one of the node managers 520 manages a corresponding one of the data processing nodes of the cluster 504-1. This includes keeping up-to-date with the resource manager 525, managing the life-cycle of application containers, monitoring resource usage of individual containers, monitoring node health, and managing logs and other auxiliary services that can be utilized by YARN applications.

On startup, the given node manager registers with the resource manager 525, and then sends heartbeats with its status and waits for instructions. Its primary goal is to manage application containers assigned to it by the resource manager. For each container there is a single node manager that is responsible for its lifecycle.

In this embodiment, clients 512-1 and 512-2 communicate with respective WWH application master (WAM) components running on data processing nodes having node managers 520-1 and 520-3. This communication occurs via REST APIs of the respective WAM components. The clients 512 and WAM components also communicate with the resource manager 525 via YARN remote procedure calls (RPCs) as illustrated. It should be noted that the node managers 520 are responsible for the execution of the application processes within their corresponding cluster 504-1.

FIG. 6 shows a portion 600 of a WWH platform in another illustrative embodiment. In this embodiment, first and second YARN clusters 604-1 and 604-2 have associated resource managers 625-1 and 625-2. A client 612-1 interacts with a WAM component in cluster 604-1 via a REST API of the WAM component in that cluster. That WAM component interacts with two WWH aggregators also running in the cluster 604-1, and with another WAM component implemented in cluster 604-2. The other WAM component implemented in cluster 604-2 interacts with a single WWH aggregator also running in the cluster 604-2. The resource manager 625-1 communicates with the client 612-1 and the WAM component of cluster 604-1 via YARN RPCs. Similarly, the resource manager 625-2 communicates with the WAM components in respective clusters 604-1 and 604-2 via YARN RPCs. Communications between the WAM components and between a given one of the WAM components and its corresponding WWH aggregator(s) are carried out via the REST API of the given WAM component.

Figure 7:
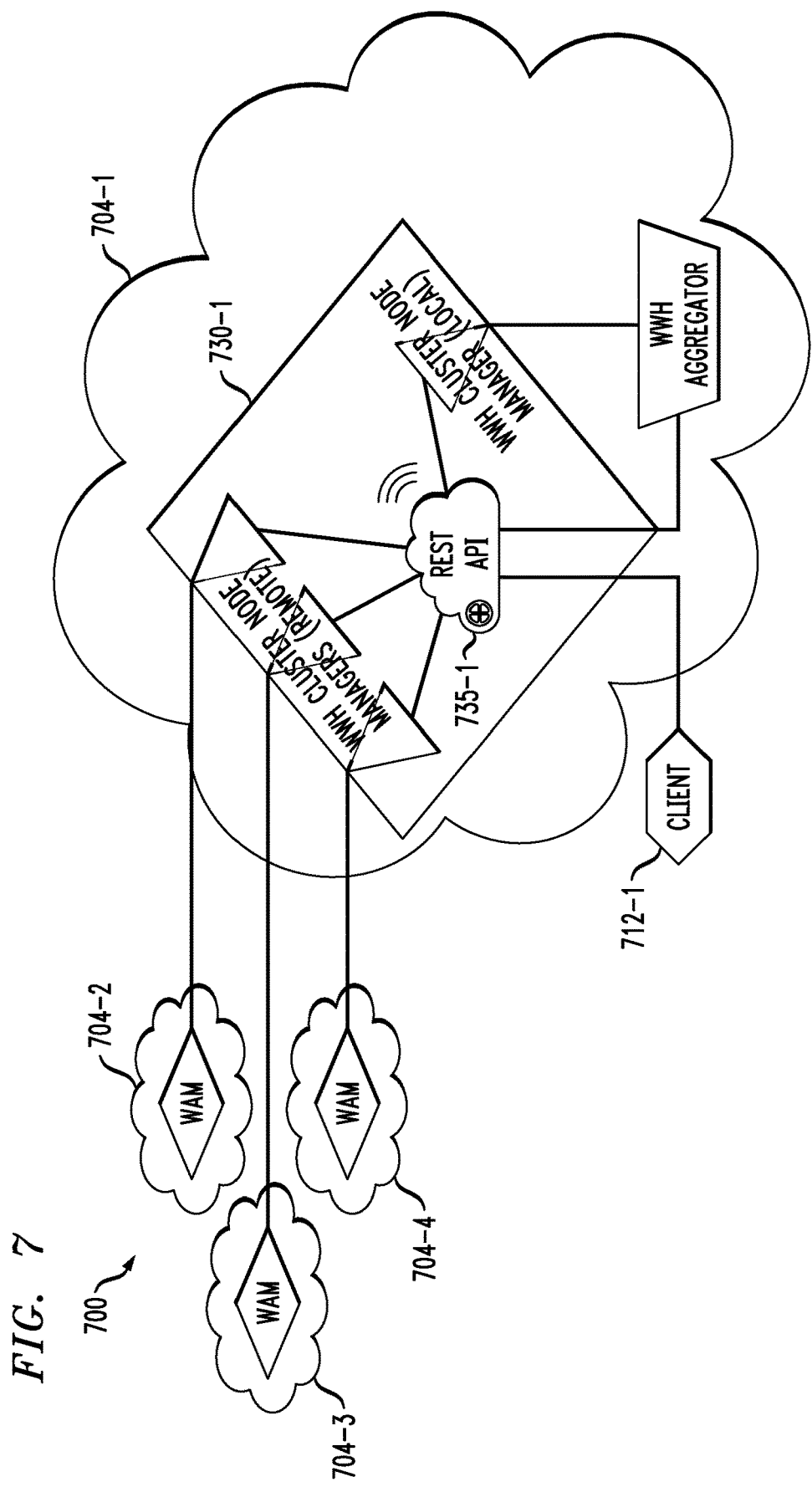
FIG. 7 shows a more detailed view of a WWH application master in a given cluster and its interaction with similar components in respective additional clusters.

FIG. 7 shows a more detailed view of a WAM component in a given cluster and its interaction with similar components in respective additional clusters. In this illustrative embodiment, a portion 700 of a WWH platform comprises YARN clusters 704-1, 704-2, 704-3 and 704-4. It is assumed that each of the YARN clusters has an associated resource manager, although the resource managers are not explicitly shown in the figure. The YARN cluster 704-1 comprises a WAM component 730-1. The cluster 704-1 is the local cluster of the WAM component 730-1, and the other clusters 704-2, 704-3 and 704-4 are respective remote clusters relative to the local cluster 704-1.

The WAM component comprises a REST API 735-1, a WWH cluster node manager for its local cluster 704-1, and additional WWH cluster node managers for respective ones of the remote clusters 704-2, 704-3 and 704-4. Each of the remote clusters 704-2, 704-3 and 704-4 includes a WAM component that is assumed to be configured in a manner similar to WAM component 730-1 of local cluster 704-1.

A client 712-1 interacts with WAM component 730-1 via the REST API 735-1. The WAM component 730-1 communicates with the WWH aggregator of its local cluster 704-1 via the REST API and the local cluster node manager. Also, the WWH aggregator is configured to interact with the local and remote cluster node managers. For example, the WWH aggregator can communicate with the local and remote cluster node managers of the WAM component 730-1 via the REST API 735-1. Accordingly, in this embodiment, the REST API 735-1 allows both the client 712-1 and the WWH aggregator of the WAM component 730-1 to communicate with the local and remote cluster node managers.

The WAM component 730-1 is also referred to herein as a WWH-ApplicationMaster, and as previously described is assumed to be a private component of the WWH platform that cannot be altered by framework developers. The WWH-ApplicationMaster is a YARN ApplicationMaster, and is the main process which provides WWH-related services in this embodiment. It contains the REST API 735-1, which allows external clients to access the corresponding WWH-Application, and facilitates job distribution between the different components of the WWH-Application as utilized by the WWH-Aggregator. The local and remote cluster node managers of the WWH-ApplicationMaster collectively comprise a set of WWH-ClusterNodeManager threads that are created on demand and are responsible for the actual distribution and monitoring of jobs for the local and remote clusters. The WWH-ApplicationMaster is also responsible for communication between clusters. This is achieved in the present embodiment by using the remote cluster node managers each behaving as a YARN client to a corresponding remote cluster.

A WWH-ClusterNodeManager is also assumed to be a private component of the WWH platform. As noted above, the WWH-ClusterNodeManager is a thread inside the WWH-ApplicationMaster. It can be either local or remote depending on whether it communicates with the resource manager in the same cluster as the WAM component or with the resource manager in a remote cluster.

A local WWH-ClusterNodeManager is responsible for executing the local application via the execution of a supplied WWH-Aggregator and for updating the WWH-ApplicationMaster REST API so that recursively the parent or invoking WWH-Aggregator will be able to fetch back the processing results.

A remote WWH-ClusterNodeManager recursively serves as a client to the remote WWH-ApplicationMaster and passes the jobs through its remote REST API.

The WWH-ClusterNodeManager components are created on demand when a job is submitted to the WWH-ApplicationMaster. Note that since the WWH-ClusterNodeManager is a YARN client, the communication between the WWH-ClusterNodeManager and the other clusters is in accordance with YARN protocols.

As mentioned previously, the WWH-Aggregator component is assumed to be an exposed component of the WWH platform, and is therefore subject to modification by framework developers. The WWH-Aggregator is illustratively implemented as a child container of the WWH-ApplicationMaster. It may use the containers, files and other local data resources of the cluster it is running in. Additionally or alternatively, it may recursively request execution of a remote WWH-Aggregator in a remote cluster using the REST API of the WWH-ApplicationMaster. The WWH-Aggregator is responsible for aggregating the processing results of submitted jobs and producing a meaningful result for the client. Each WWH-Aggregator illustratively has an associated WWH-ApplicationMaster container that is responsible for that WWH-Aggregator.

It is to be appreciated that the particular arrangements of WWH platform components illustrated in FIGS. 4 through 7 are presented by way of illustrative example only. Numerous other arrangements of additional or alternative components can be used to implement a multi-cluster distributed data processing platform in other embodiments.

Additional examples of software stack arrangements for illustrative embodiments of multi-cluster distributed data processing platforms will now be described.

A given multi-cluster distributed data processing platform can comprise a YARN layer built over an underlying HDFS. The YARN layer supports YARN frameworks such as MapReduce and Spark, and possibly numerous others. It also supports a WWH framework that itself includes WWH-MapReduce and WWH-Spark frameworks, and possibly numerous other WWH frameworks.

Other alternative arrangements of software components may be utilized in a software stack of a multi-cluster distributed data processing platform in other embodiments.

For example, a YARN layer can support multiple frameworks including WWH, MapReduce, Spark and MPI, and make use of an underlying HDFS. The HDFS can also support other projects, such as, for example, Hbase. Other projects not involving use of YARN or HDFS can also be implemented in the platform.

Another example platform software stack includes a YARN layer that supports multiple frameworks including WWH and MapReduce distributed processing, and makes use of an underlying HDFS. The MapReduce distributed processing utilizes HCatalog metadata services to support Hive queries, Pig scripts and other functionality. The HDFS can also support other projects, such as, for example, Hbase. Other projects not involving use of YARN or HDFS can also be implemented in the platform.

In a further example of a platform software stack, a YARN layer supports multiple frameworks including WWH distributed processing and MapReduce distributed processing, and makes use of an underlying HDFS. The MapReduce distributed processing utilizes HCatalog metadata services to support Hive queries, Pig scripts and other functionality. The WWH distributed processing utilizes WWHCatalog metadata services to support WWH queries and WWH scripts. Again, the HDFS can also support other projects, such as, for example, Hbase, and other projects not involving use of YARN or HDFS can also be implemented in the platform.

It is to be appreciated that the particular platform software stacks described above are examples only, and numerous other multi-cluster distributed data processing platforms can be configured using respective alternative types and configurations of software components.

In some embodiments, all of the data resources required by an application submitted by a client are local resources within the cluster that initiates the application. In such an embodiment, a YARN cluster comprises a single resource manager, and multiple node managers corresponding to respective data processing nodes of the YARN cluster.

The client in an embodiment of this type submits an application using a Global Map Reducer framework to a first cluster denoted Cluster 0 and all the data resources actually reside in Cluster 0 itself. First, the client submits an application to the Resource Manager residing in Cluster 0, which creates an instance of the WWH Application Master and passes to the WWH Application Master all the parameters received by the client, including the mapper, the local reducer, the global reducer, and the list of resources to be used. The WWH Application Master uses the Resolving API to communicate with the WWH Catalog Master, passing the list of resources to be used. Since all the resources are local in this embodiment, the WWH Catalog Master will return the actual address of the list of resources to the WWH Application Master.

The WWH Application Master will then create an instance of the WWH Aggregator, to manage the collection of results from the WWH Cluster Node Managers and to execute the Global Reduce operation later on. Next, the WWH Application Master will create an instance of the WWH Cluster Node Manager passing the mapper, the local reducer and the list of local resources. The WWH Cluster Node Manager just created will behave as a local client to the Resource Manager running in Cluster 0 itself, submitting a request for the execution of a MapReduce operation in Cluster 0. The local Resource Manager in Cluster 0 will then create an instance of the Application Master. From this point on, the Application Master just created will behave as a normal YARN application. The Application Master will analyze the list of resources and then negotiate with the scheduler in the local Resource Manager of Cluster 0 the allocation of processing resources with the Node Managers.

In other embodiments, the data resources required by an application submitted by a client are remote data resources in respective additional YARN clusters other than the YARN cluster that initiates the application.

The client in an embodiment of this type submits an application in Cluster 0 and the data resources reside in two other clusters, denoted Cluster 1 and Cluster 2. More particularly, the client submits an application to the Resource Manager residing in Cluster 0, which creates an instance of the WWH Application Master, which then connects with the WWH Catalog Master through the Resolving API.

In this embodiment, the WWH Catalog Master returns a list of resources containing resources that reside in Cluster 1 and resources that reside in Cluster 2. The WWH Application Master then creates an instance of the WWH Aggregator and then creates an instance of the WWH Cluster Node Manager for communicating with Cluster 1 and an instance of the WWH Cluster Node Manager for communicating with Cluster 2.

Optimizations may be done in the implementation where there is a single WWH Cluster Node Manager for communication between a given pair of clusters. In other words, should another application start in Cluster 0 that also has resources residing in Cluster 1, the system would not create another instance of the WWH Cluster Node Manager in Cluster 0, but would instead actually utilize the same instance already created. The WWH Cluster Node Managers then start an application in the clusters that they are connected to, and become a client of the Resource Managers in those respective clusters. The Resource Managers in Cluster 1 and Cluster 2 then create a WWH Application Master in their respective clusters which will execute the application with the data resources in the respective clusters.

In some embodiments, the data resources required by an application submitted by a client include both local resources within the YARN cluster that initiates the application and remote data resources in respective additional YARN clusters other than the YARN cluster that initiates the application.

The client in an embodiment of this type submits an application request to the Resource Manager residing in Cluster 0 that creates a WWH Application Master that then connects with the WWH Catalog Master. The WWH Catalog Master then returns a list of resources residing in Cluster 0, a list of resources residing in Cluster 1, and a list of resources residing in Cluster 2. The WWH Application Master then creates a WWH Aggregator and then creates a WWH Cluster Node Manager for each one of the clusters that has resources involved in this computation. The WWH Cluster Node Managers then communicate with the Resource Managers residing in the respective clusters and submit respective applications to be started there. The Resource Manager in Cluster 0 starts an Application Master while the Resource Managers in the remote clusters start respective WWH Application Masters.

In some embodiments, a YARN cluster having a resource manager interacts via a client services interface with WWH distributed processing components and WWH catalog metadata services components. These and other WWH components may also be accessible via RESTful API services.

Figure 8:
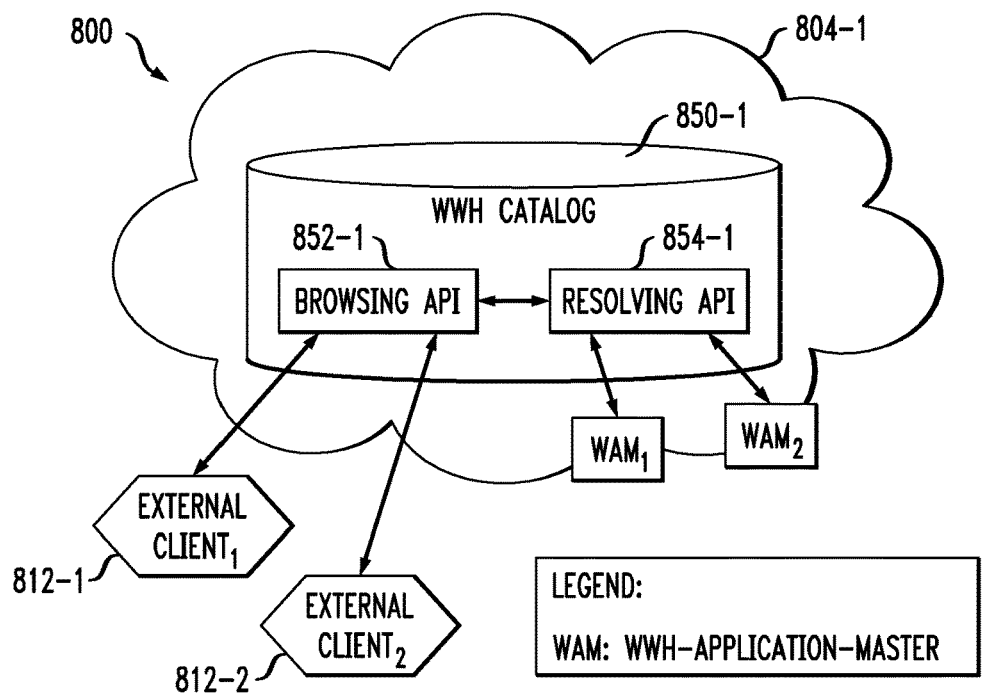
FIG. 8 shows one possible configuration of a WWH catalog of a multi-cluster distributed data processing platform in an illustrative embodiment.
Figure 9:
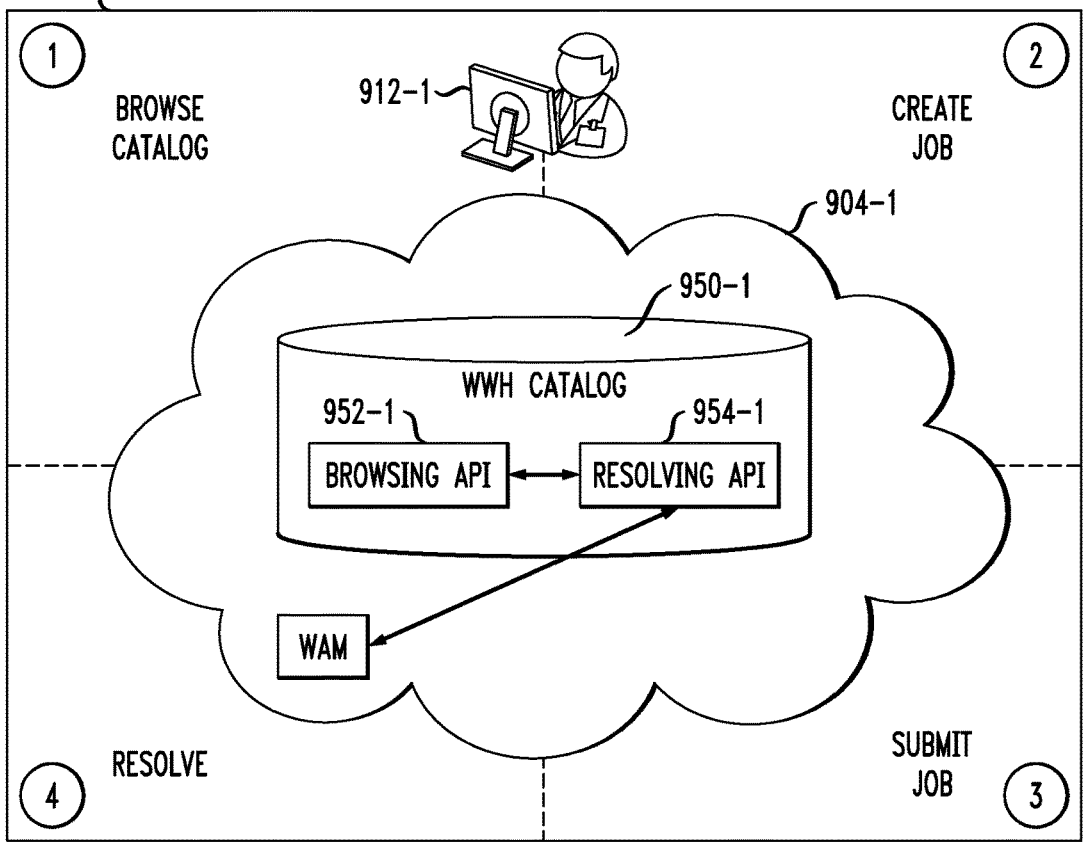
FIG. 9 illustrates a method of utilizing a WWH catalog of a multi-cluster distributed data processing platform in an illustrative embodiment.

Various features of possible configurations of the WWH catalog are illustrated in FIGS. 8 and 9.

Referring initially to FIG. 8, a portion 800 of a multi-cluster distributed data processing platform in an illustrative embodiment comprises a first YARN cluster 804-1. The cluster 804-1 comprises a corresponding instance 850-1 of a distributed WWH catalog. Although only a single cluster and corresponding WWH catalog instance is shown in this figure, it is assumed that similar instances of the distributed WWH catalog are implemented in respective ones of the other clusters of the multi-cluster distributed data processing platform. The clusters are further assumed to be associated with respective distinct data zones, with each of the clusters being configured to perform processing operations utilizing local data resources locally accessible within its corresponding data zone. The WWH catalog instance 850-1 of cluster 804-1 in combination with additional instances implemented for respective additional ones of the clusters collectively provide a distributed WWH catalog service with capability to resolve local or remote status of data resources in the data zones of each of the clusters responsive to requests from any other one of the clusters.

The WWH catalog instance 850-1 of the cluster 804-1 comprises a browsing API 852-1 accessible to a plurality of clients including clients 812-1 and 812-2, and a resolving API 854-1 accessible to one or more application master components of respective applications. The resolving API 854-1 is also accessible to the browsing API 852-1, and vice-versa, as indicated by the bidirectional connection between them in the figure.

The application master components in this embodiment more particularly comprise respective WAM components denoted $WAM_1$ and $WAM_2$. Each of these WAM components is assumed to be a YARN application master of a corresponding application running in the cluster 804-1.

By way of example, a given one of the WAM components is illustratively configured to access the resolving API 854-1 of the WWH catalog instance 850-1 of cluster 804-1 in order to determine for each of a plurality of data resources to be utilized by the associated application whether the data resource is a local data resource or a remote data resource relative to cluster 804-1. The WWH catalog instance 850-1 receives requests via its resolving API 854-1 from the WAM components to identify for each of a plurality of data resources to be utilized by a corresponding application initiated in the cluster 804-1 whether the data resource is a local data resource or a remote data resource relative to that cluster. The WWH catalog instance 850-1 provides responses to those requests back to the requesting WAM components.

In the FIG. 8 embodiment, it is assumed that the distributed WWH catalog is implemented as a plurality of WWH catalog instances distributed over the clusters with each of the clusters having visibility of only its corresponding one of the instances of the distributed WWH catalog. The WWH catalog in such an arrangement and other similar arrangements herein is more generally referred to as a "distributed catalog service" of the corresponding multi-cluster distributed data processing platform.

It is further assumed that the instances of the distributed WWH catalog are implemented as respective YARN applications running on respective ones of the clusters. A given one of the instances of the distributed WWH catalog may be configured in accordance with a configuration file that is stored in a predetermined storage location of the corresponding cluster, such as, for example, a predefined location in an underlying HDFS of that cluster. The configuration file contains information about the local and remote data resources having respective meta-resources that are known to the corresponding instance of the WWH catalog. The YARN application implementing a given instance of the distributed WWH catalog is illustratively executed as part of a setup process for the corresponding cluster.

In order to deploy the WWH catalog instance on a given cluster, a special job may be submitted to that cluster. For example, a WWHCatalogSubmit job may be used in order to submit a WWH catalog instance into a cluster. The submitted job may contain a pre-resolved meta-resource pointing to one or more configuration files of respective catalogs that are to be created using this job.

In other embodiments, the configuration file may be replaced with another type of configuration object. The term "configuration object" as used herein is intended to be broadly construed so as to encompass a configuration file or other type of stored configuration information relating to a distributed catalog instance.

The distributed WWH catalog is assumed in the present embodiment to be a private component of the WWH platform, and is therefore not subject to modification by framework developers. Instead, only platform developers are permitted to modify the distributed WWH catalog in this embodiment.

As mentioned previously, a given WWH catalog instance such as WWH catalog instance 850-1 on cluster 804-1 illustratively comprises a plurality of entries with each such entry comprising a meta-resource comprising information characterizing location and accessibility of a corresponding one of the data resources. The resolving API 854-1 illustratively returns a given meta-resource responsive to a request that includes a corresponding meta-resource identifier.

If a meta-resource identifier presented to WWH catalog instance 850-1 on cluster 804-1 resolves to a local data resource of that cluster, the resolving API 854-1 returns the corresponding meta-resource allowing the requesting application to access the corresponding local data resource in cluster 804-1.

If a meta-resource identifier presented to WWH catalog instance 850-1 on cluster 804-1 resolves to a remote data resource not locally accessible within that cluster, the resolving API 854-1 can operate in one of a number of different evaluation modes. For example, in a "lazy" mode of evaluation, the resolving API 854-1 returns information that allows the application to access the remote instance of the catalog in order to obtain the remote meta-resource. The returned information may be in the form of a URL for the particular remote instance of the distributed WWH catalog that is implemented in the remote cluster having local access to the resource in question. Alternatively, the resolving API 854-1 can operate in an "eager" mode of evaluation in which it requests the remote meta-resource from the WWH catalog instance in the remote cluster and then provides the received remote meta-resource to the requesting application. This illustratively involves the resolving API 854-1 making one or more RPCs to other WWH catalog instances in other clusters.

If a particular meta-resource identifier is not found in the WWH catalog instance 850-1, the resolving API 854-1 can return an error indicating that the corresponding meta-resource was not found. Alternatively, it can call a Find API that searches for the meta-resource. The Find API may go through a list of clusters that it knows and then, for each, it calls the non-lazy mode of evaluation of the resolving API. It is assumed that the Find API has access to one or more lists of clusters.

The above-noted lazy evaluation mode is the default mode for the resolving API in some embodiments. For example, this evaluation mode is particularly well-suited for embodiments in which meta-resource identifiers for remote resources are passed from a local WWH-ClusterNodeManager to a remote WWH-ClusterNodeManager in that cluster, for resolving in the remote cluster. Such an arrangement is particularly efficient in that it allows the final resolution of each data resource to be made in its local cluster.

A given one of the instances of the distributed WWH catalog such as WWH catalog instance 850-1 of cluster 804-1 in conjunction with its initiation as a YARN application may be registered as a service with a service registry of a resource manager of the cluster 804-1. In such an arrangement, the service registry of the resource manager of the cluster 804-1 is utilized to identify the browsing and resolving APIs 852-1 and 854-1 to requesting clients or WAM components.

FIG. 9 illustrates a method of utilizing a WWH catalog in an illustrative embodiment. In this embodiment, a portion 900 of a multi-cluster distributed data processing platform comprises a first YARN cluster 904-1. The cluster 904-1 comprises a corresponding instance 950-1 of a distributed WWH catalog. The WWH catalog instance 950-1 of the cluster 904-1 comprises a browsing API 952-1 accessible to a client 912-1. The WWH catalog instance 950-1 further comprises a resolving API 954-1 accessible to a WAM component of a corresponding application running in the cluster 904-1. The features, arrangement and operation of the WWH catalog instance 950-1 are generally similar to those of WWH catalog instance 850-1 as previously described in conjunction with FIG. 8.

The method as illustrated in FIG. 9 includes a sequence of processing steps indicated by circled numbers.

In step 1, the client 912-1 browses the WWH catalog instance 950-1 of cluster 904-1 via the browsing API 952-1. As noted above, the WWH catalog instance may register itself as a service with the YARN resource manager under an address such as services/wwh/catalog. The client 912-1 can therefore locate the browsing API 952-1 of the WWH catalog instance 950-1 of the cluster 904-1 by querying the resource manager registry service of that cluster. The WWH catalog instance 950-1 illustratively includes lists of meta-resources with each such meta-resource having a corresponding meta-resource identifier and containing information regarding location and accessibility of a corresponding data resource. Such lists are assumed to be provided in human-readable form to clients via the browsing API 952-1.

In step 2, the client 912-1 creates a processing job, illustratively an application utilizing a WWH processing framework, for submission to the cluster 904-1. The processing job is configured to utilize data resources having respective meta-resource identifiers from the WWH catalog instance 950-1.

In step 3, the client 912-1 submits the job to the cluster 904-1. The submitted job includes a list of meta-resource identifiers for respective data resources to be utilized in conjunction with execution of that job. The meta-resource identifiers are determined from the WWH catalog instance based at least in part on the browsing in step 1.

In step 4, the WAM component created by YARN for the submitted job accesses the resolving API 954-1 in order to resolve the local or remote status of the various data resources required for execution of the job. For example, the WAM component will attempt to resolve the local or remote status for all the meta-resource identifiers submitted with the job to be executed. If a given meta-resource identifier is resolved to a remote data resource, a recursive job on the corresponding remote cluster will be initiated via a new remote cluster node manager of the WAM component.

The process will then continue in a manner similar to that previously described herein until the job is completed utilizing the cluster 904-1 to process data resources local to that cluster and one or more additional clusters to process remote data resources. The corresponding processing results are aggregated by one or more WWH aggregators and returned to the client 912-1.

In some embodiments, a meta-resource of a WWH catalog has a recursive configuration. For example, a meta-resource denoted /emp can provide access to multiple versions of the underlying data resource using various additional or alternative data formats, including XML, SQL and CSV formats.

A client services interface of a WWH catalog metadata services implementation may support a variety of requests such as query, add an entry, delete an entry and update an entry. The WWH catalog metadata services may include components such as a WWH Catalog Manager and a WWH Catalog Master, as well as a network services interface. The WWH catalog metadata services further support privacy and/or security services, and include a capability to add future services.

Again, the particular WWH components and their illustrative arrangements and interactions as described above are by way of example only, and should not be construed as limiting in any way. Numerous alternative arrangements of components configured to interact in different manners can be used in alternative implementations of WWH platforms of the type disclosed herein.

An example global MapReduce WWH framework and associated application flow utilizing the above-described WWH platform and associated WWH catalog will now be described in more detail. In this example, the WWH framework more particularly comprises the above-noted WWH-MapReduce-GlobalReduce framework. It is assumed that a client submits a WWH-MapReduce-GlobalReduce application for execution in accordance with the corresponding framework. Each of the YARN clusters in the multi-cluster distributed data processing platform in this embodiment runs a local MapReduce application. The output of all clusters is transmitted to a selected cluster and then that selected cluster runs a global MapReduce application.

It is assumed that the local cluster that receives the WWH-MapReduce-GlobalReduce application from the submitting client is denoted as cluster C0, and that there are two additional participating clusters denoted as clusters C1 and C2, respectively. It is further assumed that these clusters are in respective separate data zones and that each of the clusters has access to the local data resources of its corresponding data zone.

The clusters C0, C1 and C2 in this example are implemented as respective Docker-based clusters, each running YARN and HDFS. Each cluster runs an instance of a distributed WWH catalog as a YARN application. The different WWH catalog instances are differentiated by their respective configuration files. More particularly, each WWH catalog instance has a unique configuration file that describes the local and remote meta-resources relative to the corresponding cluster. The local meta-resources are assumed to be described by information identifying their location in the local file system (e.g., file name or file path), and the remote meta-resources are assumed to be described by information identifying their respective remote clusters. Other types of information indicative of location and accessibility of local or remote data resources can be used in other embodiments.

The client submits the WWH-MapReduce-GlobalReduce application as a YARN application to the ResourceManager that resides on C0. A corresponding WWH-ApplicationMaster is started in conjunction with the submission of the WWH-MapReduce-GlobalReduce application. The WWH-MapReduce-GlobalReduce application includes a list of meta-resource entries from the WWH catalog, an aggregator class, and mapper, reducer and global-reducer classes.

It should be noted in this regard that the aggregator class is supplied by the framework developer as part of the WWH-MapReduce-GlobalReduce framework. The client supplies the application-specific classes of mapper, reducer and global-reducer, as well as the list of meta-resource identifiers from the WWH catalog which collectively represent input data for the application.

The above-noted WWH-ApplicationMaster is created by the YARN resource manager of the cluster C0 upon submission of the WWH-MapReduce-GlobalReduce application. The WWH-ApplicationMaster utilizes the resolving API of the WWH catalog instance of cluster C0 to resolve the local or remote status of each of the meta-resource identifiers submitted with the application. If a given meta-resource identifier is determined to represent a remote data resource not accessible in cluster C0 but accessible in one of the other clusters C1 or C2, the WWH-ApplicationMaster will initiate a recursive job at the appropriate remote cluster via a corresponding one of a plurality of WWH-ClusterNodeManagers configured to communicate with respective ones of the remote clusters C1 and C2.

For those meta-resource identifiers that resolve to local data resources of cluster C0, a local MapReduce job will be executed on cluster C0 using those resources via a local WWH-ClusterNodeManager.

When the WWH-ClusterNodeManager in C0 starts it examines the received job and requests from the ResourceManager in C0 a new container that will run the supplied aggregator class. After the ResourceManager has allocated the container, the WWH-ClusterNodeManager sends the job information bundled with the WWH-ApplicationMaster information to the WWH-Aggregator as its initializing arguments. The WWH-Aggregator then starts and submits both local and remote jobs. When the WWH-Aggregator starts, for every cluster in the provided resources list, it collects the names of all the files for that particular cluster. It requests a new job execution on the appropriate cluster, with the same aggregator, mapper and reducer classes.

The WWH-ApplicationMaster receives the jobs submitted by the WWH-Aggregator. Any such job that is local is passed to the local WWH-ClusterNodeManager that was already created. For a remote job, a remote WWH-ClusterNodeManager is created. Assume that the WWH-ApplicationMaster examines a given job and sees that it is a remote job to be assigned to C1. If it sees that there is no running WWH-ClusterNodeManager for C1, the WWH-ApplicationMaster starts one, denoted WWH-ClusterNodeManager-C0-C1, and passes the job to it.

When WWH-ClusterNodeManager-C0-C1 starts it examines the job it received and determines that it is a remote job. It then acts just like an initializing client. More particularly, WWH-ClusterNodeManager-C0-C1 submits the WWH-ApplicationMaster to the ResourceManager of C1. Once the WWH-ApplicationMaster is up, WWH-ClusterNodeManager-C0-C1 submits a job with the same parameters, except for the resources, which are the resources only relevant to C1. When the WWH-ApplicationMaster on C1 receives this job submission request it will recursively perform steps similar to those described above for the WWH-ApplicationMaster on C0.

When a WWH-Aggregator starts on a given cluster Ci, it receives the job information which contains the list of files, a mapper class and a reducer class. It then executes the job on its local cluster Ci using regular YARN services. When the job completes it reports its results and terminates.

Local and remote results generated by respective local and remote clusters are updated as follows. When the WWH-ApplicationMaster on a given cluster Ci receives a job results link it looks up the WWH-ClusterNodeManager that is responsible for sending this job (e.g., WWH-ClusterNodeManager-Cj-Ci), and passes the results to it. The WWH-ClusterNodeManager-Cj-Ci then updates the job status.

The local and remote results are aggregated in the following manner. A WWH-Aggregator-For-MapReduce-Global in conjunction with monitoring the status of the various jobs will receive links to the results generated by all the WWH-Aggregator-For-MapReduce-Local processes. Each time such a link is received, the WWH-Aggregator-For-MapReduce-Global will download the results data to its local cluster. The data is transferred via HTTP or other suitable protocols, and access control mechanisms may be utilized in conjunction with such transfer. When all the jobs are completed and their results are fully downloaded, the WWH-Aggregator on C0 will execute the aggregation code, in this case the global reduce on C0. Upon completion of the aggregation, the WWH-Aggregator will post the link for the results, just like any other WWH-Aggregator, and then terminate itself. The submitting client will then be able to obtain the aggregated processing results.

As a more particular example of a WWH application that can utilize the above-described WWH-MapReduce-GlobalReduce framework, consider an information processing system comprising multiple data centers located at different sites around the world, with the data centers maintaining respective large local document repositories. Data analysts wish to perform analytics in the form of a simple word count on the documents on all the sites. However, in performing this analysis, data centers cannot transmit complete documents to one another, but only the results of their respective local word counts. This restriction can be the result of a privacy issue (e.g., the data centers do not wish to expose their documents to the public), network bandwidth (e.g., the data is simply too large), or both.

A WWH application for performing a global word count in the above-described system can be configured as follows. First, a local word-count will be performed on each of the YARN clusters utilizing the local MapReduce framework. Then, the results of the local MapReduce processing are transmitted to a single one of the clusters, and a global reducing task is performed on the processing results in that single cluster. This last operation is illustratively performed by the previously-described global reducer which is part of the WWH-MapReduce-GlobalReduce framework. In other embodiments, alternative aggregation techniques can be used in place of the global reducer at a single cluster. For example, processing results can be aggregated incrementally using multiple ones of the clusters.

A wide variety of other types of analytics processing can be implemented using WWH platforms as disclosed herein.

As another example, bioinformatics applications for metagenomics-based biological surveillance can utilize the WWH-MapReduce-GlobalReduce framework. In one such arrangement, an initial cluster accepts sample genomes which are sent to a plurality of other clusters. Each of the clusters uses a local MapReduce process to compare the samples with private genomic information locally accessible in the corresponding cluster. The results of this local comparison in each cluster are in the form of one or more vectors which are sent back to the initial cluster. The initial cluster then runs a global reducer on the received vectors creating aggregated processing results in the form of a results matrix. This results matrix may be sent to the client for further analysis in order to detect the particular sample causing the problem.

In some embodiments configured to implement bioinformatics applications of the type described above, reads of local biological samples obtained from metagenomics sequencing are subject to mapping operations in each of the clusters. For example, one or more reads of a given biological sample may be subject to mapping based on string resemblance to target genomic sequences. Such a mapping arrangement is illustratively used to generate a hit abundance score vector for the given biological sample. Multiple such hit abundance score vectors generated for different biological samples are combined into a hit abundance score matrix that is utilized in characterizing a disease, infection or contamination, or otherwise providing analytics functionality within the system.

Yet another example is a cooperative security anomaly detection application which uses accumulating evidence to improve the quality of local detectors. Each local detector is run on a single YARN cluster of a multi-cluster WWH platform, and uses its own detecting algorithm implemented as a local MapReduce application using its own private data. The aggregated results of the detection are sent back to the initial cluster using aggregated non-private features only. The initial cluster executes a global reducer to select a set of the best global features and these are sent back to the local detectors of the respective clusters. This process continues for several iterations, with each iteration comprising a new global map-reduce application instance, until it converges. The process considerably improves local detector accuracy using the detection results received from the other clusters.

An arrangement of this type can be implemented in a system for malware detection that operates by analyzing Big Data comprising Domain Name Service (DNS) transactions associated with the web site of a large company. Clearly, such a company will be reluctant to share its transactions logs with other businesses. However, the company may well be willing to share anonymized statistical data in order to defeat a malware threat. By sharing statistical data of multiple sites in the manner described above, an improved malware detector can be constructed. Such a shared detector can use a multi-cluster distributed data processing platform of the type disclosed herein in order to enable the run of the improved detector on data in multiple sites, each using the detector on its own transaction logs and improving the probability of malware detection. No sharing of data and no common file system is needed or used. Other embodiments can incorporate additional functionality for access control, progress monitoring and support of a pluggable failure handling policy.

These example applications demonstrate the use of the WWH-MapReduce-GlobalReduce framework, and serve to illustrate the flexibility provided by the distributed WWH catalog in terms of locating relevant input data. They also demonstrate the privacy and performance features of WWH platforms.

Again, the use of MapReduce as part of a WWH framework is by way of illustrative example only. Numerous alternative frameworks can be utilized as part of a given WWH framework, including in some embodiments any framework supported by YARN, as well as other frameworks in non-YARN embodiments.

The multi-cluster distributed data processing platforms of illustrative embodiments disclosed herein provide significant advantages relative to conventional arrangements.

As mentioned previously, illustrative embodiments move the computation instead of moving the data and create an abstraction to distributed Big Data in order to overcome the drawbacks of conventional systems, providing significant advantages in terms of both performance and privacy, and related advantages such as the facilitation of GRC, as outlined in detail elsewhere herein.

Other illustrative embodiments can include beacon-based arrangements. In these embodiments, it is assumed that a beacon-based distributed data processing platform comprises a plurality of beacon lit sites. Such sites may comprise, for example, respective geographically-distributed data centers or other repositories of locally-accessible data to be processed by WWH nodes or other processing nodes of the platform.

It is further assumed that the beacons generally correspond to respective beacons configured in accordance with the Beacon Project of the Global Alliance for Genome and Health (GA4GH), but suitably modified to support WWH functionality as disclosed herein. The beacons may therefore be implemented at least in part in a manner analogous to GA4GH beacons, although a wide variety of other types of beacons can be used in other embodiments. The term "beacon" as used herein is intended to be broadly construed so as to encompass various mechanisms in which a given site can make its presence and availability known to processing nodes of a distributed data processing platform. It is possible that a given site may itself comprise a YARN cluster or at least one WWH node in some embodiments.

Beacon-based distributed data processing platform embodiments illustratively operate using a recursive approach similar to that described in the context of other WWH platform embodiments herein. For example, one WWH node can directly access those beacon lit sites that it has local access to while also initiating one or more applications on one or more other WWH nodes to obtain remote access to one or more other beacon lit sites. Also, advantages similar to those of the other WWH platform embodiments in terms of system performance and compliance with privacy, security and GRC requirements are obtained. Beacon-based distributed data processing platform embodiment can additionally make use of WWH catalog functionality as part of the WWH platform.

By way of example, the use of the distributed WWH catalog service in this embodiment allows the client to identify a particular subset of beacon lit sites that should participate in execution of a given beacon query. This is illustratively only a relatively small but focused subset of the full set of beacon lit sites. Accordingly, the distributed WWH catalog functionality will tend to reduce the amount of network traffic and processing overhead associated with execution of a given beacon query.

The beacon-based distributed data processing platforms described above provide enhanced processing arrangements for use in the GA4GH Beacon Project, as well as in numerous other contexts involving use of beacons. For example, by using WWH as the computing paradigm for the Beacon Project, the resulting system becomes far more extensible than client-based arrangements and it can leverage all of the frameworks supported by YARN, allowing much more sophisticated computations and other analytics operations to be performed using data resources of beacon lit sites. Moreover, it allows the analytics to be performed in a more focused and distributed manner that relieves the client of having to communicate directly with each of a relatively large number of beacon lit sites.

The WWH catalog can be used in such embodiments to store metadata regarding the participants in a network of beacon lit sites, thereby allowing for query optimization based on particular beacon lit sites. For example, such metadata can be used to determine which of the beacon network participants should be part of the execution of a given query. The WWH catalog can allow for the creation of multiple distinct virtual beacon networks, each comprising a different subset of beacon network participants, with particular types of queries being sent only to certain virtual beacon networks.

Further examples of illustrative embodiments will now be described with reference to FIGS. 10 through 32. In these illustrative embodiments, distributed data processing platforms each comprising a plurality of data processing nodes are configured to implement distributed catalog service functionality. The particular arrangements shown in these additional drawings, like those in the other drawings previously described herein, are considered examples only and should not be construed as limiting in any way.

Some of these embodiments utilize WWH to provide a mechanism to orchestrate the distribution and parallel execution of computations across multiple data zones, illustratively implemented as respective clusters and/or respective clouds. WWH allows for data residing across these data zones to be analyzed without requiring that all the data be moved to a single location, thereby conserving bandwidth and providing additional advantages such as reduced energy consumption.

Figure 10:
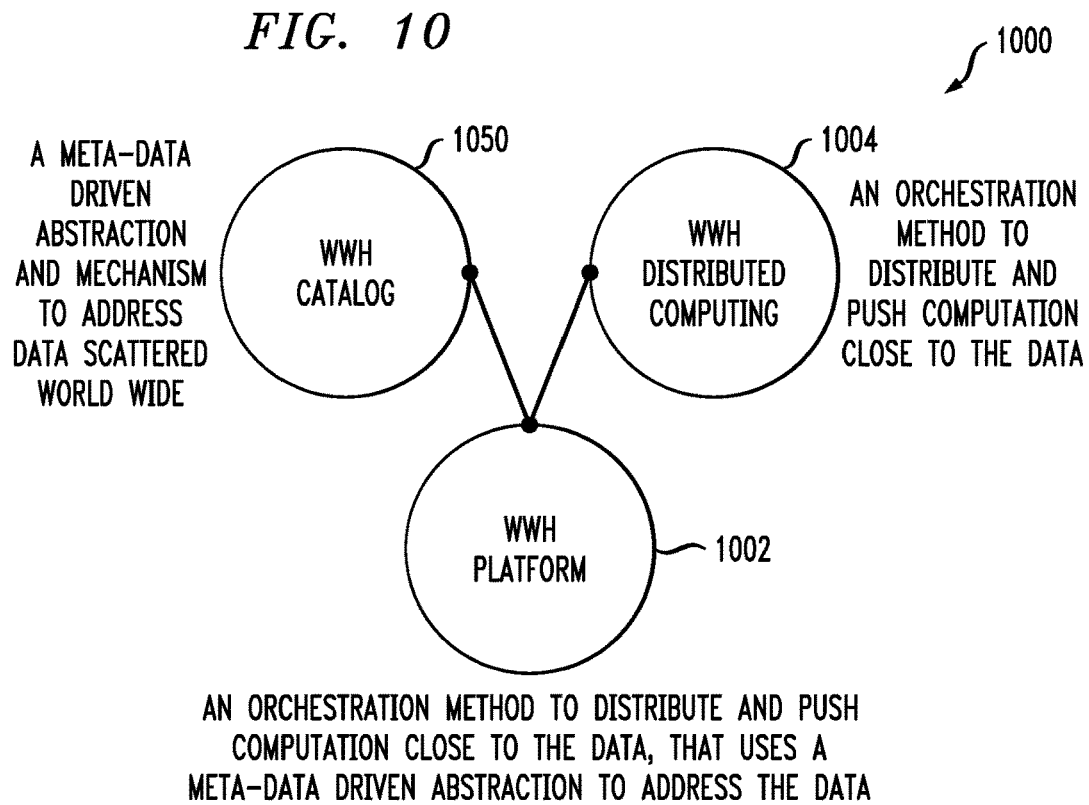
FIG. 10 illustrates foundational WWH distributed computing and WWH catalog components of a WWH platform in an illustrative embodiment.

Referring now to FIG. 10, an information processing system 1000 comprises a WWH platform 1002 that includes two main components, a WWH distributed computing component 1004 and a WWH catalog component 1050. The WWH distributed computing component 1004 implements an orchestration method to distribute and push computation close to the data, and the WWH catalog component 1050 implements abstractions based on metadata and meta-resources, as well as associated mechanisms configured to address and to access data potentially scattered worldwide.

Collectively, the WWH distributed computing component 1004 and the WWH catalog component 1050 are utilized to implement an orchestration method to distribute and push computation close to the data, that uses abstractions based on metadata and meta-resources to address the data, in WWH platform 1002.

As will be described in more detail below, WWH catalog implementations such as WWH catalog component 1050 are configured in some embodiments so as to exhibit characteristics of worldwide scalability and resilience, while also being model-driven, metadata and meta-resource based, and microservices-oriented. Other combinations of additional or alternative characteristics can be present in other implementations of WWH catalogs or other distributed catalog services disclosed herein.

The WWH distributed computing and WWH catalog components 1004 and 1050 are illustratively configured as decoupled, self-contained, worldwide scale components, exposing microservices interfaces. The WWH platform 1002 brings these two components together, forming a differentiated approach to worldwide scale computation by automating the orchestration and distribution of computation, and abstracting, through metadata, the addressing of the locations where the computations are performed.

The WWH platform 1002 is configured to provide an ability for users to distribute computation without knowing or being exposed to the exact location of the data, as the metadata in the WWH catalog component 1050 abstracts away specific locations and addressing details, and an ability for data to move location, and for more data to be added to or removed from the available set of data to be analyzed, without requiring changes to the distributed application itself and while allowing the application to always compute on the most recent set of data available. In some embodiments, several different implementations of the WWH catalog component 1050 coexist to deliver a given set of published services, with each such implementation of the WWH catalog being configured to best utilize the particular resources available to it and to best deliver on the requirements of the ecosystem in which it resides.

The WWH platform 1002 is suitable for use in a wide variety of information processing contexts, including numerous cloud, hybrid cloud and multi-cloud environments in which enterprises have data scattered across several locations but are unable to bring this data to a single location for analysis.

Another example processing context for the WWH platform 1002 is the Internet of Things (IoT) context, in which data is increasingly being collected at edge locations in greater volumes. Such IoT data may need to be analyzed and aggregated as close as possible to the point of collection, especially if IoT gateways have difficulties connecting to a central location or cloud, and yet an aggregated view of the data is also desired. The WWH platform 1002 provides an abstraction and a mechanism where applications and users, including data scientists and IoT device administrators, can address IoT devices at scale.

Other example processing contexts for WWH platform 1002 include various edge-core-cloud continuum contexts, in which computing is distributed across edge, core and cloud components.

The WWH catalog component 1050 may be viewed as an example of what is more generally referred to herein as a "distributed catalog service" having multiple catalog instances. A WWH catalog component such as WWH catalog component 1050 or another type of distributed catalog service is also referred to herein as simply a "catalog." A given such catalog can comprise one or more "catalog instances." Accordingly, in some contexts herein the terms "catalog" and "catalog instance" are used interchangeably. The catalog provides a way to abstract and organize data based on its metadata and implements a distributed mechanism to facilitate automated data tracking at scale.

For example, a catalog in some embodiments provides an ability to address data in an abstracted manner, based on the semantic content of the data, which is expressed through metadata, and not on the physical location of the data itself.

In some embodiments, a catalog provides an ability for data sources to publish and update the availability and location of data sources, and/or to link metadata to the datasets themselves. Additionally or alternatively, a catalog can provide an ability for a data source to update the availability of its content.

The catalog is illustratively configured to be flexible, extensible and applicable to tracking any type of "thing." Logical components of the catalog can be mapped to physical entities in numerous real-world scenarios. The features and functionalities of the catalog can be implemented utilizing microservices.

As described previously herein, the WWH framework in some embodiments implements a given data zone as a virtual enclosure where data cannot be moved outside its perimeter, possibly due to privacy concerns, bandwidth constraints, GRC issues or other reasons. The perimeter delineation need not be purely physical, such as a particular rack of a converged infrastructure or the walls of a data center, but can be defined using logical demarcations such as the reach of a microsegment in a Software Defined Network (SDN) or the collection of databases that can be accessed from a given application.

In some embodiments, a data zone is defined as a virtual enclosure where, in addition to data not being able to move outside, "things" are said to be in access proximity when these "things" can be reached from within the data zone. More particularly, two "things" are said to be in access proximity in the context of a data zone dz when these two "things" are inside the same data zone dz. The access proximity is commutative, meaning that when a given "thing" $t_i$ is in access proximity with another "thing" $t_j$, by definition, the "thing" $t_j$ is also in access proximity to the "thing" $t_i$.

For example, consider a data zone $dz_1$ where the following "things" are inside the perimeters of the data zone: a catalog $c_1$, a data file $f_1$, and a computing node $n_1$. As per the above definition, it can be said that the following pairs of entities are in access proximity to one another: the catalog $c_1$ and the data file $f_1$; the data file $f_1$ and the computing node $n_1$; and the computing node $n_1$ and the catalog $c_1$.

A "thing" may be part of more than one data zone and, in this case, may be in close proximity to two different sets of "things" where the "things" in each set are in access proximity to the "thing" the data zones have in common, but the "things" in one data zone are not in access proximity to the "things" in other data zones.

Metadata illustratively comprises an abstraction of a "thing," expressed through data, that enriches and describes properties about the "thing" with information above and beyond what is inherent in the "thing" itself. For example, metadata about a file enriches the file with information, such as a set of tags that describe the semantic topics discussed in the content of the file, the meaning of the information in the file, or the format of the data in the file. More particularly, a given tag may indicate the file contains Random Clinical Trial (RCT) data for test of drugs for diabetes. As another example, metadata about a computing cluster enriches the cluster with information such as the number of nodes in the cluster or its technology manufacturer. Methods and approaches based on metadata include mechanisms that leverage metadata to locate, access, analyze, or manage "things."

A meta-resource illustratively comprises an abstraction of a set of resources, that enriches the resources with metadata above and beyond the resources themselves, describing characteristics shared by all the resources represented by the meta-resource itself. The resources represented by a meta-resource may be physically co-located or be distributed geographically, possibly around the world. For example, a given meta-resource may abstract the set of all files that contain RCT data, where the files of a hospital are stored. Methods and approaches based on meta-resources include mechanisms that treat meta-resources as separate entities, allowing operations to be performed on the meta-resources themselves, on the metadata they store, and on the resources they represent.

Modeling conventions may be utilized to represent data models in illustrative embodiments. In accordance with example modeling conventions, a given class has two types of properties, namely, an attribute that describes a characteristic of entities of that class, and a relationship, that describes a type of relation that instances of a class may have with instances of another class. Objects are created as instances of a certain class and a given object inherits all properties of its class, including the properties of all the classes that its class inherits from. All properties have a default value, such that when an instance is created, the value of the property is initialized as the default value. For relationships, the default value of the relationship is the empty set.

Data models are strong typed, enforcing the constraints defined by the model on the instances of the model. For example, such constraints can require that instances can only be created as instances of classes previously defined, that relationships can only be created between instances of classes for which those relationships have been defined, and that attributes can only be assigned values of the type of the attributes themselves. Other constraints can be defined in other embodiments.

Different modeling conventions may be used to represent classes, instances, relationships and attributes. These and other modeling conventions are utilized to construct data models that illustratively include layered extensible data models, as will be described in more detail elsewhere herein.

In some embodiments, a graph is used to represent a model-driven dataset formed as a set of class instances and relationships among these instances. Such a graph illustratively comprises a plurality of vertices or nodes, which represent respective instances of the classes, and one or more edges, which represent respective relationships among the instances of the classes. Once a model-driven dataset is represented as a graph, then properties of the dataset can be easily conceptualized as properties of a graph. For example, the property of neighbor nodes applies to two nodes, or instances of a dataset, that have a relationship directly connecting them. The property of related nodes or connected nodes applies to nodes, or instances of a dataset, that can be reached from one to the other, by traversing a set of relationships.

The instances in a dataset can be directly related, also referred to as directly connected, when they can be reached by traversing a single relationship, or indirectly connected, also referred to as indirectly connected, when they can only be reached via a set of relationships. A path within the graph denotes a sequence of relationships that can be followed between an origin node $n_o$ and a target node $n_t$. More formally, a path $P_{o,t}$ between origin node $n_o$ and target node $n_t$ can be represented as $P_{o,t}=\{<n_o,r_2,n_2>, \ldots, <n_n,r_n,n_t>\}$. The degree of separation or number of hops refers to the number of nodes in a path between two nodes. The degree of separation between the origin node $n_o$ and the target node $n_t$ is n.

Similarly, operations on a model-driven dataset can be easily abstracted as graph operations. An example of such a graph operation is a graph traversal operation, also referred to herein as a dataset traversal microservice, typically used to go from one node in the graph, or instance in the dataset, to another node in the graph, by following a set of relationships between neighbor nodes.

Illustrative embodiments provide distributed catalog service functionality that includes multiple distinct advantageous aspects.

In some embodiments, the distributed catalog service is illustratively referred to as a "next generation" or NextGen Catalog. The innovative aspects in these embodiments include at least the following:

1. Next Generation Catalog Design: providing a distributed catalog service that is worldwide in scale, as well as model-driven, microservices-oriented and based on metadata and meta-resources.

2. Catalog Data Model: providing a class hierarchy and associated properties defined for the model.

3. Catalog Core Services: including decomposition of core services into multiple groups including security services, management services, access services and collaboration services.

4. Catalog Collaboration Services: providing an ability for catalogs to publish data to each other at scale.

5. Catalog Extended Services: providing additional services on top of the core services, including functionality for depicting how the catalog interfaces with other components of a catalog ecosystem.

6. Extended Management Services: including functionality for management of the catalog data model and of the catalog data, as a combination of core services, particularly as it pertains to the core management services. The core management services are illustratively extended in some embodiments in order to increase performance by bundling several management functions together into a service, and to increase readability of the code by delivering a single advanced management service that can perform several individual management functions. For example, a single extended management microservice can create two instances of different classes and build the relationship between them.

7. Inbound Integration Services (I-Integration Services): allowing the catalog to ingest data from components external to it.

8. Population Services: leveraging the I-Integration Services to ingest data and populate the catalog data.

9. Extended Access Services: allowing the core services to be combined to deliver advanced services to get content from the catalog data model and the catalog data. The access services are extended in some embodiments in order to increase readability of the code by delivering a single advanced access management microservice that can perform several individual access functions. For example, a single extended access microservice can traverse a designated sub-graph of the catalog data.

10. Outbound Integration Services (O-Integration Services): allowing the catalog to export catalog data to external components.

11. Persistency Services: leveraging the O-Integration Services to export and persist the catalog data to external components.

It is to be appreciated that the particular features and functionality listed above are examples only, and should not be construed as limiting in any way. Other embodiments can provide additional or alternative features and functionality in conjunction with implementation of a distributed catalog service.

Illustrative embodiments are advantageously configured to effectively track the data relevant within a particular context and to determine how the data can best be accessed. For example, an enterprise may need to track all the security logs related to capturing denial of access to servers, or a research medical center may need to track all the genomic files of patients suffering from autism, or an advanced manufacturing may need to track all the datasets coming from sensors in high voltage devices.

A distributed catalog service as disclosed herein can be configured to process the increasingly large volumes of data generated in IoT systems and numerous other information processing contexts. Moreover, the disclosed arrangements can readily accommodate distributed data as well as migration of data.

As indicated previously, illustrative embodiments are configured to track "things," where a given "thing" can include any item of interest or importance, from which value, monetary or otherwise, can be extracted. A "thing" has a set of properties or characteristics that can be used to classify or categorize it. These properties can be represented through metadata and they can be grouped in the context of a dimension. Consider, for example, a "thing" that is a dataset from which monetary value can be extracted through analytics. The dataset has a set of properties that specify, for instance, that the dataset contains a set of sequences of human genomes, collected by a specific sequencing machine, within the last two calendar years, and for patients suffering from early onset Alzheimer's disease. These properties can be represented via a set of metadata and they can be grouped under the dimension of life sciences.

The term "track" as used herein includes the ability to know, follow or reach a "thing." For example, tracking can be performed in conjunction with learning or becoming aware that the "thing" exists, obtaining access to the "thing" or otherwise reaching the "thing" through a well-defined access mechanism, and creating a trail of how the "thing" can be reached and a trail of how the "thing" was reached. The term "track" should not be construed as requiring data management.

The catalog in some embodiments is configured to track "things" based on metadata representative of their properties, using this metadata to discover the availability of "things" and to gain reachability to these "things." An instance of the catalog can directly reach "things" that are in access proximity to the catalog itself, or it can indirectly reach "things" through other catalog instances that are in access proximity to them.

Figure 11:
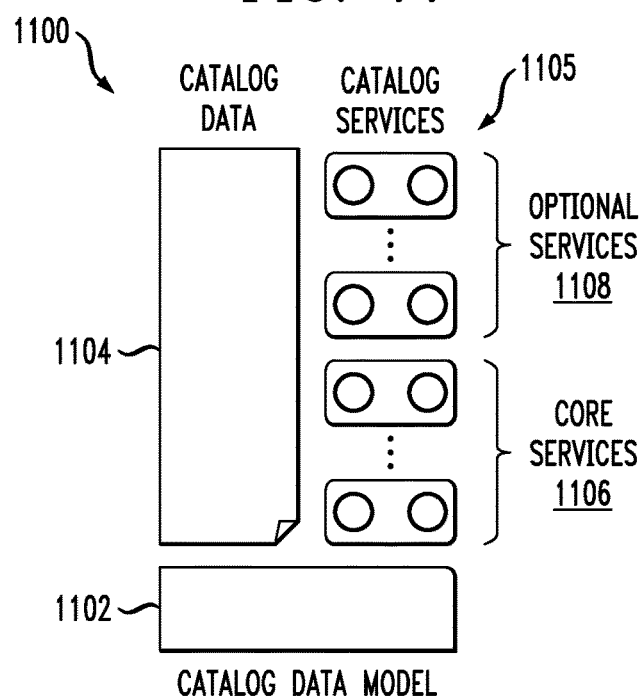
FIGS. 11 through 20 show examples of distributed catalog service arrangements in illustrative embodiments.

FIG. 11 shows an example of an instance of a catalog 1100 in an illustrative embodiment. The catalog 1100 in this embodiment comprises a catalog data model 1102, catalog data 1104, and catalog services 1105. The catalog services 1105 more particularly comprise core services 1106 and optional services 1108.

The catalog data model 1102 provides an abstract way to represent the "things" tracked by the catalog 1100 in a manner that is completely decoupled from the physical shape of the "things" or the specific format of how these "things" are embodied in their location. The catalog data model 1102 provides a unified and consistent method to represent, across all instances of the catalog, all "things" tracked.

The catalog data 1104 comprises a model-driven dataset containing information about the "things" the catalog knows about. The catalog data model 1102 provides an abstraction for the catalog data 1104 that is consistent across all catalogs, enabling inter-operability and exchange of data among catalog instances while hiding away the details of how the catalog data 1104 is populated or how the original data was represented.

The catalog services 1105 comprise sets of microservices that deliver functionality on top of the catalog data 1104, while remaining completely bound to all the definitions and constraints specified in the catalog data model 1102. A computing entity that implements the microservices of a given catalog in some embodiments is referred to as a catalog computing node, or simply a catalog node for short. In FIG. 11, a circle within catalog services 1105 represents an individual microservice and a rounded border rectangle within catalog services 1105 represents a set of microservices.

The information in catalog 1100, be it in the catalog data model 1102 or in the catalog data 1104, illustratively includes at least the following:

1. Operational or Administrative Information: related to all the data required for the catalog to function, including the catalog configuration data and information about the data zone itself. The catalog stores all this information in the catalog itself. This information allows the catalog to operate.

2. User or Practical Information: related to all the content the catalog tracks. This information is not mandatory for the catalog to operate, and it is acceptable for a catalog at a given point in time to track no "thing" at all.

The catalog components as illustrated in FIG. 11 provide a logical view of an example architecture of catalog 1100.

Figure 12:
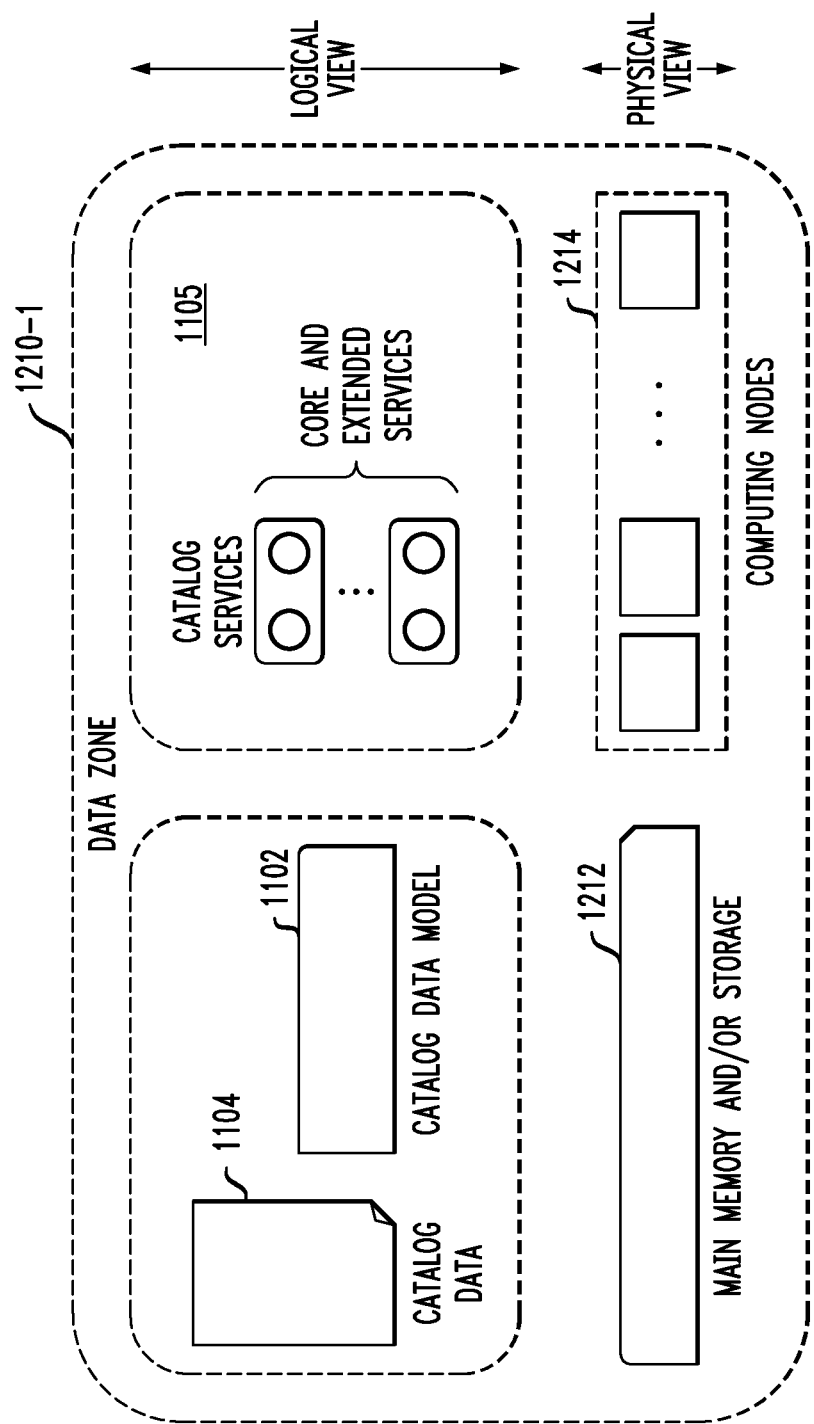

FIG. 12 depicts the logical view laid over a corresponding physical view. The catalog 1100 in this embodiment is implemented within a given data zone 1210-1 that includes main memory and/or storage 1212 and a set of computing nodes 1214. At the physical layer, main memory and/or storage 1212 is used to store the catalog data model 1102 and the catalog data 1104. For example, both the catalog data model 1102 and the catalog data 1104 may be completely stored in main memory, or completely stored in permanent storage as a file in a file system or as a set of objects in an object store. Various combinations of different types of storage may be used for different portions of the catalog information. For example, the catalog data model 1102 may be stored in a file and the catalog data 1104 stored in an object store. When the catalog data model 1102 and the catalog data 1104 are stored only in main memory, this information is periodically persisted to permanent storage. It is also possible in some embodiments to adopt an approach in which a given instance of the catalog starts with an empty catalog data model and empty catalog data, with these components eventually being initialized and populated, by catalog extended microservices, as it will be described in more detail below.

The computing nodes 1214 execute the catalog services 1105 as microservices or sets of microservices. The microservices may be embedded into containers, or into virtual machines, or may run on bare metal. The computing nodes 1214 are also referred to herein as catalog nodes, and may be viewed as examples of what are more generally referred to herein as "data processing nodes."

The physical components 1212 and 1214 that implement catalog 1100 reside within the confines of the data zone 1210-1. In other words, the instance of the catalog is bound by the perimeters of the data zone and any communications with outside data zone components are executed through specific microservices which implement the necessary protocols and the necessary levels of security to ensure that the communications are authorized.

The catalog 1100 is an example of what is also referred to herein as a "catalog instance." A distributed catalog service as disclosed herein is illustratively implemented using a plurality of catalog instances. A catalog instance typically comprises an implementation of a catalog within a physical environment, such as a set of computing nodes and associated storage, as in the embodiment of FIG. 12.

There is no limit on the number of catalog instances that can exist within the confines of a data zone. For example, a single data zone may have several instances of a catalog, where each catalog instance has been created to meet a different set of requirements, illustratively including one or more of the following:

1. Security: where each catalog serves a different purpose, be it a different set of users, tracking a different set of "things," or any other purpose. For example, a catalog may track a set of "things" with a very high degree of confidentiality so that only a very select group of users would be aware that the catalog or the data even exists. Other examples include providing some level of security when even the select group of catalog users does not have direct access to the data except through the catalog, and providing a selectable degree of data security, anonymization and obfuscation by the catalog owner.

2. Scope: where each catalog tracks a certain category of "things," limiting the range of "things" that should be tracked by it, and providing some level of semantic decoupling among the catalogs, where each one specializes in certain types of "things."

3. Scale: where each catalog tracks "things" within a certain geographical region.

4. Given dimension: where each instance of the catalog manages "things" that classify within a given dimension of properties, such as a dimension of being related to IoT, or a dimension of being related to a medical device, or a dimension of having any other kind of property. There may be several dimensions under which a given "thing" can fall. In this scenario, the same "thing" can be tracked by several different instances of the catalog.

A given instance of a catalog illustratively tracks a set of "things," and the "things" tracked by a catalog need not to be tracked by a single catalog only. In other words, a "thing" can be tracked by several instances of the catalog and a catalog can track many "things" that are tracked by other instances of the catalog.

Figure 13:
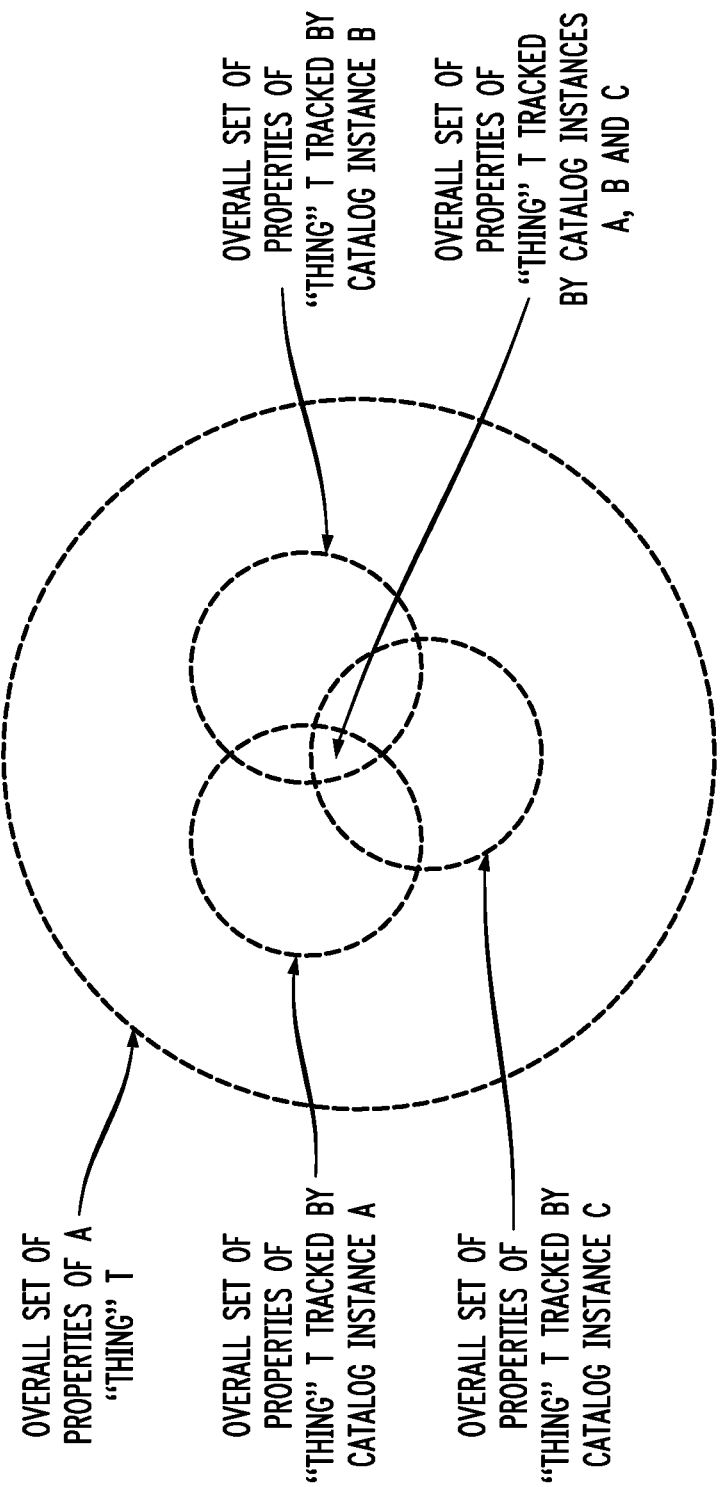

FIG. 13 illustrates an example of possible overlaps between different sets of properties tracked by respective different catalog instances denoted A, B and C. In this example, the large outer circle represents the overall set of properties that a given "thing" T has, and the three smaller inner circles represent the respective sets of properties of "thing" T that are tracked by the respective catalog instances A, B and C. It can be seen that there are several overlaps between the different sets of properties that are tracked by these catalog instances. Again, there are no limits or constraints on the number of instances of a catalog that tracks one or more "things" within a given data zone.

The catalog exists in the context of a broader ecosystem, where the components of this system are external to the catalog itself, but are still confined to the boundaries of the data zone in which the catalog resides. The elements in the catalog ecosystem can illustratively include one or more of the following:

1. Catalog Inbound Components: which contain information about a "thing" that can be or should be tracked by an instance of the catalog, where the instance of catalog and the inbound components reside within the confines of a single data zone. The information obtained from the inbound components is stored by the instance of the catalog within the catalog data and represented as per the specifications and requirements defined by the catalog data model. A component is an inbound component to a catalog only in the context a specific data zone. A component may reside in the same data zone as an instance of a catalog but not be an inbound component to the catalog itself. In other words, not all components residing within the context of a catalog in a specific data zone and that contain information about "things" need to be an inbound component to a given instance of the catalog in the data zone.

2. Catalog Outbound Components: which provide the ability to store information about a "thing" that is tracked by an instance of the catalog, where the instance of the catalog and the outbound components reside within the same boundaries of a single data zone. The information obtained from the catalog data model and from the catalog data will be stored by the outbound components, which may decide whether to represent the information based on the catalog data model or in any other form.

3. Catalog Users, Catalog Applications ("Apps") or Catalog Consumers: which interact with an instance of the catalog to query, create, change, or delete the content of the catalog data model or the catalog data, where the user, app or consumer and the instance of the catalog reside within the same boundaries of a single data zone.

Figure 14:
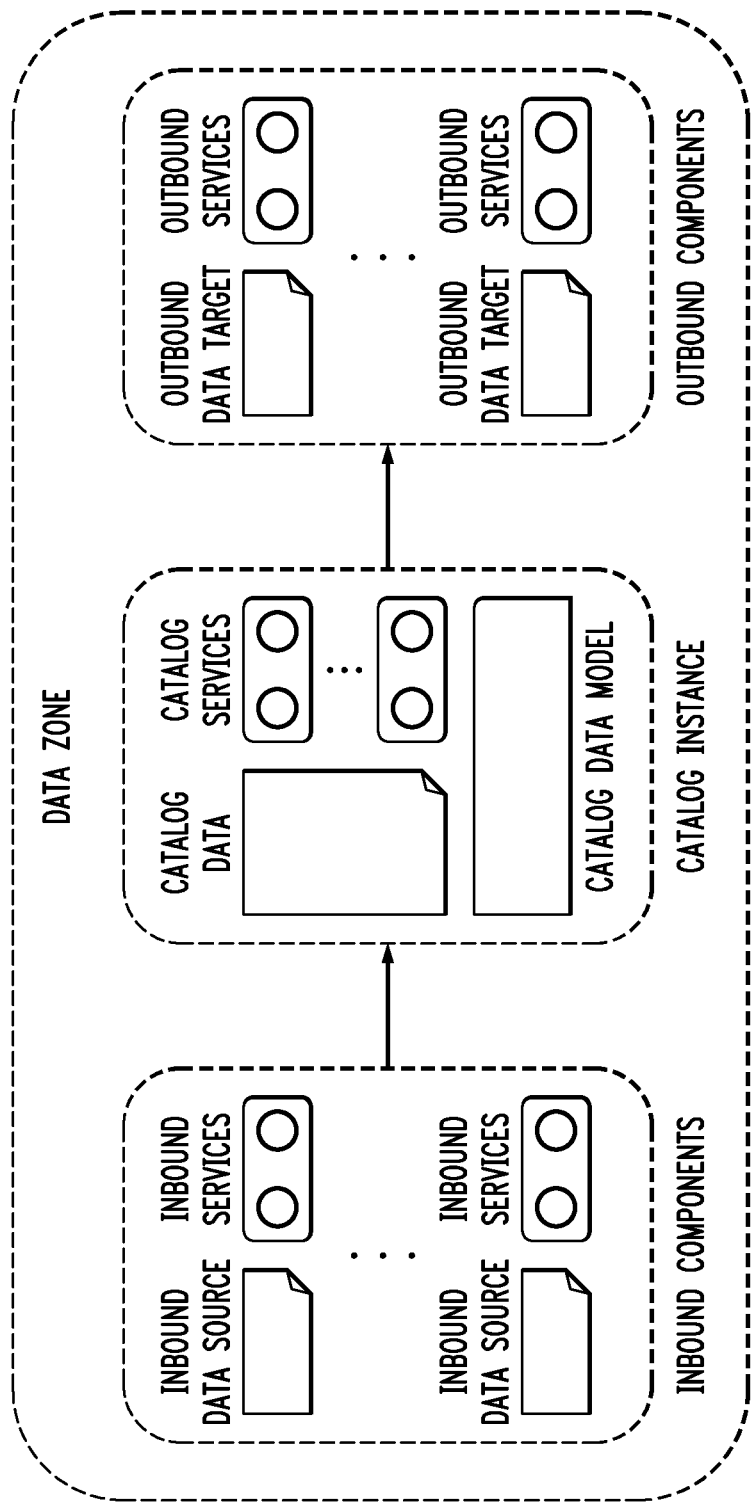

FIG. 14 shows a logical representation of a catalog ecosystem that includes inbound and outbound components within a given data zone. Each inbound component illustratively comprises an inbound data source, from which information will be extracted and imported into the catalog, and an inbound set of services that the catalog services use to communicate with and access the inbound data source. Similarly, each outbound component illustratively comprises an outbound data target where information coming from the catalog will be stored, and an outbound set of services that the catalog services use to communicate with and access the outbound data target. The same ecosystem component can in some cases be both an inbound component and an outbound component, as in the case of a multi-model database like ArangoDB or a graph database like Neo4j. For example, in an arrangement involving an ArangoDB database, a catalog instance could be instantiated and import its initial content for the catalog data model and the catalog data from the ArangoDB database, have the catalog data model and the catalog data expanded in content, and then persist the new updated content into the ArangoDB database, functioning in the latter case as an outbound component.

Figure 15:
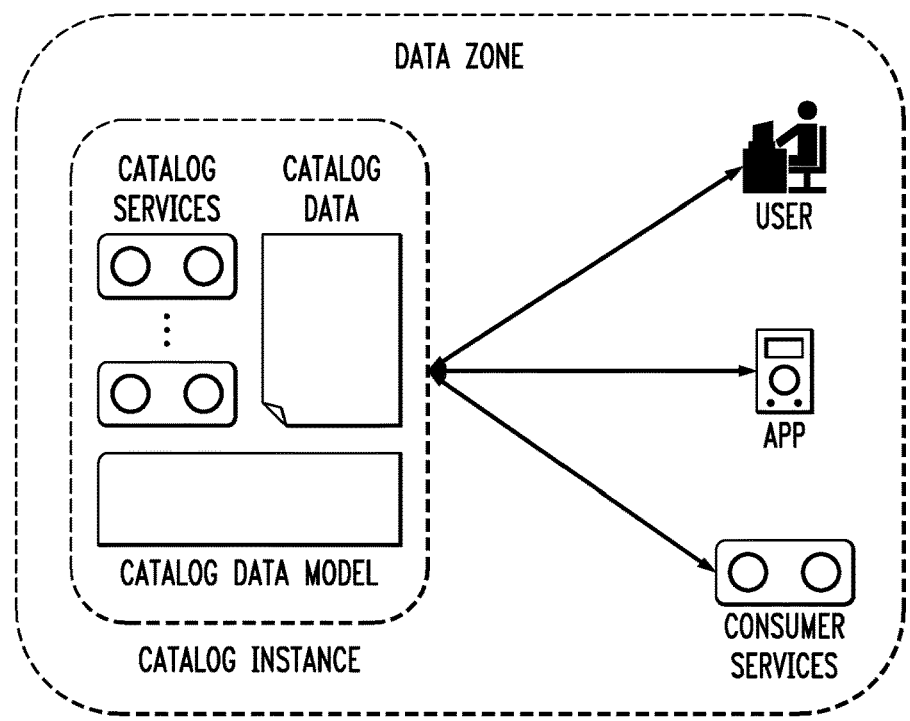

Referring now to FIG. 15, another logical representation of a catalog ecosystem within a particular data zone is shown. The catalog ecosystem in this embodiment comprises one or more users, apps, and consumer microservices each communicating directly with a catalog instance and its corresponding catalog services within the particular data zone. For example, a user may be utilizing a command line interface to interact with the catalog, an app may be interacting with the catalog to provide a graphical user interface to browse the content of the catalog data model and the catalog data, and a set of consumer services may interact with the catalog to provide additional services to other consumers.

Figure 16:
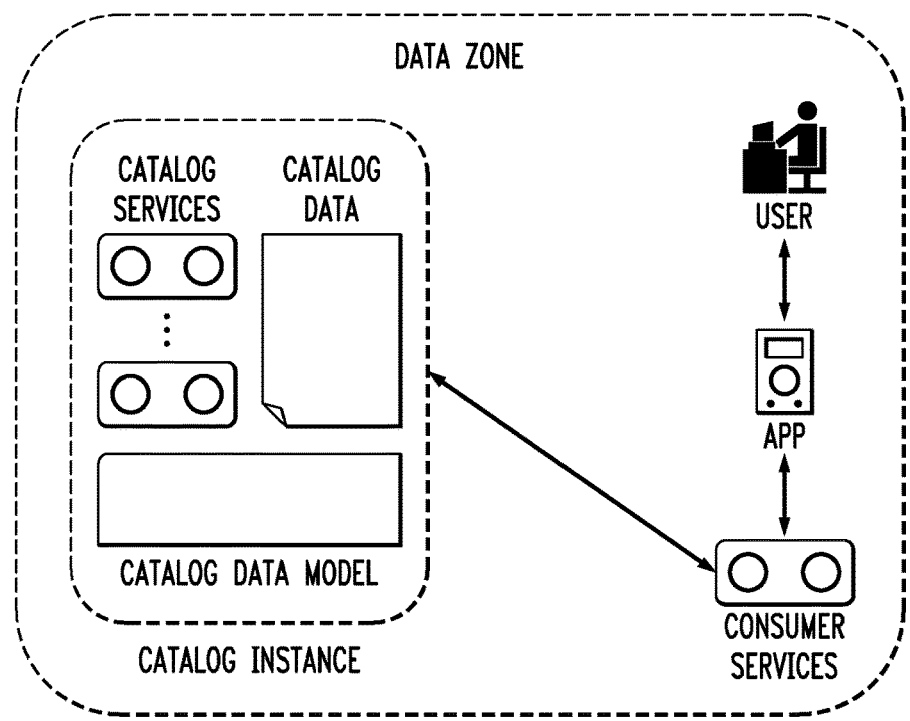

Another illustrative embodiment is shown in FIG. 16. In this embodiment, a user interacts with an app that was developed using consumer microservices, which in turn interact with the catalog services of the catalog instance within the particular data zone. The consumer services may have been defined as specialized services, offering functionality that makes it much easier for apps to interact with the catalog.

There are different types of agents, entities or "personas" that interact with the catalog. These different personas can be embodied as users, apps or consumer services, as described previously. The persona type generally determines the types of activities that can be performed by that persona in the catalog. Examples of different personas more particularly include one or more of the following:

1. Catalog Passive Users: which only have the ability to inquire information about the content of the catalog. These personas are restricted to the usage of the access microservices, but they do not have any authority to change the content of the catalog data model and the catalog data. Examples of passive user personas include a WWH distributed computing framework, as described previously herein, and outbound services, which have the ability to export information from the catalog to external entities.

2. Catalog Contributors: which have the ability to change the content of the catalog. In addition to having all the rights of the catalog passive users, these personas can make calls to the management microservices as well and actively change the content of the catalog components. Examples of catalog contributor personas include collaboration services, which illustratively provide an ability to exchange information between two instances of the catalog residing in different data zones, and inbound services, which have the ability to import data from external entities into the catalog.

3. Catalog Administrators: which have the ability to determine how the catalog initializes, how it can be provisioned, and how it can be configured, including the functions described below. For example, a catalog administrator can define how a given instance of the catalog behaves and collaborates with other instances of the catalog. In some implementations of the catalog, parameters used by the catalog administrators may be passed as environment variables, or via catalog content that will be stored in highly secure data sources and imported into the catalog during initialization. Examples of functionality performed by catalog administrators include inbound services configuration defining how inbound services should be utilized by the catalog, outbound services configuration defining how outbound services should be utilized by the catalog, and provision of configuration information specifying the manner in which a configuration information portion of the catalog content will be initialized.

The inbound services configuration may more particularly include one or more of the following:

1. Catalog Initialization: relative to the inbound services that will be utilized to initialize a catalog.

2. Catalog Update: relative to the inbound services that will be utilized to update the content of the catalog.

3. Catalog Refresh Period: relative to how often the content of the catalog should be updated, in terms of catalog data model and catalog data.

4. Catalog Population Operating Mode: relative to the specific manner in which catalog microservices will function with respect to how and when the catalog content gets initialized and updated.

The outbound services configuration may more particularly include one or more of the following:

1. Catalog Persistency: relative to the outbound services that will be utilized to save the content of the catalog on permanent storage. At one extreme, there may be a variety of outbound services, where the entire catalog content may be replicated on all of them, or, at the other extreme, there may be a different outbound service that will be utilized for each specific portion of the catalog content, such as the catalog data model, and specific classes and properties of the catalog data.

2. Catalog Update: relative to the outbound services that will be utilized to export updates to the content of the catalog. At one extreme, the entire content may be exported or saved externally every time a change occurs, or, at the other extreme, only the updates may be exported and it is the obligation of the outbound store to merge the updates with the previous content.

3. Catalog Refresh Period: relative to how often the content of the catalog should be exported or made available to the outbound services, in terms of catalog data model and catalog data. In one scenario, a notification may be sent to the outbound services every time the content changes, and in another scenario, a timer can be used where every time it expires, the differences are sent.

4. Catalog Population Operating Mode: relative to the specific manner in which catalog microservices will function with respect to how and when the catalog content gets initialized and updated.

The services offered by a catalog can be classified into core and extended services. In some embodiments, different catalog implementations differ on the set of extended services, but all catalog implementations offer all of the core services.

The core services may therefore be viewed as illustratively comprising sets of mandatory microservices delivering basic and foundational building blocks, on top of which other microservices can be built.

Figure 17:
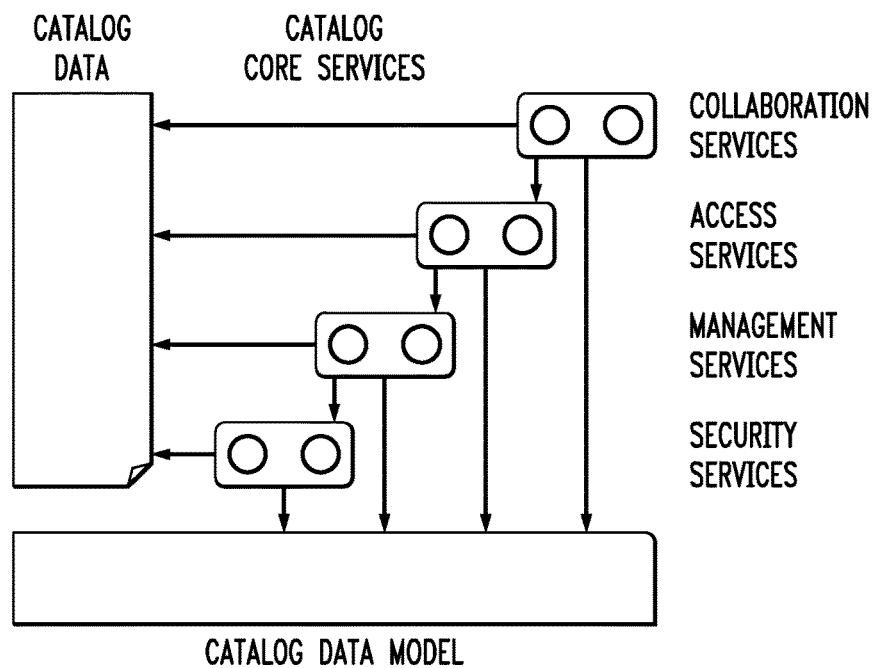

FIG. 17 shows examples of catalog core services, including the following:

1. Security Services: controlling all access to the catalog data model and to the catalog data. No other service, be it core or extended, can access the catalog data model or the catalog data without first passing through the security services to authenticate the request, which also generates an entry in a security log.

2. Management Services: providing administration, configuration and provisioning functions, including the ability to add, delete, and change entities in other components of the catalog. The management services illustratively include management services for the catalog data model, which provide a mechanism to manage the data model itself, by adding, deleting and updating classes and their properties including relationships and attributes, and management services for the catalog data, which provide a mechanism to manage the catalog data itself, by adding, deleting, and updating instances of the classes defined in the catalog data model and by changing the value of their properties, including adding and deleting relationships between instances and changing the value of a particular attribute.

3. Access Services: providing a mechanism to query the content of the other components of the catalog without having the ability to change that content. The access services illustratively include access services for the catalog data model, which provide a mechanism to access the content of the data model itself, including the ability to view which classes have been defined, how these classes are related from an inheritance hierarchy perspective, and properties of these classes, and access services for the catalog data, which provide a mechanism to access the content of the data in the catalog, including the ability to view the instances of the classes, the relationships they have and the value of their properties.

4. Collaboration Services: providing a mechanism for catalog instances to publish metadata about the "things" they track, allowing one catalog instance to learn about "things" tracked by other catalogs.

Figure 18:
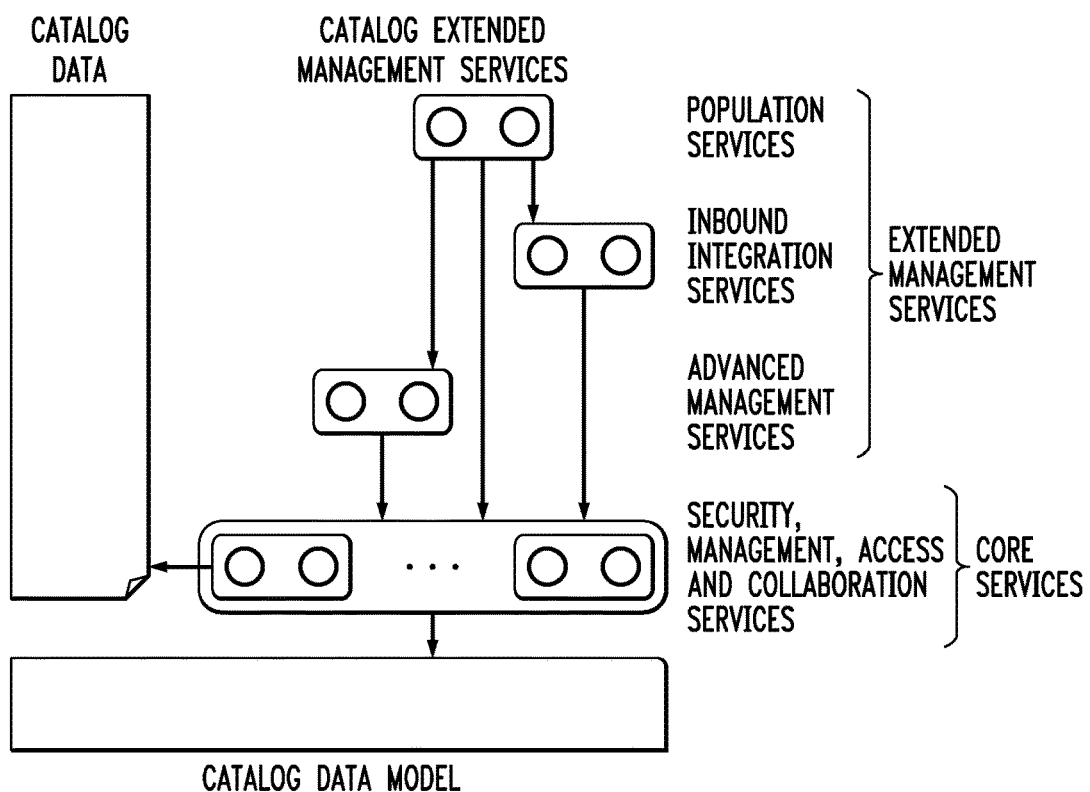
Figure 19:
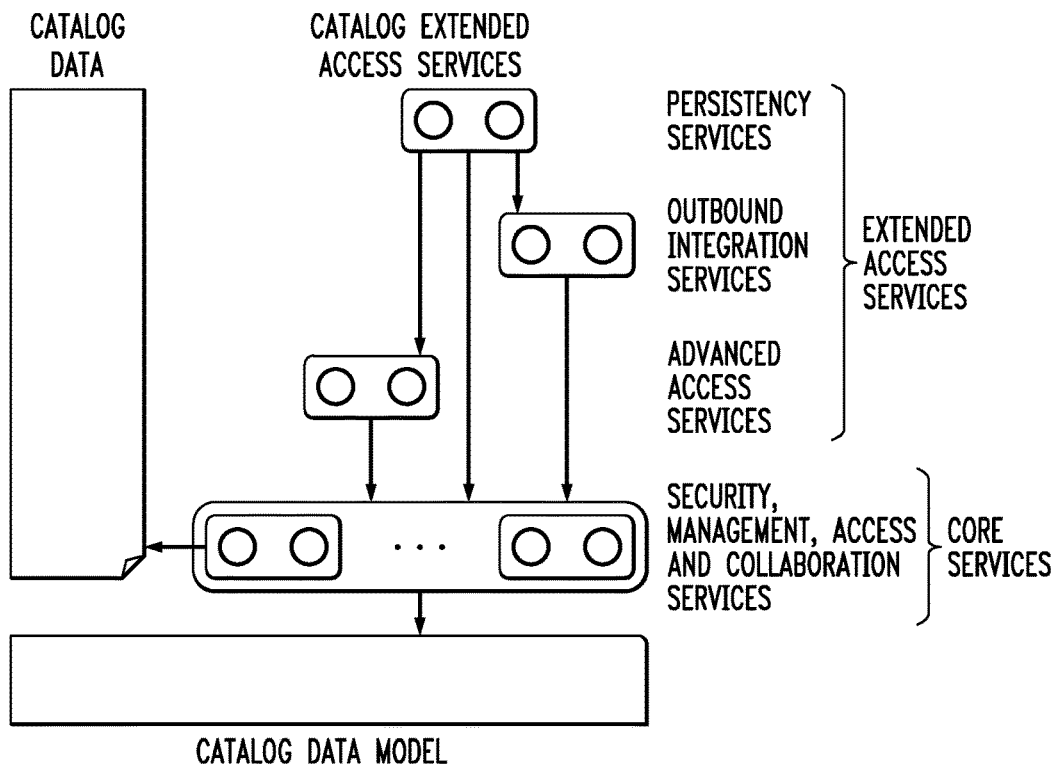

FIGS. 18 and 19 show examples of catalog extended services, including extended management services and extended access services, respectively.

The extended services generally provide additional services on top of the core services. The selections of relevant or important extended services are dependent on the particular use case, and may vary greatly between different deployments of the catalog. For example, a catalog may be used to provide a coherent account of all people residing in a given state in the United States, maintaining a record of their most current address. In this scenario, one the extended services offered by the catalog can be populationCount service where, given a postal zip code within the state, the service returns the number of people with addresses in that zip code.

Extended services for management provide a set of advanced microservices that facilitate the creation, deletion and changes to the catalog data when larger amounts of data need to be modified. Common use cases for these advanced services include the need to create several instances of the same class, as one does in the process of creating the content of the catalog from an external source, such as importing data from a metadata management system as an iRODS system, or from a database, into the catalog data.

For example, consider an illustrative embodiment involving an external database with a table $table_i$ that represents the result of a join between two other tables. Assume that there are two columns in the table $table_i$, one referred to as $field_1$ and the other as $field_2$, represented as $table_i=(field_1|field_2)$. The intent is to import data from this table, where for each row in the table, there will be the creation of an instance of the class $class_1$ to represent the value of $field_1$, an instance of the class $class_2$ to represent the value of $field_2$, and a relationship r between the two instances just created. In this particular embodiment, the microservice Catalog_importTable($table_1$,$field_1$,$class_1$,$field_2$,$class_2$,r) would result in the creation of the catalog data explained above.

Extended services for access provide a set of advanced microservices that facilitate the access to the catalog data when larger amounts of data need to be retrieved or traversed. Common use cases for these advanced services include the need to get persist the data from the catalog into external data storage, such as a file or a database, and the need to traverse several layers in the catalog data graph, going from a given node in the graph to another node that is several hops removed from the given node.

For example, consider an illustrative embodiment in which a node in a graph representation of the catalog represents a "thing" $t_i$ that has a relationship r to another "thing" $t_{i+1}$, that in turn has a relationship to another "thing" $t_{i+2}$, and so on, until this chain reaches a "thing" $t_{i+m-1}$ that has a relationship with a "thing" $t_{i+m}$ that does not have any relationship r with any other "thing." In this particular embodiment, given a "thing" $t_i$ and a relationship r, the extended microservice Catalog_lastInChain would return the furthest "thing" in the chain that can be followed through the relationship r. More specifically, for the chain as described above, Catalog_lastInChain($t_i$,r)=$t_{i+m}$.

FIG. 18 depicts specific examples of sub-categories of the catalog extended management services, which include the following:

1. Advanced Management Services: providing a set of microservices that facilitate executing a sequence of several management functions, such as doing the creation of instances of a class in bulk, or a short cut to a sequence of functions that often need to be executed one after the other, like creating two instances and the relationship between them.

2. Inbound Integration Services: providing a mechanism to import data from entities external to the catalog into the catalog data model and the catalog data. This set of microservices focuses on the specific details and intricacies of the integration with the external source. It is important to notice that the design of the catalog also makes provision to extending, dynamically, the set of classes, relationships and properties present in the catalog data model, making it possible to import a data model from the outside.

3. Population Services: to provide a model-driven algorithmic approach to populate the catalog data model and the catalog data with information from the outside. This set of microservices focuses on the methodology of populating the catalog components, given that the information currently resides in an external source. More specifically, it can include microservices for populating the catalog data model. For example, given that an external data source offers a way to get a list of classes and the classes from which these classes inherit from, a list of relationships these classes may have, and a list of properties defined for these classes, a microservice for populating the catalog data model can be configured to traverse such lists and to call catalog core management services to extend the catalog data model. Such a microservice can use the inbound integration services to connect to an external source and get this information, and can use the catalog core management services to extend the catalog data model. As another example, population services can include microservices for populating the catalog data. For example, given that an external data source offers a way to get a list of instances of a given class, and their relationships and properties, this microservice can iterate over all the classes in the catalog data model, and for each one of them, obtain from the external data source the instances of that class and their properties. This microservice can also use the above-described microservice for populating the catalog data model to first extend the catalog data model with the classes defined by the external data source, and can use the catalog core management services to extend the catalog data, creating instances and relationships, and setting properties to the values obtained from the external data source.

FIG. 19 depicts specific examples of sub-categories of the catalog extended access services, which include the following:

1. Advanced Access Services: providing a set of microservices that facilitates executing a sequence of several access functions, such as obtaining all instances of a given class in a bulk operation, or a short cut to a sequence of functions that often need to be executed one after the other, like traversing a series of relationships to find an instance that is some relationships removed from another.

2. Outbound Integration Services: providing a mechanism to export data from the catalog data model and the catalog data to entities external to the catalog. This set of microservices focuses on the specific details and intricacies of the integration with the external source.

3. Persistency Services: providing a model-driven algorithmic approach to obtain information from the catalog data model and the catalog data and store this information into external data storage. This set of microservices focuses on the methodology of traversing and extracting information from the catalog components, in a programmatic manner, and exporting this information to an external storage, possibly leveraging the outbound integration services to integrate with a repository outside the boundaries of the catalog. For example, persistency services can include persisting the catalog data model by providing a programmatic way, leveraging the catalog core access services, to obtain, from the catalog data model, the list of classes, relationships, and all the other properties defined for these classes. Then, these microservices leverage the outbound integration services to store this information in an entity external to the catalog. As another example, persistency services can include persisting the catalog data. Given that the advanced access services offer a way to get a list of instances of a given class, and their relationships and properties, the microservice for persisting the catalog data can iterate over all the classes in the catalog data model, and for each one of them, obtain from the catalog all the instances of these classes, their relationships and properties, and store all this information in an entity external to the catalog.

As indicated above, the catalog in illustrative embodiments is a model-driven, strong typed catalog. The catalog data model defines and determines how the information stored in the catalog data will be represented and presented to any component outside the catalog but within its ecosystem.

The catalog core management services are the services responsible for enforcing the model-driven principle and ensuring that the catalog data are indeed strong typed, as defined by the catalog data model.

Figure 20:
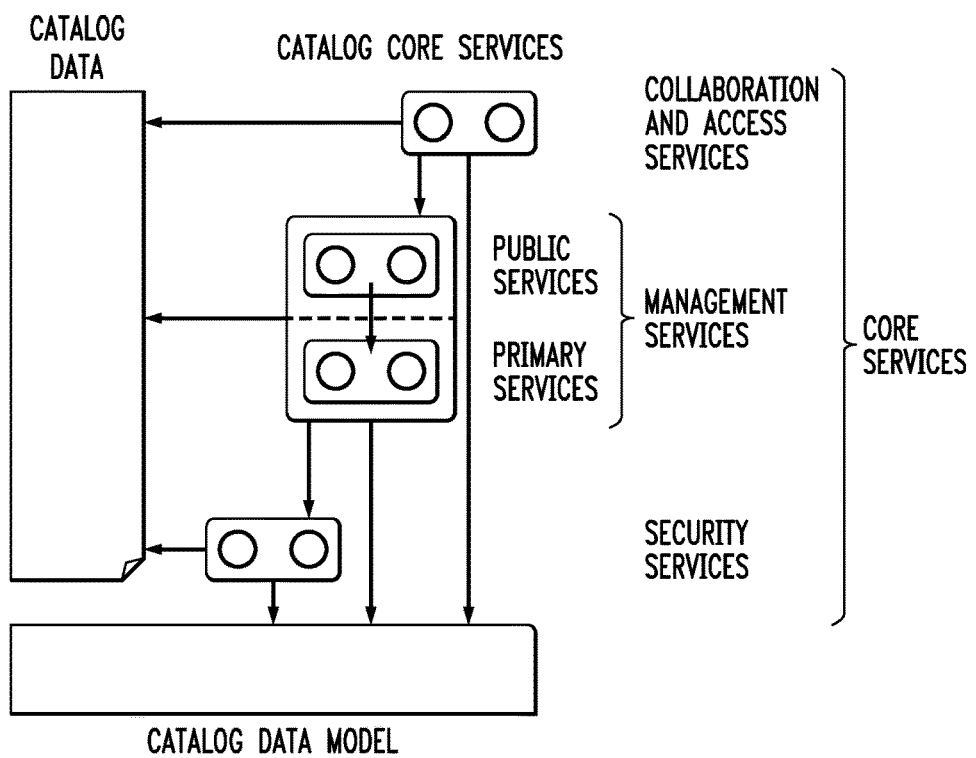

FIG. 20 shows an illustrative embodiment in which the catalog core management services are classified into the following categories:

1. Primary Services: including all the management microservices that interact with the physical entities where information is stored, such as main memory or a physical disk. These are the microservices that ultimately change the content of the catalog data model and the catalog data. These services are not exposed to the entities external to the catalog, but only to other services within the catalog management services. These microservices perform no check on compliance of the services with the catalog data model. Instead, they simply execute the services.

2. Public Services: including all the management microservices that encapsulate the primary services in services that can be safely exposed to the entities external to the catalog. These are the microservices that enforce that all the data in the catalog is strong typed, as defined in the catalog data model.

This division of management microservices into two groups decouples the services that interact with the physical world, from the services that enforce the strong typing. The primary services represent the minimal set of services required to interact with the physical world and, as a result, the only set of microservices whose implementation changes when the underlying technologies change. For example, if one implementation of the catalog uses an ArangoDB database to store the catalog data model and the catalog data, and a subsequent implementation of the catalog uses a Neo4j database, the only microservices that need to be ported into Neo4j are the catalog core management primary services. In contrast, the public services contain all the logic necessary to enforce strong typing of the catalog data, as per the specification in the catalog data model.

One possible example of a management microservice is a management microservice insertRelationship(relation, $class_1$, $instance_1$, $class_2$, $instance_2$) that creates a relationship called relation between $instance_1$ of $class_1$, and $instance_2$ of $class_2$. In order to enforce strong typing and the consistency of the catalog data model, this microservice can only succeed if the following conditions are met:

1. The catalog data model defines: a class called $class_1$, a class called $class_2$, and a relationship from $class_1$ to $class_2$ with a cardinality $c_{12}$.

2. There exists in the catalog data an instance of $class_1$ named $instance_1$ and an instance of $class_2$ named $instance_2$.

Furthermore, if the cardinality $c_{12}$ is one, meaning that only one instance of the class called $class_1$ can be connected to a single instance of the class called $class_2$, and if there is already a relationship between the instance named $instance_1$ and the instance $instance_2$, this existing relationship is deleted.

The catalog management services implement this scenario using a public service insertRelation( ): which performs all the logic explained above and, if and only if all the conditions are met, it calls the primary service catPrimary.insertRelation( ): which performs the actual change in the physical memory to save the change in the relationship.

A similar design approach can be used for other management functions, with the strong typing being contained in the public services, while the private services perform the final change in the physical memory.

In some embodiments, the catalog core services are the only services that interact directly with the catalog data model and the catalog data components, and all other microservices interact with the catalog data model and the catalog data through the catalog core microservices. This separation of concerns and access provides another layer of security and protection ensuring that the catalog data model and the catalog data are only accessed by the core services, which can be designed to have special administrative privileges and are the components that together will ensure that all policies are enforced.

Among the core services, there may be a hierarchical dependency, from bottom to top. In other words, the most primary services are the security services, upon which all other services depend. Next, the management services provide a mechanism to change the content of the catalog data model and of the catalog data, leveraging the security services. The access services leverage the management services in order to provide accessibility and visibility to the catalog data model and to the catalog data, always leveraging the security services in order to comply with all access policies. The catalog collaboration services leverage the access and management services to publish to other catalog instances metadata about the "things" tracked by their corresponding catalog instance, and to receive from other catalog instances publications about the "things" they track.

The access and management services may be extended for a number of reasons. For example, such services can be extended to increase readability of the code by delivering a single advanced access management microservice that can perform several individual access functions. As a more particular example, a single extended access microservice can traverse an entire sub-graph of the catalog data. It is also possible to increase performance by bundling several management functions together into a single service. In this case, the compiler or the development environment can automatically optimize and lock in usage of the memory once, perform all functions, and then release the lock only after all functions have been concluded. As another example, readability of the code can be increased by delivering a single advanced management service that can perform several individual management functions. For example, a single extended management microservice can create two instances of different classes and build the relationship between them.

Each instance of the catalog may implement the catalog services, be it either core or extended services, in a different way, using different approaches, or different underlying resources. This is an advantage of a microservice-based architecture, where the set of microservices remains consistent, in terms of the interface and the data model of the information returned, while the implementation of the particular service is adaptable to meet the requirements and capabilities of the specific computing nodes where the services will run and of the overall ecosystem of the catalog, including data sources for the catalog itself and different ways in which the information can be persisted.

A given catalog instance can be implemented using any of a variety of population arrangements along a spectrum of operational modes from lazy to eager, as will now be described in conjunction with FIGS. 21 and 22. Such arrangements vary the manner in which an instance of a catalog is implemented relative to how much content it stores and maintains in its catalog data model and in its catalog data at a given time, how and how often that content is updated from external data sources, and how and how often that content is persisted to external data sources.

Figure 21:
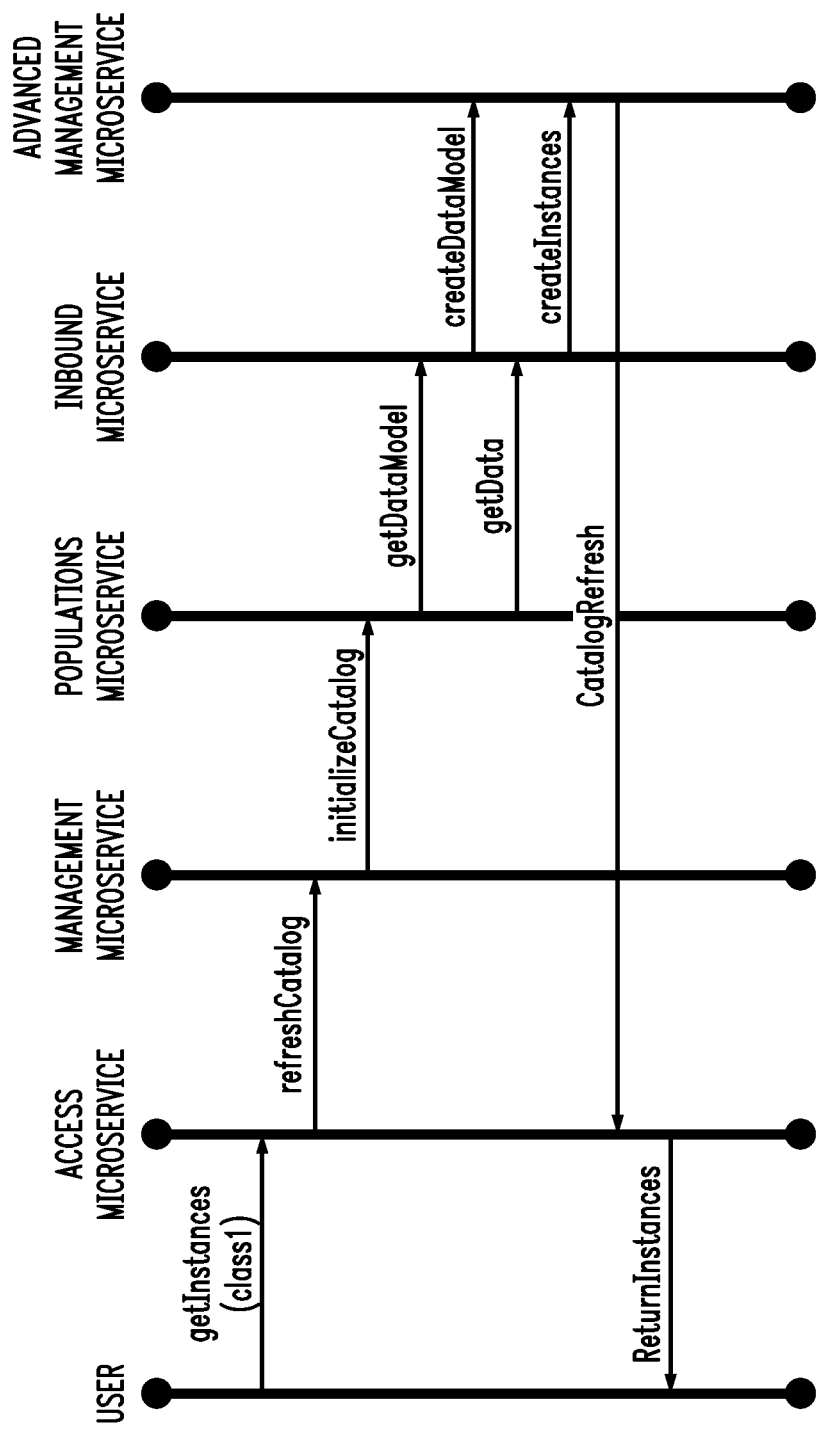
FIGS. 21 and 22 show examples of respective lazy and eager implementations of a distributed catalog service in illustrative embodiments.

FIG. 21 shows an example of a lazy implementation of a distributed catalog service in an illustrative embodiment. In a lazy population arrangement of this type, the catalog stores no data at all in its catalog data, and perhaps even no content at all in its catalog data model. The catalog instead waits until one of its microservices is called, before the catalog data model and the catalog data are populated.

For example, consider the first time a call is made to the catalog access microservice getInstances to get all the instances of a given class $class_1$, as depicted in FIG. 21. In this embodiment, first a user makes a call to one of the catalog core access microservices named getInstances ($class_1$). Next, this microservice makes a call to a catalog core management microservice named refreshCatalog( ), which checks whether the content in the catalog is current or not.

In this case, the content in the catalog has never been initialized. As a result, the catalog makes a call to the catalog extended population services initializeCatalog( ) which will populate the catalog, knowing that there is no pre-existing content. The fact that there is no previous content helps the initializeCatalog( ) microservice to make a couple of optimizations in its execution. For instance, before creating an instance of a class, it need not check whether the instance already existed before or whether the properties of the new instance conflicted with the value of the properties of the old existing instance, and it need not resolve any conflicts if it did. The initializeCatalog( ) microservice checks for a set of environment variables to decide on the set of inbound data sources it can draw upon to populate the catalog. There is no limit on the number of inbound microservices it can call. Also, the order in which these inbound services are called is determined by environment variables, allowing the catalog population to be highly configurable by catalog administrators to adapt to the conditions of the environment. The order in which the inbound services are called is important because different inbound services may have information about the same "thing." In some cases, the information coming from different inbound sources may overlap and conflict, such that a decision needs to be made as to who has the most trusted and up-to-date information about the "thing." Catalog administrators can also decide through environment variables which inbound sources hold the status of the most authoritative source.

Figure 22:
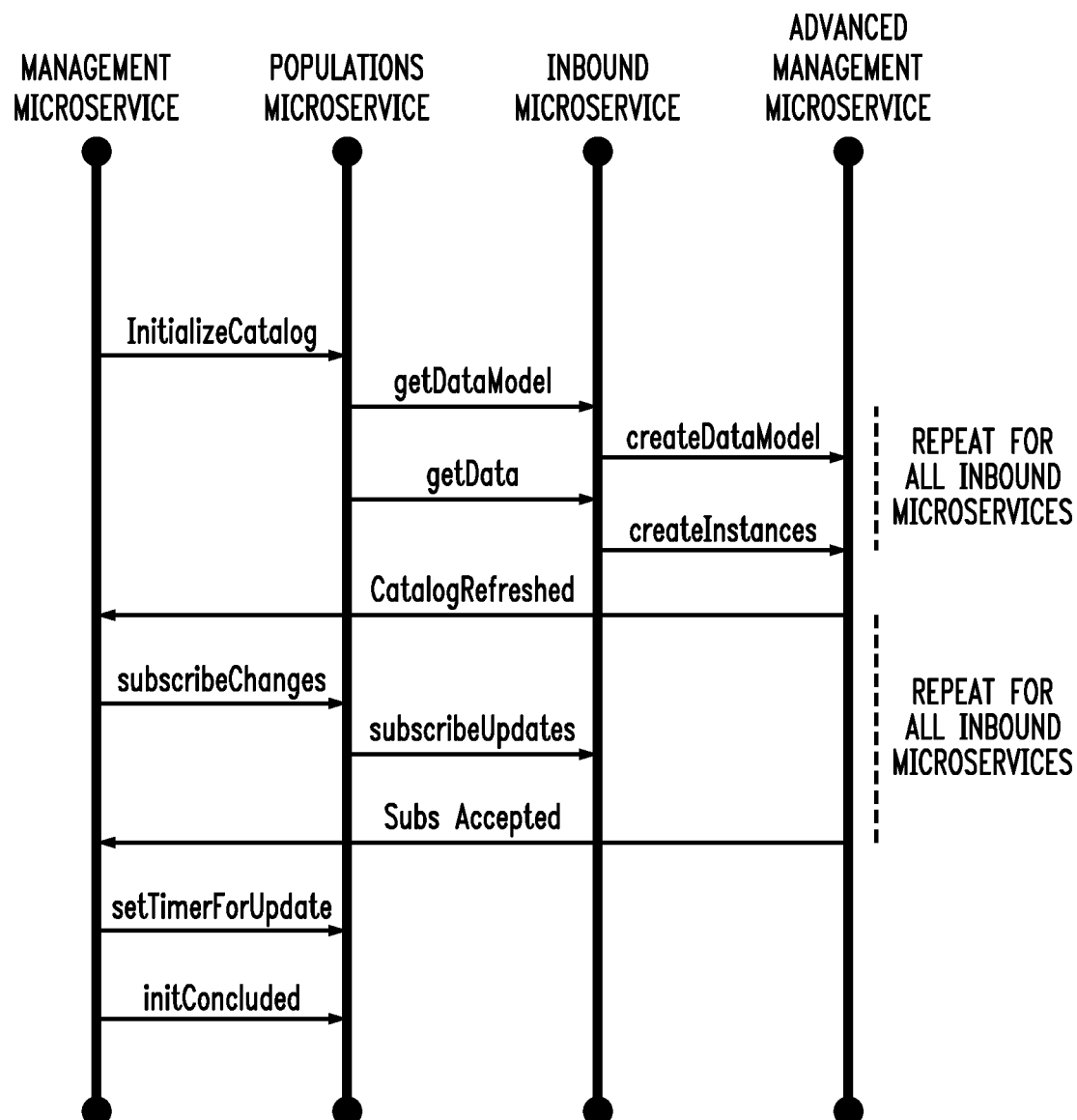

FIG. 22 shows an example of an eager implementation of a distributed catalog service in an illustrative embodiment. In an eager population arrangement of this type, the catalog stores all the content, at all times, in its catalog data and in its catalog data model. In other words, the catalog holds the most updated information on all the "things" it tracks. In this scenario, as soon as an instance of the catalog initializes, it actively calls all the inbound services that have been configured for that catalog instance to import all the information available from all the inbound data sources into the catalog. In addition, the catalog also subscribes to be notified by the inbound services whenever the information changes, as long as these services are made available by the inbound services. The catalog administrators also set a catalog content update time interval and, periodically, whenever the time interval expires, the catalog pro-actively connects to the inbound services to get an update or another snapshot of the contents in the inbound data sources.

For example, consider the initialization sequence depicted in FIG. 22 where the catalog first calls for the initialization function as defined before, then subscribes to all inbound services to receive notifications when changes occur, and finally sets a timer so that it periodically wakes up and requests an update. In this mode of operation, the implementation of the catalog access microservices can be implemented in several different ways relative to the perceived "freshness" of the content in the catalog with respect to the proximity to the periodic updates, including one or more of the following:

1. Optimistic: where it assumes that the content of the catalog is always the most updated and, as a result, it only needs to consult the catalog data to return the latest value. In this scenario, the catalog may be within milliseconds to the expiration of the next content update time interval, which could bring changes to the values returned. On the other hand, this implementation provides the best performance in response time.

2. Pessimistic: where it assumes that the content needs to be refreshed. As a result, it immediately requests a refresh, resets the timer, and only then honors the request.

3. Semi-Optimistic: where it assumes that the content of the catalog is the most updated only if the expiration of the next content update time interval will not happen within a pre-defined time interval, defined as the distance to the expiration of the content update time interval. If, from a timing perspective, the catalog content is distant from being updated, it behaves as the optimistic mode of operation and the value is returned immediately. Otherwise, it forces a refresh and it behaves as the pessimistic mode of operation, where an update is issued, and, only after the catalog is updated, the value is returned.

Other embodiments representing alternatives to the lazy and eager implementations of respective FIGS. 21 and 22 include a time-bound lazy implementation, which behaves in the same way as the lazy implementation up until the first time the catalog is initialized. Once the catalog is first initialized, it then sets a time stamp to capture the freshness of the content. From that time on, when a request is made, it checks whether the content of the catalog is fresh enough to honor the request without an update, by comparing the time elapsed since the initialization with a time limit set in an environment variable. If the content is considered still fresh, it returns the value as is in the catalog content. Otherwise, it erases all the catalog content and requests another initialization.

The implementations may additionally or alternatively vary along with other variables, including one or more of the following:

1. Granularity of the Catalog Content Update: which defines which portions of the catalog can be independently revised without requiring that all of the catalog content be checked. For example, in some implementations, it may be possible to change the properties of a single instance and the relationships of a subset of instances without revising the entire catalog.

2. Granularity of the Number of Inbound Services to be Checked: which defines whether or not information can be imported from a specific inbound service without requiring that information from other inbound services also be imported. This requirement has to do with the degree of independence that each inbound source has with respect to instances of the catalog. For example, in one scenario, the sets of "things" that each inbound service has information on does not overlap with the set "things" that other inbound services have information on. In other scenarios, the inbound services may all have different types of information about the same set of "things" and the catalog may require that all inbound services be consulted before a more complete picture of these "things" be built.

3. Granularity of the Update Time Interval: which defines how long it takes to update the catalog. Of course, the granularity of the update time interval is a function of the granularity of the previous items as well, but it determines the frequency at which the catalog can be updated and it also determines how much of a real-time or high performing entity the catalog can be.

The number of variations among lazy and eager implementations are infinite, can vary broadly, may be highly influenced by the specific capabilities of the physical environment in which the catalog will be instantiated, and may need to comply with specific requirements of particular use cases.

As described above, a given instance of a catalog maintains metadata about "things" the catalog tracks. Catalog data contains information about "things" that can be accessed in one of two ways:

1. Directly: in which case the "thing" itself is in access proximity to the catalog itself. In other words, the "thing" resides in the same data zone as the computing node or nodes where the catalog microservices are running.

2. Indirectly: in which case the "thing" itself is not in access proximity to the catalog itself, but, instead, the "thing" is in close proximity to another instance of the catalog. In other words, the "thing" resides in the data zone of another catalog.

Some embodiments provide a domain of catalogs that allows instances of a catalog to learn about the existence of other catalogs with the purpose of expanding the number and reach of "things" that a catalog can track.

More formally, a domain of catalogs, or, simply, a domain D, is a set of catalogs $D=\{c_1, c_2, \ldots, c_n\}$, where every catalog $c_i \in D$ in the set has the ability to track "things" that can either be accessed directly by $c_i$ itself, or can be accessed directly by another catalog $c_j \in D$, and therefore, can be indirectly accessed by $c_i$. When a catalog $c_i$ tracks or has the ability to track "things" that are not in access proximity to it but, instead, are in access proximity to another catalog $c_j$, the two catalogs $c_i$ and $c_j$ are said to belong to the same domain. A catalog instance in one embodiment can belong to a single domain or to several domains, as along as the domains share the same set of security and management restrictions. A given domain can contain other domains, in which case all the catalog instances in the other domains are automatically members of the given domain.

In some embodiments, all the components of the catalog, as well as all of the entities in the ecosystem that the catalog interacts with, are confined within the boundaries of the data zone. Within the context of the catalog, communications that transcend the boundaries of a data zone are encapsulated within the catalog extended management services for collaboration, which implement protocols for communication between instances of the catalog. Illustrative embodiments support collaboration services between two instances of a catalog but can be easily and naturally extended for collaboration among a group of catalogs. Group collaboration services are particularly relevant when underlying transport protocols provide multicast and broadcast mechanisms that increase the efficiency of group communications.

The set of catalog communication protocols implemented by the collaboration services provides a mechanism for an instance of a catalog to provide information to another instance of the catalog. For example, the information can be about the instance of the catalog itself, about the "things" the catalog tracks, or about other "things" that the catalog knows are tracked by other catalogs.

Figure 23:
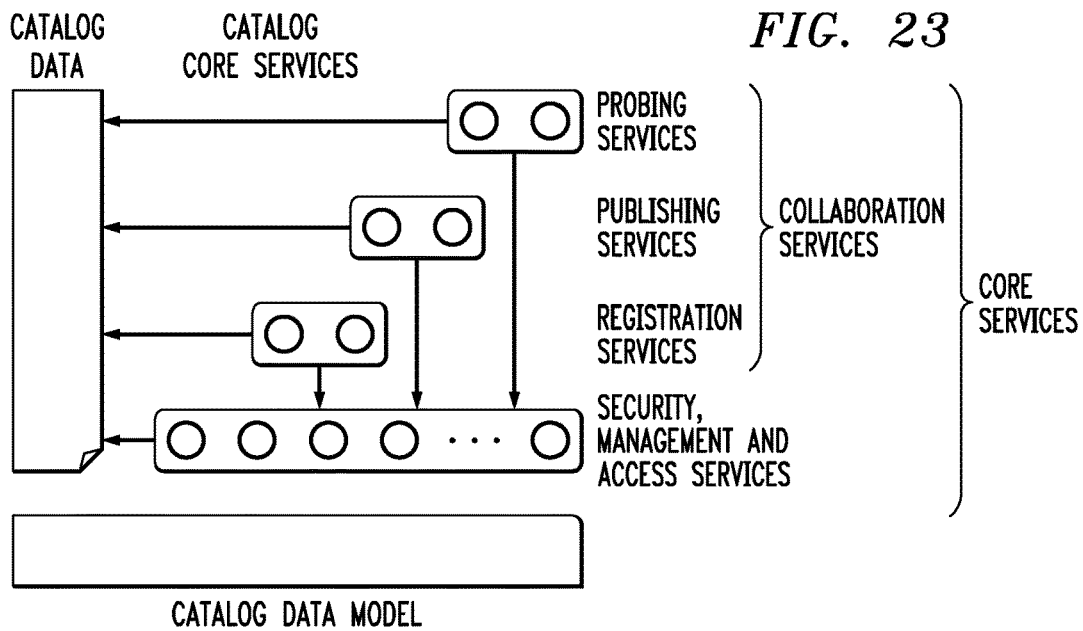
FIG. 23 shows example collaboration services of catalog core services in an illustrative embodiment.

FIG. 23 shows examples of catalog core collaboration services in an illustrative embodiment, including the following:

1. Registering Services: providing a mechanism for a catalog instance to inform another catalog instance about its existence, and for catalog instances to join and become members of the same domain.

2. Publishing Services: providing a mechanism for a catalog instance to advertise to another catalog instance, in the same domain, on the types of "things" that it tracks.

3. Probing Services: providing a mechanism for a catalog instance to make queries to other catalog instances about the types of "things" it tracks.

Each of these different types of collaboration services will be described in more detail below.

Initially, various aspects of registering services will be described with reference to FIGS. 24 through 32.

Registering services make it possible for an instance of the catalog to make another instance of the catalog aware of its existence, accessibility, and availability as a source of information about "things." By default, the registration relationship benefits from the principle of reciprocity in the sense that when a catalog instance $c_j$ registers with a catalog instance $c_i$, automatically, as part of the registration protocol, $c_i$ is also registering with $c_j$. In other words, each of the two catalog instances knows about the existence of the other.

In some embodiments, catalog instances can only register with other catalog instances in the context of a given domain D, meaning that a catalog instance $c_i$ registers itself with another catalog instance $c_j$ in order for both of them to become members of the same domain D. Typically, in order to create and populate a domain, a catalog administrator first creates a domain D, then it creates an instance of a catalog, referred to as $c_1$ for simplicity, and then it makes $c_1$ a member of the domain D. From this point on, when other catalog instances are created, their catalog administrators have the option to have them join other pre-existing domains, to make them the first members of a newly created domain, or both. In the case that an administrator intends for a catalog instance to automatically join a set of domains $D_{set}=\{D_1, D_2, \ldots, D_n\}$, the administrator sets an environment variable to include this set of domains, and for each domain $D_i \in D_{set}$, provides one or more catalog instances with which the newly created catalog instance is to register. An instance of a catalog may also choose to unregister from a domain, and services are provided to enable that functionality.

Figure 24:
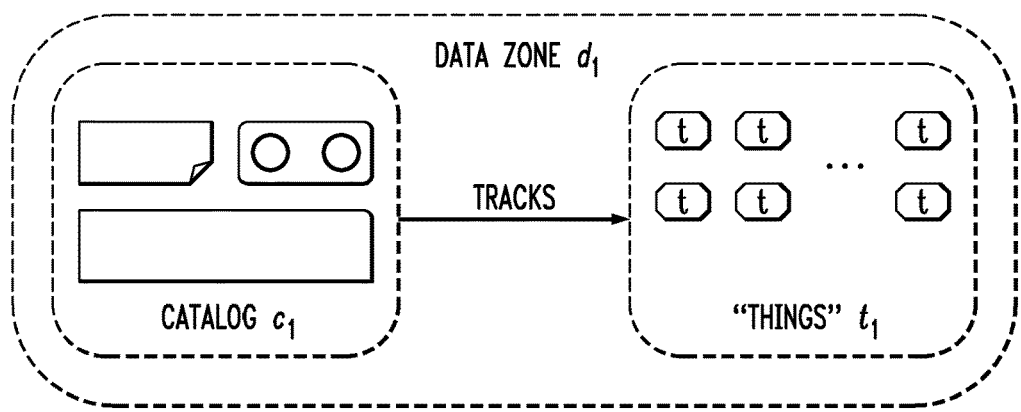
FIGS. 24 through 28 show example relationships between catalog instances, tracked items, data zones, domains and catalog administrators in illustrative embodiments.

FIG. 24 illustrates an embodiment in which a catalog instance $c_1$ is created in a data zone $d_1$. The catalog instance $c_1$ tracks and has direct access to a set of "things" $t_1$.

Figure 25:
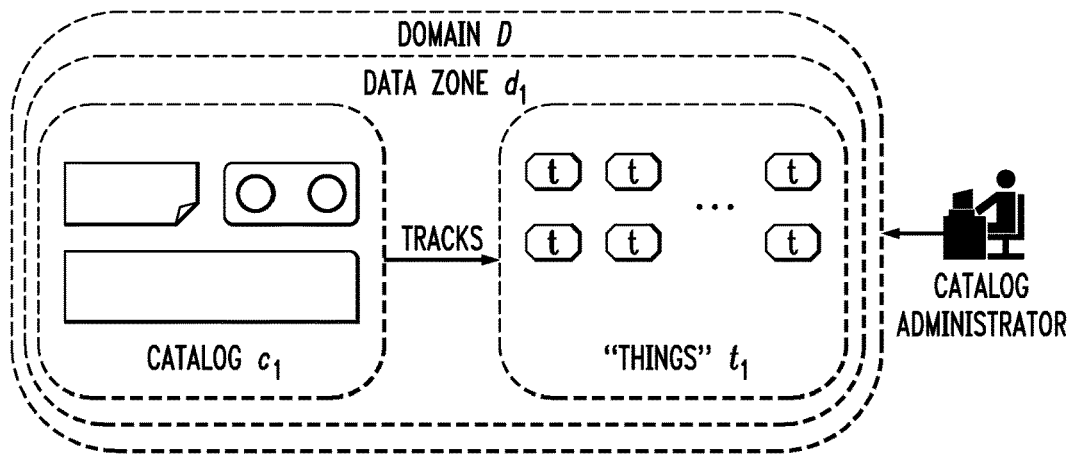

FIG. 25 shows a catalog administrator creating a domain D that includes the data zone $d_1$ of FIG. 24. The catalog administrator thereby also makes the catalog instance $c_1$ a member of the domain D.

Figure 26:
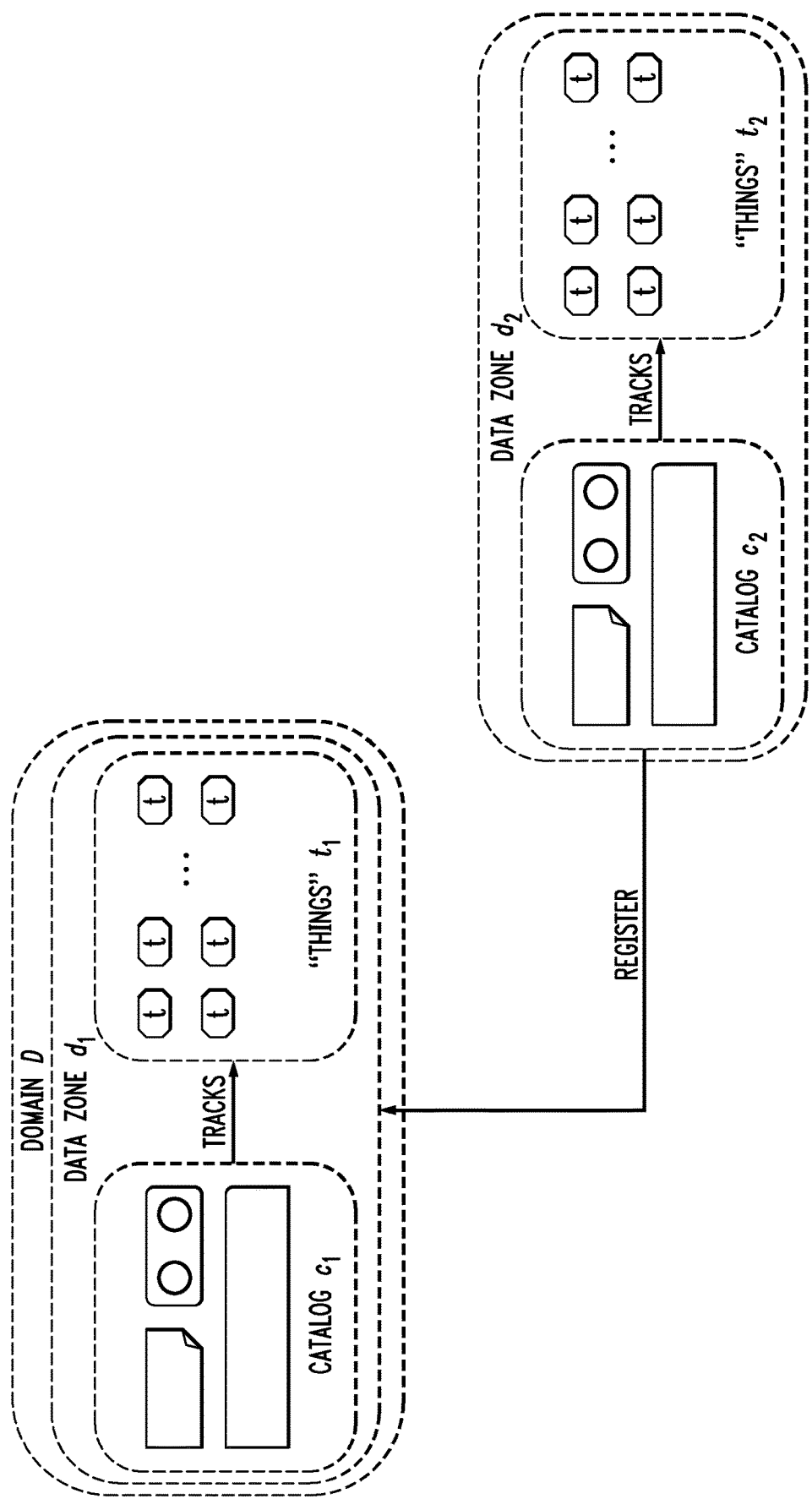

As shown in FIG. 26, a second catalog instance $c_2$ is created in data zone $d_2$, tracking and having direct access to a set of "things" $t_2$. The catalog instance $c_2$ registers with the catalog instance $c_1$. As a result, the catalog instance $c_1$ becomes aware of the catalog instance $c_2$, and vice-versa. After the registration process, the catalog instances are aware of each other, but each catalog instance does not become aware of or learn any information about the particular "things" that are tracked by the other catalog instance. It is through the publishing services, described in more detail below, that each catalog instance learns information about the "things" that the other catalog instance tracks or can directly access.

Figure 27:
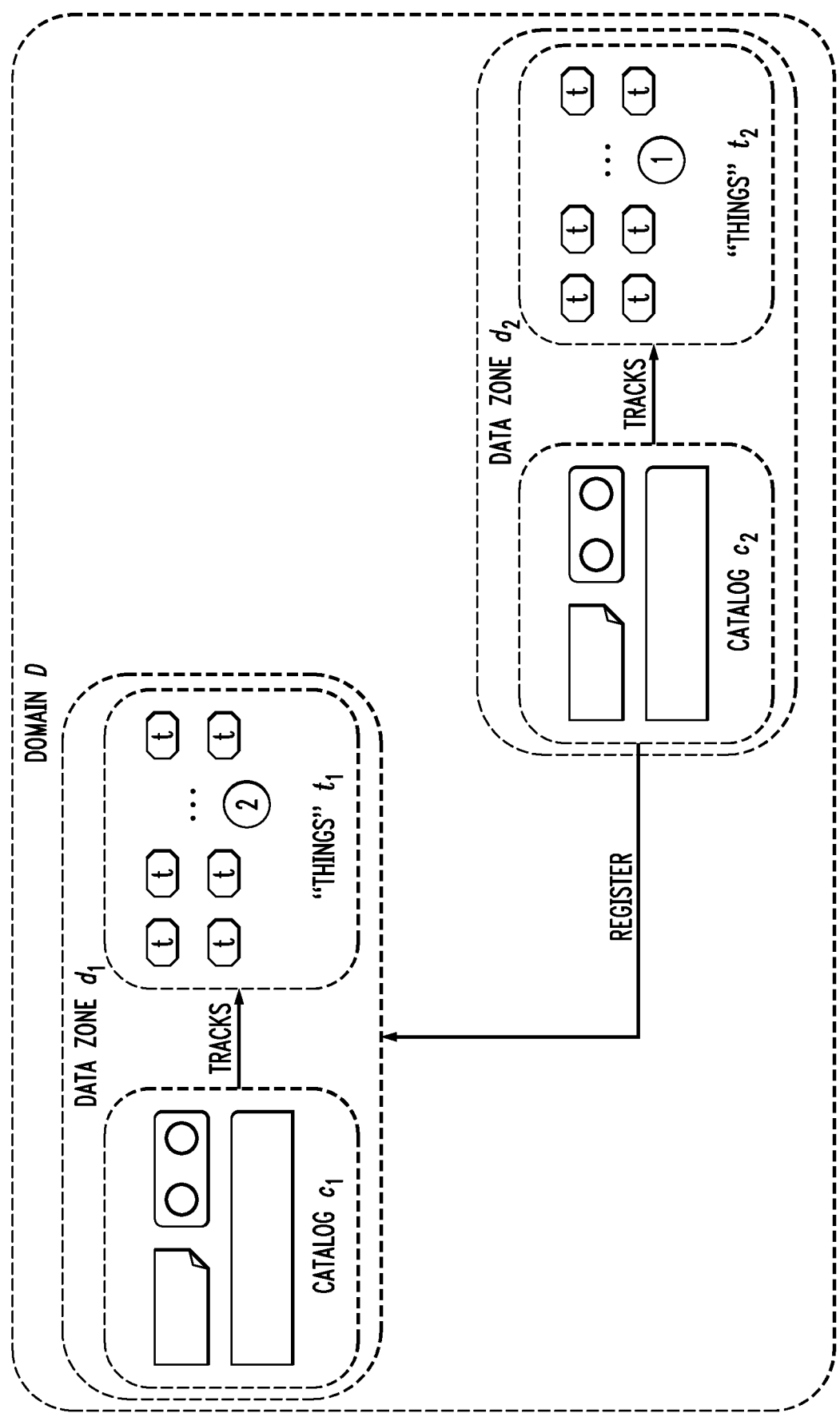

In addition, the registration process results in the catalog instance $c_2$ becoming a member of the domain D as illustrated in FIG. 27.

Figure 28:
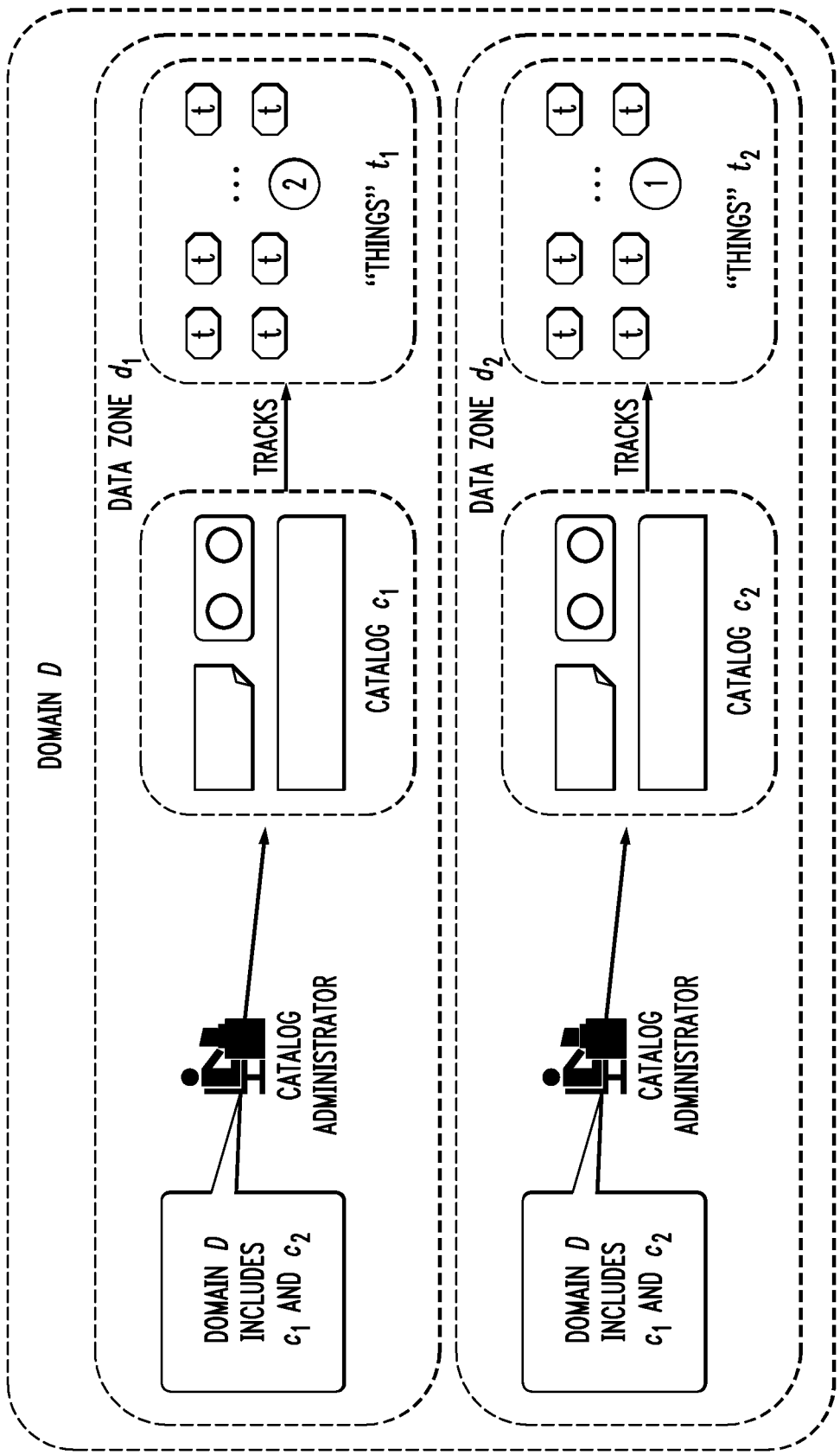

FIG. 28 shows corresponding catalog administrator views. After the registration, a catalog administrator can connect to the catalog instance $c_1$ and observe that the catalog instance $c_2$ is tracked by catalog instance $c_1$, or can connect to the catalog instance $c_2$ and observe that the catalog instance $c_1$ is tracked by catalog instance $c_2$.

The order in which catalog instances register with a domain determines the layout of how catalog instances track other catalog instances. Consider, for example, the scenario depicted in FIG. 29 with a domain $D=\{c_1, c_2, \ldots, c_n\}$, where the first catalog to be created is the catalog $c_1$ and, after that, each catalog $c_i \in D$ gets created and registers with the catalog $c_{i-1} \in D$, in that order. As a result, the catalogs track each other in the way depicted in FIG. 30, where each catalog instance $c_i \in D$ tracks the catalog instances $c_{i-1}$ and $c_{i+1}$. As mentioned previously, the registering has a reciprocity effect in that at the time that a catalog instance registers with another catalog instances, the two of them become aware of each other, and, as a result, both catalog instances can track each other. In essence, which catalog instances have the relationship tracks with other catalog instances is primarily determined by the order in which each of the catalog instances within a domain registers with the domain and via which other catalog instances it registers to or with.

The way in which catalog instances track each other within the context of a domain can be represented as a graph, referred to as the domain tracking graph or simply the domain graph, where the catalog instances are represented by the nodes of the graph and a relationship tracks is represented by an indirect edge. Each edge between two nodes of the graph is also referred to as a hop, and the minimum number of hops between two catalog instances is defined as it degree of separation.

Figure 31:
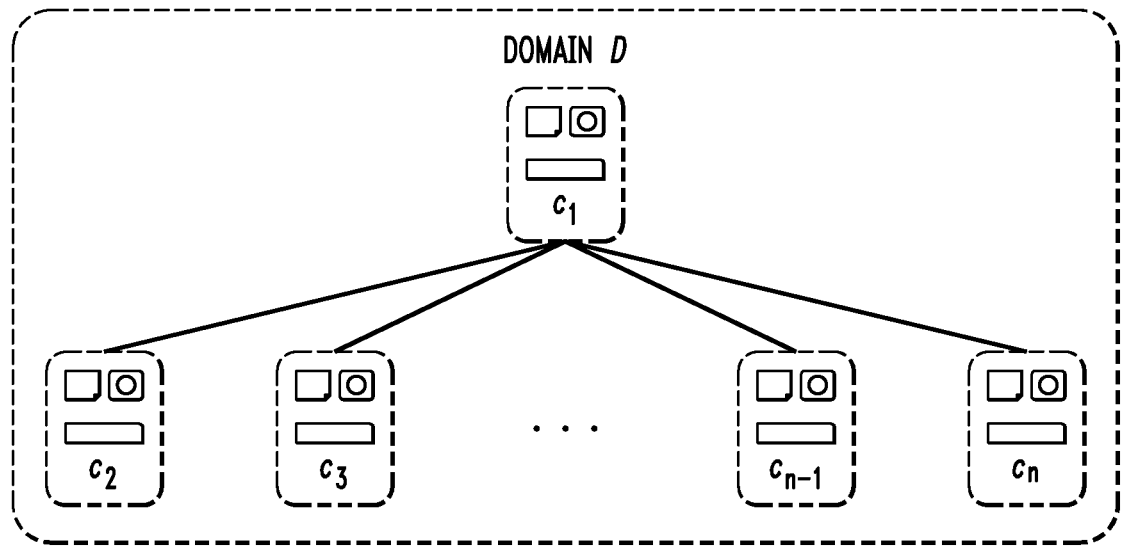
FIGS. 31 and 32 show examples of domains with respective tree-like and star-like catalog instance relationships.
Figure 32:
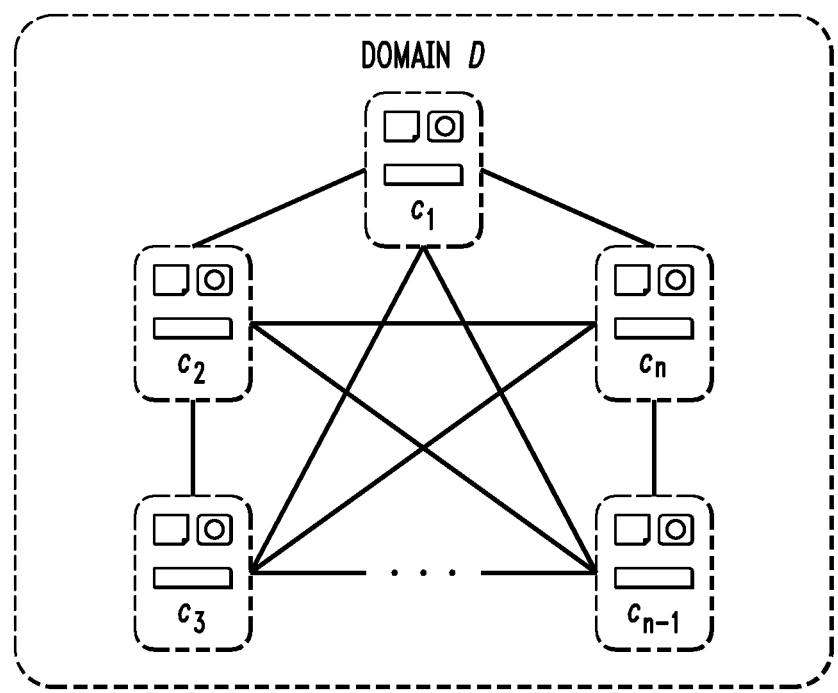

Tracking graphs can greatly differ on the number of relationships and how the relationships connect the catalog instances, forming different domain tracking shapes, and determining the degree of separation of each pair of nodes in the graph. For example, FIG. 31 depicts a domain with a single level tree-like tracking shape, where all catalog instances in the domain are tracked by a single catalog instance $c_1$. As one possible alternative, FIG. 32 depicts a domain with a star-like tracking shape. A wide variety of other types of domain tracking shapes can be present in other embodiments.

Different tracking shapes can greatly impact not only how information gets exchanged and propagated within a domain, but also the performance of any service that requires some form of traversal of the domain tracking graph.

Within the context of a domain, the order in which the catalog instances are created and the order in which they register with other catalog instances can vary greatly. Some embodiments are configured so as to not require and to not impose any specific ordering, allowing for the dynamic registering and unregistering of catalog instances into a domain. On one hand, this gives maximum flexibility, on the other hand, this can generate domains with different tracking shapes and with different performance metrics.

A wide variety of different approaches can be used to modify the tracking shape of a domain, or to even influence how the tracking shape gets created in the first place, including one or more of the following:

1. Start Registration: where after a catalog instance $c_i$ registers with a catalog instance $c_j$, both instances $c_i$ and $c_j$ inform each other about all catalog instances they track. As a result, both catalog instances, $c_i$ and $c_j$, automatically learn about other catalog instances they did not previously know about, and they can then proactively register with one or more of those other catalog instances.

2. Rebalancing Services: where a separate microservice is created to periodically examine the domain shape and then suggest that certain catalog instances register with other catalog instances in order to create a more symmetrical shape or to reduce the degree of separation between any two pairs of catalog instances.

There are no limits on the number of catalog instances that another catalog instance can register with within a domain. In other words, there are no limits on the number of relationship tracks that can be created between a given catalog instance and other catalog instances. Nevertheless, the relationship can only be created between two catalog instances within the same domain and the two catalog instances must have the right security permissions to know about each other.

There are several different ways to limit the scope or reach at which a catalog instance can learn or know about other catalog instances in the same domain, including one or more of the following:

1. All Inclusive: in which all catalog instances within a domain can learn about all other catalog instances in the domain. In this case, the domain determines the security boundaries of the catalog instances. In other words, a catalog instance has full visibility about all other catalog instances within a domain.

2. One Hop Inclusive: in which all catalog instances can only know about the other catalog instance with whom it originally registers. In this case, the catalog administrator defines the security boundaries of every catalog instance, determining that a catalog instance can only learn and know about the other catalog instances defined in the environment variables configured for the catalog instance at the time it is created.

Within the context of a domain, there is no catalog instance that is disconnected or isolated. In other words, for any catalog instance within a domain, the catalog instance registered to the domain through another catalog instance and, as a result, the graph formed is always a connected graph.

Catalog instances not only get created, but they also get terminated for a variety of reasons. For example, the physical server in which the catalog instance is running may go down, a catalog administrator may decide to shut down a catalog instance, or a catalog administrator may decide to remove a catalog instance from a domain and make it a member of another domain.

In order to preserve connectivity of the domain graph, unregistering microservices are configured to ensure that when a catalog instance is no longer part of a domain, for whatever reason, that the domain graph does not get disconnected. For example, the unregistering services can check for a scenario where a catalog instance $c_i$ has the relationship tracks with exactly two other instances, defined here as being with catalog instance $c_{i-1}$ and with catalog instance $c_{i+1}$, and all the paths between the catalog instance $c_{i-1}$ and with catalog instance $c_{i+1}$ go through the catalog instance $c_i$. In this scenario, when the catalog instance $c_i$ ceases to be part of the domain, the remaining domain graph becomes disconnected. The unregistering service can prevent this from happening by forcing the catalog instance $c_{i-1}$ to register with the catalog instance $c_{i+1}$ before unregistering the catalog instance $c_i$.

As mentioned previously, publishing services provide a mechanism for a catalog instance to advertise to another catalog instance in the same domain about the types of "things" that it tracks. The publishing services are particularly useful when the catalog offers other extended services that allows for a catalog to explicitly track "things" that other catalog instances have direct access to. In other words, a catalog instance $c_i$ knows, through publishing services, metadata about the "things" that a catalog instance $c_j$ tracks and has direct access to, for example. As a result, if a probing microservice, to be explained in more detail below, is done to catalog instance $c_i$ about all the "things" that it is able to track, with direct access or not, the catalog instance $c_i$ can provide a comprehensive response listing all the types of "things" that are tracked by it and by catalog instance $c_j$.

There is a fundamental difference between a catalog instance tracking other catalog instances, which tracking relationships define the tracking shape of the domain, and a catalog instance tracking "things" that can only be accessed directly by other catalog instances. In some cases, it may not be necessary for a catalog instance $c_i$ to respond about all the "things" that $c_j$ tracks and it may be enough for $c_i$ to simply respond with all the "things" that it has direct access to. It may also indicate that it knows that $c_j$ is also part of the domain and $c_i$ may also track "things" of interest. In other words, the catalog instance may give a kind of a lazy response saying what it knows about another catalog instance, but it does not know what "things" the other catalog instance tracks. When this latter type of response is acceptable, the publishing services are not mandatory in the sense that a catalog instance may not need to know the types of "things" that another catalog instance tracks. It may be enough for a catalog instance to simply know that another catalog instance exists and belongs to the same domain, for which the registering services are sufficient.

Similar to registering services, a catalog instance can also have information and track information about "things" that other catalog instances have direct access to. In this case, the catalog instances explicitly use publishing services.

A catalog instance only publishes metadata about the "things" it tracks, without necessarily providing any details at all on the "things" themselves, particularly as it relates to how to access these "things" or where these "things" are actually located. The information published often contains the level of credentials required for any user of a catalog instance to become aware that there another catalog instance.

By default, the publishing microservices used by a given catalog instance publish information to all of the other catalog instances it tracks. This is not the only implementation possible, and several restrictions can be made on the publishing of information and which information gets published. Unlike the registering services, the publishing services do not benefit from the reciprocity property in the sense that when a catalog instance $c_i$ publishes information to a catalog instance $c_j$, the catalog instance $c_j$ is under no obligation and makes no commitment to publish information back to $c_i$.

The information that a catalog instance $c_i$ publishes to other catalog instances is determined by security and configuration profiles defined in environment variables as well as imported in the catalog data during initialization. There are different levels of granularity that can be applied for publishing information about the "things" a catalog is able to track and access, directly and indirectly, including one or more of the following:

1. Level of Access: where a catalog instance only publishes information about the "things" it can access directly, only the "things" it can access indirectly, or both.

2. Types of "things": where a catalog instance only publishes information about "things" of a given type, in other words, only about "things" that are related to a certain set of metadata.

3. Registration Origin: where a catalog instance only publishes information about "things" that it either learned from other catalog instances that have requested to register with it, or only from other catalog instances that it proactively and selectively registered with, or a combination of both.

4. Inbound Origin: where a catalog instance only publishes information that was acquired from a set of specific inbound data sources.

In some implementations, a simple assumption may be made where by default, a catalog instance publishes all the metadata it has about all the "things" it tracks.

Publishing services provide a mechanism for a catalog instance to inform other catalog instances about the "things" it tracks. The probing services provide a mechanism for a catalog instance to make queries to other catalog instances about the types of "things" they track. These services offer another layer of security whereby a catalog instance $c_j$ does not need to proactively publish information to another catalog instance $c_i$. Instead, a catalog instance $c_i$ can query the catalog instance $c_j$ about whether or not it tracks "things" of a given type.

Catalog domains can be configured to include particular features and functionality, including one or more of the following:

1. Scalability: where, by virtue of how a domain is created, a catalog instance only needs to know of and register to another catalog instance in the same domain. As more catalog instances are added to the domain, a chain of catalog instances is automatically created, and, regardless of which catalog instance is reached first, all others become reachable as well.

2. Support for Multiple Domain Layouts: where some services can be implemented to better balance and optimize the layout of the chain of catalog instances within a single domain, or to provide redundancy or alternative paths from one catalog instance to others.

3. Data Privacy: where catalog instances only exchange metadata about the "things" they track. They do not share any content of the "things" themselves, their location, how to access them, information about how many "things" they track, or even if they track these "things" directly or indirectly. The information exchanged may be restricted to metadata about the "things" only.

4. Inter Catalog Communication: within the context of the catalog, the only communication that crosses the boundaries of a data zone is through the collaboration services. This means that a catalog administrator in a data zone $d_1$ can only probe the content of the catalog instances within the confines of data zone $d_1$. A catalog instance in a data zone $d_1$ can probe the contents of a catalog instance in a data zone $d_2$ that is in the same domain as the catalog instance in data zone $d_1$, and return results to the catalog administrator about "things" tracked by both catalog instances.

The catalog in some embodiments promotes non-intrusive data governance. For example, the catalog is illustratively configured to implement a methodology and discipline around the publishing and availability of distributed data, and its use for analytics, in a manner that mitigates some of the risks associated with data sharing, as only metadata about the data is shared and among trusted instances of the catalog, provides some level of observance of privacy and other GRC requirements, and introduces the ability to track data usage lineage at worldwide scale. The catalog in some embodiments assumes that levels of data governance and metadata management may already exist in one or more of the data zones, and it restricts its governance functionality to an overlay operating model over existing organizational components, focused solely on the publishing and availability of data, and its use for analytics. From this perspective, the catalog ensures that data is published, accessible, and used for analytics according to some classification of the data, such as public, sensitive, or confidential, and some access policies associated with it, and also that data publishing and accessibility can be managed, secured, and auditable by classification and other policies. The catalog can also be configured to ensure that suitable processes are put in place and monitored so that data sources abide to the principles of the catalog, and that the situations where these processes are not followed can be identified, prevented, and resolved.

Illustrative embodiments provide a distributed catalog service configured to track "things" that is self-contained and delivers substantial value, not only in information processing systems implementing a version of the previously-described WWH distributed computing platform, but in a wide variety of alternative contexts. For example, some embodiments can be configured to support functionality for Data as a Service (DaaS), which needs to track data location and provide mechanisms for accessing data.

The catalog in some embodiments is configured as a model-driven mechanism to track and locate "things," or more formally, resources. The catalog data model comprises a set of classes, relationships, attributes and class inheritance specifications that, together, provide an abstraction of the content of the catalog.

Additional illustrative embodiments will now be described with reference to FIGS. 33 and 34. These embodiments utilize distributed processing nodes to implement scalable recursive computation functionality. For example, worldwide scale recursive computation of percentiles can be implemented in these embodiments. Other types of scalable recursive computations can be performed by distributed processing nodes in other embodiments.

In these embodiments, the distributed processing nodes of a distributed data processing platform are configured to compute percentiles in a scalable and distributed manner, and in some cases in a privacy-preserving manner as well. The percentile computations may more particularly comprise, for example, $k^{th}$ percentile computations.

One example use case for such computations involves patient electronic medical records distributed over multiple hospitals coupled with a need to calculate specific percentile information in order to re-group the patient population into sub-groups of the overall patient population being studied.

These and other embodiments provide distributed analytics frameworks suitable for observing and analyzing patterns in data samples without requiring that all the data being analyzed reside in a central location.

For example, illustrative embodiments focus on computing the percentiles for datasets that are distributed across different data zones. Such embodiments provide a scalable and recursive mechanism to compute the percentiles for datasets that are distributed across different data zones. The computations are illustratively implemented using a WWH framework of the type described elsewhere herein for the automation and orchestration of the distribution of processing code at worldwide scale. However, it is to be appreciated that the scalable and recursive computation techniques disclosed herein are not limited to use with WWH frameworks or any other particular distributed data processing platform.

Figure 33:
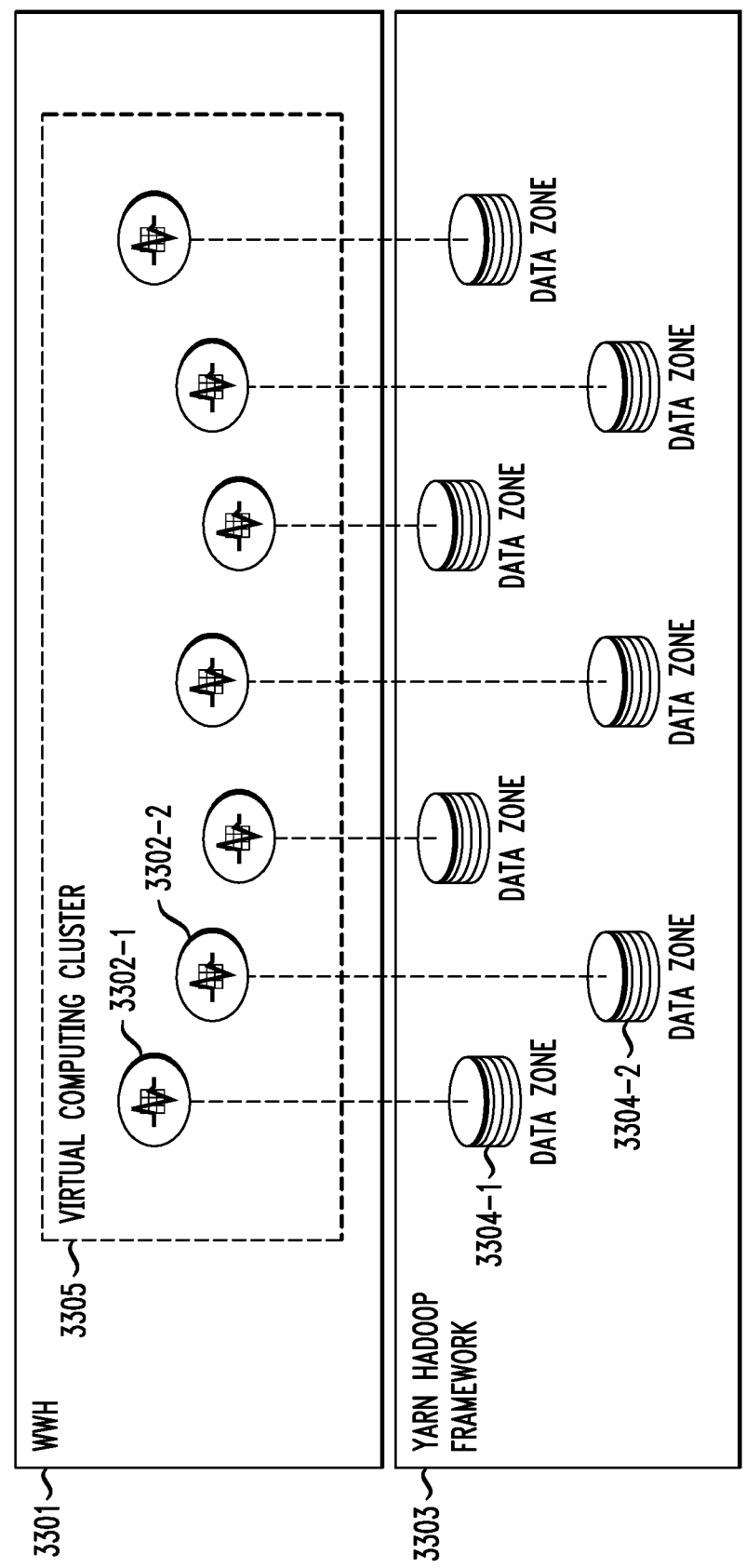
FIG. 33 shows a distributed data processing platform utilized to implement scalable recursive computation functionality in an illustrative embodiment.

Referring now to FIG. 33, an information processing system 3300 comprises a WWH platform comprising a WWH node layer 3301 that includes multiple WWH nodes 3302 such as WWH nodes 3302-1 and 3302-2. The WWH platform further comprises a YARN cluster layer 3303 that includes multiple YARN clusters 3304 such as YARN cluster 3304-1 and YARN cluster 3304-2 implemented in respective data zones. The WWH nodes 3302 are associated with respective ones of the YARN clusters 3304.

The YARN clusters 3304 are examples of what are more generally referred to herein as "distributed processing node clusters." Thus, like the YARN clusters 104 of the FIG. 1 embodiment, each of the YARN clusters 3304 is assumed to include a cluster of multiple computers or other processing devices. Other types of distributed processing node clusters or alternative arrangements of distributed processing nodes can be used in other embodiments. The use of Hadoop YARN in the FIG. 33 embodiment is by way of example only, and other embodiments need not utilize Hadoop YARN. Moreover, processing node clusters are not required, and numerous alternative arrangements of distributed data processing nodes can be used instead.

In the information processing system 3300, there is a one-to-one correspondence between the WWH nodes 3302 and the respective YARN clusters 3304, although this is also by way of illustrative example only. In other embodiments, a given WWH node may be associated with multiple YARN clusters. Additionally or alternatively, a given YARN cluster can be associated with multiple WWH nodes.

It is also possible that one or more of the WWH nodes 3302 may each comprise a data processing node of the corresponding YARN cluster 3304. Thus, in some embodiments, the separate layers 3301 and 3303 of the FIG. 33 embodiment are merged into a single layer of YARN clusters one or more of which each include one or more WWH nodes. Such an arrangement is considered yet another illustrative example of a WWH platform, or more generally a multi-cluster distributed data processing platform, as those terms are broadly utilized herein. Again, other embodiments can be configured without the use of YARN clusters or other types of computing clusters. For example, in some embodiments, the YARN clusters 3304 can be replaced with respective sets of one or more distributed processing nodes configured to communicate with one another over one or more networks.

As indicated above, the YARN clusters 3304 in the FIG. 33 embodiment are assumed to be associated with respective distinct data zones. Each of the YARN clusters 3304 is configured to perform processing operations utilizing local data resources locally accessible within its corresponding data zone. The YARN clusters as illustrated in the figure illustratively comprise respective processing platforms including various arrangements of multi-node clouds, possibly implemented utilizing virtual infrastructure components, and other example arrangements of distributed processing nodes.

By way of example, at least a subset of the YARN clusters 3304 may comprise respective geographically-distributed regional data centers each configured to perform analytics processing utilizing the locally accessible data resources of its corresponding data zone. Additional or alternative types of boundaries may be used to separate the system 3300 into multiple data zones. Accordingly, geographical distribution of the data zones and their respective clusters is not required.

The WWH nodes 3302 illustratively utilize processing results from one or more of the YARN clusters 3304 in orchestrating distributed worldwide scale recursive computations over multiple YARN clusters in the system 3300. This is achieved in a manner that preserves the privacy of those clusters in their respective local data resources. For example, processing results from a given one of the clusters may be permitted to be transmitted to another one of the clusters while the local data resources of the given cluster that are utilized to obtain the processing results are not permitted to be transmitted to another one of the clusters.

In the FIG. 33 embodiment, each data zone is illustratively associated with a virtual node within a virtual computing cluster 3305. The virtual nodes of the virtual computing cluster 3305 illustratively include the WWH nodes 3302 of the WWH node layer 3301 and provide access to local datasets of respective ones of the data zones associated with respective YARN clusters 3304 of the YARN cluster layer 3303. Other types of virtual computing clusters comprising different arrangements of distributed processing nodes can be used in other embodiments. The term "virtual computing cluster" as used herein is therefore intended to be broadly construed, and should not be interpreted as being limited to WWH nodes or other particular types of distributed processing nodes.

In some embodiments, distributed data processing operations associated with implementation of scalable recursive computation functionality in the system 3300 are illustratively performed in the following manner. At the start of this example process, a user associated with a given one of the WWH nodes 3302-1 initiates a distributed percentile computation in the system 3300. The user can be a human entity or an automated entity, such as a computer or software program. The WWH node is one of the virtual nodes of the virtual computing cluster 3305 and in this example is considered the initiating node for the percentile computation.

The distributed percentile computation comprises at least two computation units:

1. Intermediate calculation: to be performed in a distributed manner, at each data zone.
2. Global calculation: to be performed at the initiating node, after the results of the intermediate calculations have been received.

It is important to note that a more complex distributed percentile computation may comprise several iterations of intermediate and global calculations, where at each iteration the initiating node may share results of the previous iteration with the virtual nodes in the virtual computing cluster 3305, by passing these values as parameters to the next intermediate calculation.

Even though the virtual computing cluster 3305 depicted in FIG. 33 shows a flat arrangement, where there is just one layer 3301 of WWH nodes 3302 associated with respective data zones, in other WWH embodiments a virtual computing cluster may be implemented using a recursive arrangement in which any one of the virtual nodes can itself actually point to one or more other virtual nodes and so on.

The submission of a distributed percentile computation to the initiating node 3302-1 causes a WWH computation to start, which illustratively calls one or more microservices in a WWH Catalog running in the initiating node 3302-1 to locate all the other virtual nodes where the intermediate calculations should be sent.

In this particular example, it is assumed that all the other WWH nodes 3302 in the virtual computing cluster 3305 will participate in the distributed percentile computation and, as a result, the WWH functionality in the initiating node 3302-1 distributes the intermediate calculations to respective ones of the additional WWH nodes 3302. These intermediate calculations are distributed by the WWH nodes 3302 to respective ones of the YARN clusters 3304. The YARN clusters 3304 then execute the intermediate calculations utilizing local datasets of their respective data zones.

Upon completion of its intermediate calculation, each one of the YARN clusters 3304 associated with a corresponding one of the data zones sends the results of its computation back to its requesting one of the WWH nodes 3302. All of the WWH nodes 3302 other than the initiating node 3302-1 sends its corresponding intermediate calculation result back to the initiating node 3302-1. These results include all the information that will be required for the calculation of the global percentile, but without sending any Personally Identifiable Information (PII) and while seeking to minimize the amount of data that is actually sent to the initiating node 3302-1.

The global calculation performed by the initiating node 3302-1 may be viewed as aggregating local results from the other WWH nodes 3302 into global results. The local and global results may be utilized in populating an interactive user interface that is presented via the initiating node 3302-1 associated with particular system user that first initiated the global percentile computation. Additionally or alternatively, various types of benchmarking operations can be performed using the local and global results.

The WWH framework in some embodiments includes the above-noted WWH Catalog, which illustratively comprises a distributed network of collaborative and cooperating nodes that implement a metadata-driven mechanism to address and to access data and other "things," located in a distributed manner across the nodes in the network, potentially geographically dispersed worldwide, where the knowledge of where the "thing" actually resides and how it can be accessed may only be known locally to the node where the "thing" is located.

In the context of WWH, the metadata is an abstraction of a "thing," that enriches and describes properties about the "thing" with information above and beyond what is inherent in the "thing" itself. The term "metadata-driven" refers to methods and approaches that leverage metadata to locate, access, analyze, or manage "things." A "meta-resource" as that term is used herein is an abstraction of a set of resources that enriches the resources with metadata above and beyond the resources themselves, describing characteristics shared by all the resources represented by the meta-resource. The resources represented by a meta-resource may be physically co-located or distributed geographically, around the world.

The WWH framework in some embodiments includes the following illustrative features and functionality.

The WWH framework decouples two worldwide scale functions, implemented as a set of microservices, namely, the WWH Catalog, which provides a metadata-driven abstraction and mechanism to address and to access data scattered worldwide, and the WWH Computing Framework, which provides an orchestration method to distribute and push computation close to the data.

The WWH framework illustratively comprises a unique combination of these two decoupled and independent functions, allowing users to distribute computation without knowing or being exposed to the exact location of the data. In addition, the WWH framework allows data to move location, and allows data to be added and removed without requiring changes to the distributed application, while also allowing the application to always compute on the most recent set of data available.

Several implementations of the WWH Catalog can cooperate to deliver the services published, where each implementation best uses the resources available to it and best delivers on the requirements.

The WWH framework allows for the implementation and automation of distributed percentile calculations. For example, the WWH framework can be used to identify and locate the datasets required for a particular distributed percentile computation. In a given WWH Catalog of datasets upon which a distributed percentile computation can be performed, a meta-resource meta_resource$_{D_N}$ is created to identify and represent a set of N datasets, $D_N=\{d_1, d_2, \ldots, d_N\}$, and the addresses of the respective locations of the datasets and of their respective affiliated computing nodes, thereby allowing each dataset to be reached in a programmatic and digital manner. The WWH framework also allows implementation of an application comprising a set of iterations and a final calculation. Each iteration can itself be implemented as a WWH application, possibly utilizing one or more microservices that issue calls to the WWH framework, and that pass as parameters to the WWH framework the meta-resource meta_resource$_{D_N}$, the intermediate calculation for the corresponding iteration with all parameters, and the global calculation for this iteration with all parameters.

FIG. 34 shows example variables and observations for each of a plurality of datasets in respective data zones in an illustrative embodiment. These datasets are examples of datasets that are used in performing worldwide scale recursive computation of percentiles in the information processing system 3300. Other types of datasets can be used to perform other types of scalable recursive computations across multiple distributed processing nodes encompassing multiple data zones in other embodiments.

A given dataset in this embodiment illustratively refers to a collection of data that is hosted in a single location or that is hosted with portions thereof in sufficiently close proximity to one another such that it can be collectively referred to as a single dataset. More formally, all the data in a dataset i can be represented as $d_i$. Other arrangements of data and datasets can be used in other embodiments.

A given data zone in this embodiment illustratively refers to a logical boundary that contains a dataset and some processing capacity to analyze the dataset. It is assumed for this embodiment that the dataset cannot leave the boundaries of the data zone in its raw format, for example, due to one or more privacy and security controls, GRC restrictions, bandwidth constraints, connectivity availability, or any other data mobility limitations. More formally, a data zone $dz_i$ hosts a dataset $d_i$. A wide variety of alternative data zone arrangements can be used in other embodiments.

As noted above, an intermediate calculation illustratively refers to a calculation to be performed in a distributed manner, on each dataset.

Also as previously noted, a global calculation illustratively refers to a calculation to be performed in one location, after the results of the intermediate calculations have been received. The location where a global calculation is performed is typically (but not necessarily) the location where the calculation process was initiated.

In some embodiments, the location that starts the calculation will be referred to as the initiating node and the location where the global calculation is performed will be referred to as the global calculating node. For simplicity, in the examples to be described below, the initiating node and the global calculating node are assumed to be the same.

Some embodiments compute $k^{th}$ percentile for a dataset. The $k^{th}$ percentile for a dataset (where k is between 0 and 100) is a value that splits the observations in the dataset into two subsets: one subset that contains the lowest k % of observations, and another that contains the remaining (100−k) % of observations.

For example, assume there is a dataset that includes income values for several individuals. The 50th percentile for the income in this dataset is a value that divides the dataset into two subsets of equal size (50%-50%), where one dataset contains only individuals with income below the 50th percentile, and the other dataset contains only individuals with income above the 50th percentile. The 50th percentile is also known as the median of the dataset.

The percentile computation algorithms to be presented below allow for computing percentiles for the entire distribution of data that is scattered across multiple data zones without moving the data to a central location. Such algorithms also allow for imposing privacy constraints to the data shared between data zones during the iterative process for percentile calculation. This lets the user choose the tradeoff between privacy and precision that is more suitable for each application.

Illustrative embodiments therefore provide a scalable, distributed, recursive approach, to compute percentiles in a distributed and potentially privacy-preserving fashion.

In some embodiments, the data zones perform local analytics, share their intermediate results, illustratively privacy-preserving ones, with a pre-selected global data zone. This pre-selected global data zone analyzes these intermediate results and generates a set of global results. This then becomes the first step in a recursive pattern, where, based on the results of this global analysis, additional iterations are initiated.

Such arrangements provide a scalable solution to compute percentiles for datasets that are distributed across multiple data zones, each data zone with its own dataset. In some embodiments, the objective is to compute percentiles across all the datasets in the data zones within the domain without actually combining the data (e.g., without moving the raw data from the individual data zones into a central location).

Since the data is not physically moved to a central location, this represents a scale-out architecture that can scale to any number of data zones and any size of datasets.

In addition, the raw data is not exposed to the initiating node, and only intermediate results are shared and these intermediate results are often privacy-preserving themselves. In other words, the original values used in the computation cannot be reverse engineered from the intermediate results.

In the descriptions of the computational algorithms below, the data is assumed to be horizontally partitioned among the different data zones, meaning that each data zone has different observations for the same set of variables, as illustrated in FIG. 34.

Table 1 below provides initial notation that will be used in describing the computational algorithms in illustrative embodiments.

TABLE 1

Notation

| | |
|---|---|
| $D_N = \{d_1, d_2, \ldots, d_N\}$ | Set of N datasets, where $d_i$ represents the i-th dataset. |
| $n_i, i \in \{1, \ldots, N\}$ | Number of observations in dataset $d_i$ |
| $J_i = \{1, \ldots, n_i\}, i \in \{1, \ldots, N\}$ | Set of observation indexes in dataset $d_i$ |
| $n_g$ | Number of observations in set of datasets $D_N$ |
| $X = \{x_1, x_2, \ldots, x_L\}$ | Set of L variables in $D_N$. It is assumed that all individual datasets $d_i$, $i \in \{1, \ldots, N\}$ contain observations for the same set of variables X. |
| $x^j_{l,i}, l \in \{1, \ldots, L\}, i \in \{1, \ldots, N\}, j \in \{1, \ldots, n_i\}$ | j-th value of variable $x_l$ in dataset $d_i$ |

In conjunction with computing percentiles in illustrative embodiments, a preliminary step of computing the total number of observations in datasets from all data zones is utilized. This initial computation is performed as shown in Table 2 below in order to determine the total number of observations in $D_N$, where (GC) indicates a global calculation and (IC) indicates an intermediate calculation:

TABLE 1

Computing Total Number of Observations in $D_N$

| | |
|---|---|
| 1: (IC) | Each data zone computes the total number of observations $n_i$ in $d_i$. |
| 2: (IC) | Each data zone returns the value tuple $vt_i = <n_i>$ to the global calculating node |
| 3: (GC) | Global calculating node receives the value tuple set VTS = $\{vt_i, i \in \{1, ..., N\}\}$ |

TABLE 1-continued

Computing Total Number of Observations in $D_N$

| | |
|---|---|
| 4: (GC) | Global calculating node computes $n_g = \sum_{i=1}^{N} n_i$ |

Table 3 below illustrates an example arrangement for computing global percentiles without privacy constraints in the system 3300. This embodiment assumes that there are no privacy constraints on the percentile computation results shared by the data zones during the iterative process for computing percentiles. Because it is more convenient to work with integer numbers, and the percentile computation is not affected by scale transformations, the percentile computing algorithm in Table 3 and other algorithms described herein assume that the observations in the datasets are integer numbers. These algorithms can be more generally applied to any dataset, using a combination of simple pre-processing and post-processing steps that allow the percentile to be computed with an arbitrary precision of z decimal points. More particularly, the pre-processing in such an embodiment illustratively comprises multiplying all data points by $10^{-z}$ and rounding the multiplied data points to the nearest integer, and the post-processing illustratively comprises dividing the final result by $10^{-z}$.

TABLE 3

Computing kth Percentile of Variable xl in DN without Privacy Constraints

| | |
|---|---|
| 1: (GC-IC) | Compute the total number of observations in $D_N$, $n_g$, as in TABLE 2 |
| 2: (IC) | Compute the $k^{th}$ percentile of $x_l$ in $d_i$, $p^k(x_{l,i})$ |
| 3: (IC) | Each data zone returns the value tuple $ivt_i = <p^k(x_{l,i})>$ to the global calculating node |
| 4: (GC) | Global calculating node receives the value tuple set VTS = $\{ivt_i, i \in \{1, ..., N\}\}$ |
| 5: (GC) | Global node sets iteration number to c = 0 |
| 6: (GC) | Global node sets the lower limit of the percentile range to $\underline{p^{k(c)}(x_{l,g})} = \min_{i \in \{1,\ldots,N\}} p^k(x_{l,i})$ and the upper limit of the percentile range to $\overline{p^{k(c)}(x_{l,g})} = \max_{i \in \{1,\ldots,N\}} p^k(x_{l,i})$. |
| 7: (GC) | If $\underline{p^{k(c)}(x_{l,g})} = \overline{p^{k(c)}(x_{l,g})} = pk$, global node sets $p^k(x_{l,g}) = pk$ and the algorithm terminates. Else, move to step 8 |
| 8: (GC) | Global node sets the percentile candidate in the $c^{th}$ iteration to $p^{k(c)}(x_{l,g}) = (\underline{p^{k(c)}(x_{l,g})} + \overline{p^{k(c)}(x_{l,g})})/2$ |
| 9: (IC) | Each data zone receives the value tuple $gvt = <p^{k(c)}(x_{l,g})>$ from the global calculating node |
| 10: (IC) | Each data zone counts the number of observations in $d_i$ for which $x_{l,i}^j < p^{k(c)}(x_{l,g})$, $L_{l,i}^{k(c)}$ and the number of observations in $d_i$ for which $x_{l,i}^j > p^{k(c)}(x_{l,g})$, $G_{l,i}^{k(c)}$ |
| 11: (IC) | Each data zone returns the value tuple $ivt_i = <L_{l,i}^{k(c)}, G_{l,i}^{k(c)}>$ to the global calculating node |
| 12: (GC) | Global calculating node receives the value tuple set VTS = $\{ivt_i, i \in \{1, ..., N\}\}$ |
| 13: (GC) | Global calculating node computes the total number of observations in $D_N$ for which $x_{l,i}^j < p^{k(c)}(X_{l,g})$, $L_{l,g}^{k(c)} = \sum_{i=1}^{N} L_{l,i}^{k(c)}$ and the total number of observations in $D_N$ for which $x_{l,i}^j > p^{k(c)}(x_{l,g})$, $G_{l,g}^{k(c)} = \sum_{i=1}^{N} G_{l,i}^{k(c)}$. |

TABLE 3-continued

Computing kth Percentile of Variable xl in DN without Privacy Constraints

14: (GC) The global calculating node then evaluates whether the percentile was found:
If $L_{l,g}^{k(c)} \le k \times n_g - 1$ and $G_{l,g}^{k(c)} \le n_g - k \times n_g$, then terminate the algorithm and return $p^{k(c)}(x_{l,g})$ as the $k^{th}$ percentile of variable $x_l$ in $D_N$.
Else if $G_{l,g}^{k(c)} > n_g - k \times n_g$, then increment the iteration counter $c = c + 1$, set $p^{k(c)}(x_{l,g}) = p^{k(c-1)}(x_{l,g}) + 1$, $\overline{p^{k(c)}(x_{l,g})} = \overline{p^{k(c-1)}(x_{l,g})}$, and return to step 7.
Else if $L_{l,g}^{k(c)} > k \times n_g - 1$, then increment the iteration counter $c = c + 1$, set $\underline{p^{k(c)}(x_{l,g})} = \underline{p^{k(c-1)}(x_{l,g})}$, $p^{k(c)}(x_{l,g}) = p^{k(c-1)}(x_{l,g}) - 1$, and return to step 7.

Table 4 below shows an example arrangement for computing global percentiles with privacy constraints in the system 3300. This embodiment assumes that there are privacy constraints on the percentile computation results shared by the data zones during the iterative process for computing percentiles.

More particularly, this embodiment imposes a privacy constraint as follows. During the iterative search for the percentile set forth in the computing algorithm of Table 3, if a candidate for the percentile ($p^{k(c)}(x_{i,g})$) is so close to a previous candidate ($p^{k(c^-)}(x_{l,g})$), where $c^-<c$, that the counts of data points in a data zone that are strictly below (or above) the two candidates are within a threshold th number of data points of each other ($|L_{l,i}^{k(c)}-L_{l,i}^{k(c^-)}|\le$ th or $|G_{l,i}^{k(c)}-G_{l,i}^{k(c^-)}|\le$ th, the new counts $L_{l,i}^{k(c)}$ and $G_{l,i}^{k(c)}$ cannot reported. The threshold th is arbitrarily set by the user to conform to privacy requirements. This example computing algorithm may return a range for the percentile rather than a precise value, if the iterations cannot continue without violating the privacy constraint. The computation patterns for executing this algorithm in WWH are shown in Table 4 below. It is be appreciated that additional or alternative privacy constraints may be imposed in other embodiments.

TABLE 4

Computing $k^{th}$ Percentile of Variable $x_l$ in $D_N$ with Privacy Constraints

| | |
|---|---|
| 1: (GC-IC) | Compute the total number of observations in $D_N$, $n_g$, as in TABLE 2 |
| 2: (IC) | Compute the $k^{th}$ percentile of $x_l$ in $d_i$, $p^k(x_{l,i})$ |
| 3: (IC) | Each data zone returns the value tuple $ivt_i = <p^k(x_{l,i}) >$ to the global calculating node |
| 4: (GC) | Global calculating node receives the value tuple set VTS = $\{ivt_i, i \in \{1, ..., N\}\}$ |
| 5: (GC) | Global node sets iteration number to c = 0 |
| 6: (GC) | Global node sets the lower limit of the percentile range to $$\underline{p^{k(c)}(x_{l,g})} = \min_{i\in\{1,...,N\}} p^k(x_{l,i})$$ and the upper limit of the percentile range to $\overline{p^{k(c)}(x_{l,g})}$ = max $p^k(x_{l,i})$. |
| 7: (GC) | If $\underline{p^{k(c)}(x_{l,g})} = \overline{p^{k(c)}(x_{l,g})} = pk$, global node sets $p^k(x_{l,g})$ = pk and the algorithm terminates. Else, move to step 8 |
| 8: (GC) | Global node sets the percentile candidate in the $c^{th}$ iteration to $p^{k(c)}(x_{l,g}) = (\underline{p^{k(c)}(x_{l,g})} + \overline{p^{k(c)}(x_{l,g})})/2$ |
| 9: (IC) | Each data zone receives the value tuple gvt = $<p^{k(c)}(x_{l,g})>$ from the global calculating node |
| 10: (IC) | Each data zone counts the number of observations in $d_i$ for which $x_{l,i}^j < p^{k(c)}(x_{l,g})$, $L_{l,i}^{k(c)}$ and the number of observations in $d_i$ for which $x_{l,i}^j > p^{k(c)}(x_{l,g})$, $G_{l,i}^{k(c)}$ |
| 11.A: (IC) | Each data zone dzi computes: the differences between the current $L_{l,i}^{k(c)}$ and the $L_{l,i}^{k(c^-)}$ computed in all previous iterations ($c^- < c$): $L_{i,c^-}^{diff} = L_{l,i}^{k(c)} - L_{l,i}^{k(c^-)}$, $c^- \in \{1, ..., c - 1\}$ the differences between the current $G_{l,i}^{k(c)}$ and the $G_{l,i}^{k(c^-)}$ computed in all previous iterations ($c^- < c$): $G_{i,c^-}^{diff} = G_{l,i}^{k(c)} - G_{l,i}^{k(c^-)}$, $c^- \in \{1, ..., c - 1\}$ |
| 11.B: (IC) | Checking if privacy constraint would be violated by reporting $L_{l,i}^{k(c)}$ to the global node Each data zone $dz_i$ evaluates the $L_{i,c^-}^{diff}$ and $G_{i,c^-}^{diff}$ values: if $|L_{i,c^-}^{diff}| =$ or $|L_{i,c^-}^{diff}| >$ th, $\forall c^- \in \{1, ..., c - 1\}$, then the value of $L_{l,i}^{k(c)}$ can be returned to the global node without breaching the privacy constraint. The values of the lower limit for $L_{l,i}^{k(c)}$, $\underline{L_{l,i}^{k(c)}}$, and the upper limit for $L_{l,i}^{k(c)}$, $\overline{L_{l,i}^{k(c)}}$, are set to: $\underline{L_{l,i}^{k(c)}} = \overline{L_{l,i}^{k(c)}} = L_{l,i}^{k(c)}$ if there exists a $c^{ll} \in \{1, ..., c - 1\}$ for which $0 < L_{i,c^{ll}}^{diff} \le$ th, then the value of $L_{l,i}^{k(c)}$ cannot be returned to the global node without breaching the privacy constraint. The values of the lower limit for $L_{l,i}^{k(c)}$, $\underline{L_{l,i}^{k(c)}}$ and upper limit for $L_{l,i}^{k(c)}$, $\overline{L_{l,i}^{k(c)}}$ are then set to: $\underline{L_{l,i}^{k(c)}} = L_{l,i}^{k(c^{ll})}$ $\overline{L_{l,i}^{k(c)}} = L_{l,i}^{k(c^{ll})} +$ th if there exists a $c^{lu} \in \{1, ..., c - 1\}$ for which $-th \le L_{i,c^{lu}}^{diff} < 0$, then the value of $L_{l,i}^{k(c)}$ cannot be returned to the global node without breaching the privacy constraint. The values of the lower limit for $L_{l,i}^{k(c)}$, $\underline{L_{l,i}^{k(c)}}$, and upper limit for $L_{l,i}^{k(c)}$, $\overline{L_{l,i}^{k(c)}}$ are then set to: $\underline{L_{l,i}^{k(c)}} = L_{l,i}^{k(c^{lu})} -$ th $\overline{L_{l,i}^{k(c)}} = L_{l,i}^{k(c^{lu})}$ |

TABLE 4-continued

Computing $k^{th}$ Percentile of Variable $x_l$ in $D_N$ with Privacy Constraints

| | |
|---|---|
| 11.C: (IC) | Checking if privacy constraint would be violated by reporting $G_{l,i}^{k(c)}$ to the global node<br>Each data zone $dz_i$ evaluates the $G_{i,c}^{diff}$ values:<br>if $|G_{i,c^-}^{diff}| = 0$ or $|G_{i,c^-}^{diff}| > \text{th}$, $\forall c^- \in \{1, ..., c - 1\}$, then the value of $G_{l,i}^{k(c)}$ can be returned to the global node without breaching the privacy constraint. The values of the lower limit for $G_{l,i}^{k(c)}$, $\underline{G_{l,i}^{k(c)}}$, and the upper limit for $G_{l,i}^{k(c)}$, $\overline{G_{l,i}^{k(c)}}$, are set to:<br>$\underline{G_{l,i}^{k(c)}} = \overline{G_{l,i}^{k(c)}} = G_{l,i}^{k(c)}$<br>if there exists a $c^{gl} \in \{1, ..., c - 1\}$ for which $0 < G_{i,c}^{gdiff} \leq \text{th}$, then the value of $G_{l,i}^{k(c)}$ cannot be returned to the global node without breaching the privacy constraint. The values of the lower limit for $G_{l,i}^{k(c)}$, $\underline{G_{l,i}^{k(c)}}$, and upper limit for $G_{l,i}^{k(c)}$, $\overline{G_{l,i}^{k(c)}}$ are then set to:<br>$\underline{G_{l,i}^{k(c)}} = G_{l,i}^{k(c^{gl})}$<br>$\overline{G_{l,i}^{k(c)}} = G_{l,i}^{k(c^{gl})} + \text{th}$<br>if there exists a $c^{gu} \in \{1, ..., c + 1\}$ for which $-\text{th} \leq G_{i,c}^{udiff} < 0$, then the value of $G_{l,i}^{k(c)}$ cannot be returned to the global node without breaching the privacy constraint. The values of the lower limit for $G_{l,i}^{k(c)}$, $\underline{G_{l,i}^{k(c)}}$, and upper limit for $G_{l,i}^{k(c)}$, $\overline{G_{l,i}^{k(c)}}$ are then set to:<br>$\underline{G_{l,i}^{k(c)}} = G_{l,i}^{k(c^{gu})} - \text{th}$<br>$\overline{G_{l,i}^{k(c)}} = G_{l,i}^{k(c^{gu})}$ |
| 11.D: (IC) | Each data zone returns the value tuple $ivt_i = \langle \underline{L_{l,i}^{k(c)}}, \overline{L_{l,i}^{k(c)}}, \underline{G_{l,i}^{k(c)}}, \overline{G_{l,i}^{k(c)}} \rangle$ to the global calculating node |
| 12: (GC) | Global calculating node receives the value tuple set<br>$VTS = \{ivt_i, i \in \{1, ..., N\}\}$ |
| 13: (GC) | Global calculating node computes:<br>a lower limit on the total number of observations in $D_N$ for which<br>$$x_{l,i}^j < p^{k(c)}(x_{l,g}), \underline{L_{l,g}^{k(c)}} = \sum_{i=1}^{N} \underline{L_{l,i}^{k(c)}}$$<br>an upper limit on the total number of observations in $D_N$ for which<br>$$x_{l,i}^j < p^{k(c)}(x_{l,g}), \overline{L_{l,g}^{k(c)}} = \sum_{i=1}^{N} \overline{L_{l,i}^{k(c)}}$$<br>a lower limit on the total number of observations in $D_N$ for which<br>$$x_{l,i}^j > p^{k(c)}(x_{l,g}), \underline{G_{l,g}^{k(c)}} = \sum_{i=1}^{N} \underline{G_{l,i}^{k(c)}}$$<br>an upper limit on the total number of observations in $D_N$ for which<br>$$x_{l,i}^j > p^{k(c)}(x_{l,g}), \overline{G_{l,g}^{k(c)}} = \sum_{i=1}^{N} \overline{G_{l,i}^{k(c)}}$$ |
| 14: (GC) | The global calculating node then evaluates whether the percentile was found:<br>If $\overline{L_{l,g}^{k(c)}} \leq k \times n_g - 1$ and $\overline{G_{l,g}^{k(c)}} \leq n_g - k \times n_g$, then $p^{k(c)}(x_{l,g})$ is a $k^{th}$ percentile of variable $x_l$ in $D_N$. Terminate the algorithm and return $p^{k(c)}(x_{l,g})$.<br>Else if $\underline{G_{l,g}^{k(c)}} > n_g - k \times n_g$, then increment the iteration counter $c = c + 1$, set $p^{k(c)}(x_{l,g}) = p^{k(c-1)}(x_{l,g}) + 1$, $p^{k(c)}(x_{l,g}) = p^{k(c-1)}(x_{l,g})$, and return to step 7.<br>Else if $\underline{L_{l,g}^{k(c)}} > k \times n_g - 1$, then increment the iteration counter $c = c + 1$, set $p^{k(c)}(x_{l,g}) = p^{k(c-1)}(x_{l,g})$, $p^{k(c)}(x_{l,g}) = p^{k(c-1)}(x_{l,g}) - 1$, and return to step 7.<br>Else, then the kth percentile of variable $x_l$ in $D_N$ cannot be determined without violating the privacy constraints. Terminate the algorithm and return the range between the two percentile candidates closest to $p^{k(c)}(x_{l,g})$ as a result. |

The various details of the example computing algorithms described in Table 3 and Table 4 above are presented for purposes of illustration only, and should not be construed as limiting in any way. Alternative embodiments can utilize other arrangements of intermediate and global percentile computations.

In some embodiments, results of the local and global computations are utilized to populate an interactive user interface associated with the initiating node. Such an interactive user interface illustratively supports user selection of various parameters relating to distributed percentile computations.

For example, in embodiments in which the intermediate and global percentile computations comprise respective $k^{th}$ percentile computations, the value of k may be selectable by a user via the interactive user interface.

As another example, in embodiments in which the intermediate and global percentile computations comprise respective privacy-preserving percentile computations in which corresponding results are expressed as respective ranges of values, one or more ranges for the privacy-preserving percentile computations may be selectable by a user via the interactive user interface. Selection of such percentile reporting ranges illustratively provide a user with an ability to control a tradeoff between security and precision for the percentile computations results that are reported from one processing node associated with a given data zone to another processing node associated with another data zone.

An interactive user interface as disclosed herein can include an input form view providing a display screen in which a user can select from an input form the distributed percentile computation that the user wishes to execute along with the required parameters. For example, the user may be permitted to select percentile computation or privacy-preserving percentile computation. The user can also select the particular datasets and/or data zones on which the distributed percentile computation will be performed. Such information is illustratively provided to the interactive user interface from one or more backend processes that access metadata stored in one or more WWH catalog instances.

Examples of distributed percentile computation parameters that may be selectable via the input form view of the interactive user interface include the following:

1. A desired percentile value to compute, such as $50^{th}$ percentile, 10th percentile, etc. (i.e., the value k for $k^{th}$ percentile computations).

2. A precision value for the global computation result. For example, if set to 1 then the global percentile output will be accurate to 1 decimal point.

3. Security points for privacy-preserving percentile computations. For example, the security points may define a range for which local clusters cannot reveal information about the data. Selecting a particular number of security points in effect sets a range that a computed percentile falls within. Such an arrangement therefore implements a user-controlled tradeoff between revealing too much information about the computed percentile and obtaining a very accurate percentile value.

4. Number of slices: Number of slices for a visualized histogram in embodiments that include such a histogram.

5. Minimum and Maximum: Min and Max values of data to slice for the histogram, if any.

Additional details regarding histogram computations that may be used in illustrative embodiments are disclosed in U.S. patent application Ser. No. 15/827,663, filed Nov. 30, 2017 and entitled "Global Benchmarking and Statistical Analysis at Scale," which is incorporated by reference herein in its entirety.

After the user selects all of the appropriate parameters for the desired percentile computation in the input form view of the interactive user interface, an execution button or similar mechanism of the interactive user interface is actuated in order to run the desired percentile computation using the selected parameters. The execution can span a single iteration or multiple iterations.

During a given iteration, local percentile computations run in respective data zones, and the local results are then sent to a global computing node which performs a global percentile computation using the local results to produce a global result.

Some distributed percentile computations will require more than one iteration in order to calculate the global percentile among all of the data zones.

The interactive user interface also includes a results view providing a display screen in which a user can interact with visualizations of local and global percentile computation results. For example, in some embodiments, percentile computation results are displayed in the results view in the form of a bar chart. The bar chart illustratively displays the value of the percentile in each data zone as well as the global percentile value. For example, the global percentile result may be displayed as a dotted white vertical line on a histogram to visualize the percentile value within the histogram slices. The user can identify the exact percentile value by hovering on the chart. The user can also choose to view the output of any combination of the local data zones and global output. For example, the user can decide to view only the output of one local data zone or a combination of a local data zone and the global output. The output of the privacy-preserving percentile is the same as the percentile except that the global percentile output is in the form of a range of values within which the global percentile lies. This range may be represented by an area that has darker background on the bar chart.

The above-described interactive user interface features are presented by way of example only, and a wide variety of other types of interactive user interfaces can be associated with one or more of the distributed processing nodes in other embodiments.

The WWH framework described above can be used to perform local and global percentile computations, as well as other types of scalable recursive computations for a wide variety of different use cases.

In some embodiments, the datasets $d_i$ in $D_N = \{d_1, d_2, \ldots, d_N\}$ are hosted in multiple cloud instances, possibly but not necessarily from the same cloud vendor. Accordingly, the datasets may be located on respective different cloud instances from the same cloud vendor, such as Virtustream, Amazon Web Services (AWS), MS Azure, Google Cloud Platform, and SalesForce.com. Such clouds can illustratively include VMware-based clouds, soft stack based clouds, cluster-based clouds or other cloud implementations. Alternatively, the datasets can be located in respective clouds of different types from different cloud vendors. Hybrid arrangements are also possible, in which some of the datasets are located on one or more instances of the same type of cloud from the same cloud vendor and other ones of the datasets are located on respective distinct clouds from other cloud vendors.

The WWH framework can be used in the above-described multi-cloud scenarios. In these scenarios, the WWH Catalog is illustratively configured to create a meta-resource meta_resource$_{D_N}$ to identify and represent the set of datasets, $D_N = \{d_1, d_2, \ldots, d_N\}$, and the addresses in the particular cloud instances where respective ones of the datasets are located. For every instance of a cloud that hosts a dataset $d_i$, an entry is added to the WWH Catalog that indicates how all the physical data resources representing the dataset $d_i$ can be accessed. For example, a dataset $d_i$ may be spread across m different files. The dataset $d_i$ may be represented in the WWH Catalog hosting $d_i$ as a meta-resource meta_resource$_{d_i}$ that points to m different file names and locations within the instance of the cloud where it is hosted.

In order to make it easier to refer to WWH microservices, the WWH microservices can be implemented and registered as respective services in the cloud, if supported.

In some embodiments, the WWH framework can be ported to run on top of an Apache implementation of the Hadoop YARN framework supported by the cloud.

The WWH framework in the multi-cloud scenarios also allows implementation of an application comprising a set of iterations and a final calculation. Each iteration can itself be implemented as a WWH application, possibly utilizing one or more microservices that issue calls to the WWH framework, and that pass as parameters to the WWH framework the meta-resource meta_resource$_{D_n}$, the intermediate calculation for the corresponding iteration with all parameters, and the global computation for this iteration with all parameters.

In some embodiments, the datasets $d_i$ in $D_N=\{d_1, d_2, \ldots, d_N\}$ will be hosted in instances of the same cloud, such as an MS Azure cloud. Each of the datasets may be located in a different instance of the MS Azure cloud. Alternatively, all the datasets may be co-located in the same instance of the MS Azure cloud. Hybrid arrangements are possible, in which some of the datasets are dispersed across several instances of the MS Azure cloud while other datasets are co-located in the same instance of the MS Azure cloud.

It is important to note that the fact that at least some datasets may be co-located in the same instance of the cloud does not necessarily mean that they are physically located next to each other or that they will be analyzed in the same computing cluster, or sharing the same affiliated computing cluster. For example, these datasets may also be virtually isolated from one another within a given cloud instance, with each one being separately managed and accessible utilizing a different login.

The WWH framework can be used in the above-described MS Azure cloud scenarios. In these scenarios, the WWH Catalog is illustratively configured to create a meta-resource gbsas_meta_resource$_{D_N}$ to identify and represent the set of datasets, $D_N=\{d_1, d_2, \ldots, d_N\}$, and the addresses in the particular MS Azure cloud instances where respective ones of the datasets are located. Other functionality of the WWH framework and WWH Catalog in the MS Azure cloud scenarios is implemented in a manner similar to that previously described in the context of multi-cloud scenarios. Additionally or alternatively, in some embodiments involving one or more MS Azure cloud scenarios, the WWH framework can be ported to run on top of an MS HD Insight implementation.

Illustrative embodiments disclosed herein overcome numerous problems that would otherwise arise in a variety of situations in which the data required for analytics is scattered across many sites or clouds, potentially geographically dispersed around the world, where each location only has visibility to its own set of data, also referred to herein as a dataset. These sites or clouds may be viewed as illustrative examples of what are more generally referred to herein as data zones. Some embodiments assume that the datasets that each site or cloud collects are locked-in within its corresponding data zone, meaning that the dataset cannot move outside of specified boundaries of the site or cloud. There may be a variety of factors preventing the data from moving, including the data size that imposes severe bandwidth delays or huge transmission costs, privacy issues that prohibit the data from being shared, or GRC regulatory requirements that demand that the data remain in site.

The multi-cluster distributed data processing platforms and other arrangements of distributed processing nodes in illustrative embodiments disclosed herein provide significant advantages relative to conventional arrangements.

For example, as mentioned previously, some illustrative embodiments move the computation instead of moving the data and create an abstraction to distributed Big Data in order to overcome the drawbacks of conventional systems, providing significant advantages in terms of both performance and privacy, and related advantages such as the facilitation of GRC, as outlined in detail elsewhere herein.

Such advantages are present in some illustrative embodiments and need not be present in other embodiments.

It is to be appreciated that the particular types of system features and functionality as illustrated in the drawings and described above are exemplary only, and numerous other arrangements may be used in other embodiments.

For example, as indicated previously, illustrative embodiments can be implemented using a wide variety of different arrangements of distributed processing nodes, and should not be viewed as requiring WWH, YARN or Hadoop.

As indicated previously, the catalog in illustrative embodiments is model-driven, and may include a catalog resource data model as well as a catalog metadata model. Additional details of such models in illustrative embodiments will now be described.

An example of a model-driven architecture for distributed catalog services comprises a WWH layer that includes a core data model and one or more WWH extensions as well as other extensions. The core data model illustratively comprises a minimal set of classes that can be extended dynamically to reflect specific industries, domains or deployments. Additional levels of the WWH layer include a level comprising microservices for data model and catalog management, and a level comprising microservices for security, authorization and data lineage. Such an arrangement provides several levels of refinement that can be re-used and leveraged in different contexts. The model-driven architecture in this embodiment further comprises a data layer for persistency. The data layer illustratively includes an ArangoDB database, a Microsoft Azure database, an AWS database and an HDFS component. Additional or alternative model-driven architectures having different arrangements of layers, levels and components can be used in other embodiments. For example, illustrative embodiments of a distributed catalog service as disclosed herein are not limited to use with a WWH platform or any other particular distributed data processing system configuration.

An example of a layered extensible data model in an illustrative embodiment comprises a plurality of layers including a core data model layer and a WWH extensions layer. The layered extensible data model further comprises additional extension layers including an industry extensions layer and a customer extensions layer. The core data model layer comprises a plurality of core classes. A subset of the core classes of the core data model layer are extended by respective WWH classes of the WWH extensions layer.

Similarly, other core classes of the core data model layer are extended by respective classes of the industry extensions layer, and still other core classes of the core data model layer are extended for respective customers of the customer extensions layer. The industry extensions in this embodiment are illustratively for the Life Sciences industry, but could alternatively be for any other designated industry.

The microservices referred to in conjunction with the above-described architecture can include, for example, microservices to extend the layered extensible data model, microservices to create instances within the layered extensible data model, and microservices to query the layered extensible data model.

In an example layered extensible data model, the model includes elements for catalog, domain, resource, metadata and constraint, and an abstract class entity is associated with a resource and is a member of the catalog. The catalog is a member of the domain.

A resource may be any "thing" that is worth knowing about and accessing within a given context. For example, a resource in an example model may be a "hard" resource that represents a physical entity in the world, such as a data file or a geographical region denoted by a data zone. The resource may be a meta-resource that represents a set of resources that share some common characteristics, where some of these characteristics have been abstracted in the form of metadata. Resources in a meta-resource can be geographically distributed. For example, resources in a meta-resource can include a set of files distributed around the world that contain designated types of clinical trial data, or a set of all the resources, both hard resources and meta-resources, that can be accessed from within a given data zone.

Metadata in an example model may be "hard" metadata or "soft" metadata. Hard metadata illustratively represents a characteristic of a definitive condition related to how the resource is built or configured, or that the resource must comply with. For example, hard metadata can include a set of vendors that can legally sell within a data zone, or a set of regulations that a data file must comply with and that remains with the data file regardless of where the file resides or how its content changes. Soft metadata represents a characteristic that reflects a current condition related to the current state of the resource or that the resource possesses, but that may change. Soft metadata can be observed or may be the result of analytics applied to the resource itself or learned about the resource through cognitive methods, such as logging and inferring its usage pattern. For example, soft metadata can include the presence of a particular type of content in a file, or a set of credentials that give permission to access one or more designated entities within a data zone.

The meta-resource referred to above is a recursive representation. For example, a given meta-resource can be formed of other resources, which can be hard resources or other meta-resources. Accordingly, resources in a meta-resource can be meta-resources themselves. A meta-resource can have a "references" relationship with other resources that may or may not be co-located.

Resource and metadata elements of a data model illustratively exhibit strong-typed relationships. For example, a resource can have metadata associated with it, represented by the relationship "has" in a portion of the data model. This portion of the data model is considered strong typed in the sense that only hard resources can have hard metadata and only meta-resources can have soft metadata.

Another example of strong typing between a resource and metadata is as follows. In this example, in order to associate soft metadata to a hard resource, the hard resource is first encapsulated into ("ReferencedBy") a meta-resource and then soft metadata is associated with the meta-resource. The metadata can be associated with a physical resource such as a file through the use of a microservice that traverses the relationship in a graph representation of the data model. For example, such a microservice can be denoted wwh.catalog.traverse (file::f1, <ReferencedBy, Has>).

An example data model can also relate one or more constraints to metadata. Such a constraint can be used to aggregate a set of properties, such that the set of properties can then be used to "qualify" resources, thereby delineating and forming a subset of resources that comply with the constraint. For example, a constraint can comprise a set of properties that includes the presence of the metadata tag "pancreas" in the context of a set of files relating to "organs." A meta-resource that has been qualified by this constraint will contain only those files that include data having this particular metadata tag.

Other portions of a data model can define the relationship between a catalog and a domain. A catalog in this embodiment may comprise a graph representing a collection of resources. Such a catalog is illustratively assumed to be a recursive concept and therefore a given catalog may comprise other catalogs. As a more particular example, a given catalog may comprise a set of all data files residing within a single HDFS, where each file has been enriched with a set of metadata properties, such as a collection of tags that identify and characterize the content of the files.

Resources may or may not be co-located in the same data zone as the instance of the catalog. For example, local resources relative to a given WWH catalog instance are assumed to comprise those resources located within the same data zone as the WWH catalog instance. Remote resources relative to the given WWH catalog instance are those resources located outside of the data zone of the WWH catalog instance.

A domain may comprise a collection of catalogs that respond to the same set of microservices. For example, a domain may represent a set of catalogs that can communicate with each other. The domain illustratively represents an abstraction where different sets of catalogs can form different domains, restricting visibility and access to associated catalog services. For example, at a worldwide scale there could be a public domain, comprising a set of all catalogs that point to various types of open data regardless of its location in the world, enterprise private domains each comprising a set of catalogs pointing to private data of an enterprise, and government private domains, each comprising a set of catalogs pointing to private data of a governmental entity.

A given catalog is typically associated with a data zone. Both are representative of an autonomous enclosure of "things" capable of interacting with the world through a set of microservices. A data zone may have the additional constraint that some of the data and other "things" within a given data zone may not be able to move outside of that data zone. Outside entities can request and call upon services offered by the data zone, and such services will ultimately have access and visibility to these "things" locally, but the "things" in of themselves will not be able to move outside the perimeters of the data zone. A catalog may maintain additional information that may not be required by a corresponding data zone and may offer services that are beyond the scope of the data zone.

It is to be appreciated that the particular models described above are presented by way of example only, and numerous alternative arrangements for implementing layered extensible data models can be used in other embodiments.

In some embodiments, a user initiates configuration of a catalog by accessing a resource manager of the data zone. The resource manager accesses a WWH Application Master, which contacts a WWH Catalog Master. The WWH Catalog Master configures a WWH catalog file referencing resources from HDFS, a metadata management system, and other systems.

The WWH catalog file illustratively supports an in-memory graph representation of the content in the catalog, representing resources, properties and constraints. Environment variables can be used to determine how to automatically start the catalog when the component is accessed for the first time.

Some implementations of the catalog utilize a graph-based database such as ArangoDB as a persistent data storage, although a wide variety of other types of persistent data storage including Neo4j can be used. Additionally or alternatively, some implementations of the catalog are configured to interact with a metadata management system such as iRODS. Some implementations of the catalog integrate with cloud instances, such as Microsoft Azure. Numerous alternative arrangements using other types of persistent data storage or metadata management systems are possible.

The catalog in some embodiments is extensible, flexible, strong typed, and at scale, and configured for implementation on top of existing persistency and visualization technologies, and can be readily integrated with a wide variety of different data sources and data targets.

Examples of services that can be implemented in illustrative embodiments include one or more of the following:

1. Catalog Integration and Population Services: a combination of consulting services and service delivery practices, where the consulting services create processes and procedures for the discovery of data hubs and data sources across organizations, and the service delivery practices create connectors to automate the process of integrating the data sources into the catalog framework and to automate the process of metadata collection and ingestion into the catalog. For example, some embodiments can be configured to facilitate the discovery of data sources within an organization and the identification of additional data sources that should be installed, to implement connectors and ingestion mechanisms to populate the metadata into the catalog, to add microservices that extend some of the catalog services to include aspects and requirements that are specific to customers, such as adding additional security checks implemented by a hospital, and to help customers develop analytics applications on top of the WWH platform, once all the data distributed across the organization can be tracked and the orchestration of distributed and parallel computations can be automated.

2. Catalog Services as Services Embedded in Other Platforms: PaaS and cloud orchestration and management frameworks can incorporate catalog services as part of their existing offerings. For example, Pivotal Cloud Foundry (PCF), VMware, and Virtustream can not only offer catalog services in of themselves, but also build additional services on top of the services. PCF can, for instance, use catalog services to implement elastic cluster services, where a version of pcfpush pushes code to clusters where the data is located. Such a feature would allow PCF computations to benefit from the principle of data locality, and also offer orchestration of services across disparate locations.

3. Orchestration of Computation across Data Lakes: catalog services provide a mechanism to track data in data lakes and, together with the WWH platform, can provide a mechanism to automate distributed computations.

Illustrative embodiments provide distributed catalog service functionality, including functionality for adding, in a strong typed manner, additional categories of resources to be managed, for adding microservices that are extensible to these new categories, as they are added dynamically, and for visualizing the contents of the catalog, especially for the administrators of content, and for enabling governance of the data itself.

Illustrative embodiments provide worldwide scalability and resilience for efficient tracking of "things" by catalog instances, allowing the catalog instances to register with domains and to publish their metadata capabilities to other catalog instances.

Illustrative embodiments utilize abstractions based on metadata and meta-resources to model and represent "things." These embodiments implement a model-driven approach based on metadata and meta-resources, while also providing sets of microservices to dynamically extend, traverse, and access the data model itself, and sets of microservices for access to and management of associated meta-resources.

For example, some embodiments are configured to publish the data model, allowing the addition of extensions to the data model. Additional microservices can be implemented, added to the catalog and offered as part of a distributed catalog service.

Some embodiments are configured to minimize the amount of data exchanged between collaborating nodes, and to minimize the number of nodes a given node needs to know and exchange information with in order for its "things" to become accessible by any other node in the network.

A given such embodiment can be configured with an "open" architecture interface where catalog data can be imported from existing sources of data, including metadata management systems. Additionally or alternatively, one or more embodiments can implement a security-centric approach in which directly connected nodes communicate using encrypted data or other types of secure connections.

Some embodiments implement a lazy population mode of operation in which the catalog data is populated on demand. Alternative modes include eager population modes and various hybrid lazy-eager modes.

In some embodiments, data models based on metadata and meta-resources can be represented and traversed as a graph. Such a graph can be stored in main memory of one or more computing nodes, possibly leveraging existing libraries. The graph representation of a data model can readily scale by being distributed across multiple computing nodes within one or more computing clusters, using Spark Graph for example. The graph representation can be persisted using graph-oriented databases, such as ArangoDB. Use of graph representations facilitates the implementation of microservices as such microservices can be accessed using graph traversal functions.

Illustrative embodiments can be configured to implement dynamic modeling, with a dynamically extensible and strong typed core data model that captures metadata and meta-resources, and which can be readily extended to include additional properties that are relevant in certain contexts, such as certain industries and certain taxonomies. Microservices can access, in real-time, the definition of the model, including core and extended aspects, and define services that are dependent on that model definition.

Some embodiments are configured to implement a set of microservices to traverse the data model, decoupling the use of the services from the particular way the data model is implemented, and allowing for the implementation of the data model to vary across different architectures, while still offering the same or a similar set of services. Other microservices can be built on top of the core microservices, without requiring these new services to be exposed to how the catalog was implemented.

Various aspects of illustrative embodiments, such as decoupling of functionality, strong decomposition of functions into microservices, a model-driven approach and the overall layout of architectural components, are applicable to the usage of the catalog for tracking any "thing" at scale and in an extensible manner.

It is to be appreciated that the particular types of system features and functionality as illustrated in the drawings and described above are exemplary only, and numerous other arrangements may be used in other embodiments.

For example, as indicated previously, illustrative embodiments can be implemented using a wide variety of different arrangements of distributed processing nodes, and should not be viewed as requiring WWH, YARN or Hadoop.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as WWH nodes 102 and YARN clusters 104, or portions thereof, can be implemented as respective tenants of such a multi-tenant environment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system 100, although in other embodiments a given tenant can have multiple containers. The containers may be utilized to implement a variety of different types of functionality within the system 100. For example, containers can be used to implement respective cloud compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of a given YARN cluster or associated data processing node in a particular embodiment are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, distributed data processing platforms, application frameworks, processing nodes, local and remote data resources and other components. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    identifying a plurality of datasets on which a distributed percentile computation is to be performed, the distributed percentile computation comprising at least one global percentile computation and two or more intermediate percentile computations;
    locating respective ones of the plurality of datasets in a plurality of data zones, each of the plurality of datasets being locally accessible within at least one of the plurality of data zones by at least one of a plurality of distributed processing nodes associated with the at least one data zone;
    generating a meta-resource identifying (i) the plurality of datasets, (ii) addresses of respective locations of the plurality of datasets in the plurality of data zones, and (iii) respective ones of the plurality of distributed processing nodes having local access to the plurality of datasets in the plurality of data zones;
    providing the meta-resource to the plurality of distributed processing nodes to initiate the intermediate percentile computations for respective ones of the plurality of datasets;
    receiving results of the intermediate percentile computations performed on respective ones of the plurality of datasets in respective ones of the plurality of distributed processing nodes;
    performing the at least one global percentile computation based at least in part on the results of the intermediate percentile computations, the at least one global percentile computation utilizing data that is locally accessible in at least two distinct ones of the plurality of data zones; and
    utilizing results of the intermediate and global percentile computations to populate an interactive user interface associated with at least a given one of the distributed processing nodes;
    wherein the intermediate and global percentile computations comprise respective privacy-preserving percentile computations in which corresponding results are expressed as respective ranges of values; and
    wherein the method is performed by at least one processing device comprising a processor coupled to a memory.

2. The method of claim 1 further comprising:
    repeating at least a subset of the receiving, performing and utilizing in each of a plurality of iterations; and
    passing a result of the global percentile computation in a first one of the iterations as an input to the intermediate percentile computations in a second one of the iterations.

3. The method of claim 1 wherein the intermediate percentile computations are initiated by an initiating distributed processing node.

4. The method of claim 3 wherein the initiating distributed processing node is configured to perform the global percentile computation.

5. The method of claim 1 wherein the global percentile computation is performed at a same one of the distributed processing nodes that performs one of the intermediate percentile computations.

6. The method of claim 1 wherein the intermediate and global percentile computations comprise respective $k^{th}$ percentile computations for which a value of k is selectable by a user via the interactive user interface.

7. The method of claim 6 wherein k=50 and the intermediate and global $k^{th}$ percentile computations comprise respective median computations.

8. The method of claim 1 wherein one or more ranges for the privacy-preserving percentile computations are selectable by a user via the interactive user interface.

9. The method of claim 1 wherein receiving results of intermediate percentile computations comprises receiving a total number of observations in each of the datasets and performing at least one global percentile computation comprises processing the total number of observations in each of the datasets to determine a total number of observations in all of the datasets.

10. The method of claim 1 wherein observations in each of the datasets are subject to pre-processing by multiplying all data points by $10^{-z}$ and rounding the multiplied data points to a nearest integer prior to generating intermediate results, and a corresponding global result is subject to post-processing by dividing the global result by $10^{-z}$, so as to provide an effective computation precision of z decimal points.

11. The method of claim 1 wherein receiving results of intermediate percentile computations comprises receiving percentile computations for respective ones of the datasets and performing at least one global percentile computation comprises processing the percentile computations for respective ones of the datasets to determine upper and lower limits for a percentile range, identifying a percentile candidate between the upper and lower limits for a given iteration, and sending the percentile candidate to at least a subset of the distributed processing nodes.

12. The method of claim 1 wherein receiving results of intermediate percentile computations comprises receiving less than and greater than counts for respective ones of the datasets relative to a percentile candidate and performing at least one global percentile computation comprises determining if the percentile candidate is correct based on the received less than and greater than counts, wherein if the percentile candidate is not correct, performing at least one global percentile computation further comprises incrementing an iteration count, identifying a new percentile candidate, and sending the new percentile candidate to at least a subset of the distributed processing nodes.

13. The method of claim 1 wherein the intermediate percentile computations comprise confirming that less than and greater than counts for respective ones of the datasets relative to an identified percentile candidate satisfy a designated privacy-preserving constraint prior to transmitting the less than and greater than counts outside of their respective data zones and further wherein if the less than and greater than counts do not satisfy the designated privacy-preserving constraint, corresponding upper and lower limits are determined and transmitted for each of the less than and greater than counts outside of their respective data zones in place of the actual less than and greater than counts.

14. A computer program product comprising a non-transitory processor-readable storage medium having stored therein program code of one or more software programs, wherein the program code when executed by at least one processing device causes said at least one processing device:
    to identify a plurality of datasets on which a distributed percentile computation is to be performed, the distributed percentile computation comprising at least one global percentile computation and two or more intermediate percentile computations;
    to locate respective ones of the plurality of datasets in a plurality of data zones, each of the plurality of datasets being locally accessible within at least one of the plurality of data zones by at least one of a plurality of distributed processing nodes associated with the at least one data zone;

to generate a meta-resource identifying (i) the plurality of datasets, (ii) addresses of respective locations of the plurality of datasets in the plurality of data zones, and (iii) respective ones of the plurality of distributed processing nodes having local access to the plurality of datasets in the plurality of data zones;

to provide the meta-resource to the plurality of distributed processing nodes to initiate the intermediate percentile computations for respective ones of the plurality of datasets;

to receive results of the intermediate percentile computations performed on respective ones of the plurality of datasets in respective ones of the plurality of distributed processing nodes;

to perform the at least one global percentile computation based at least in part on the results of the intermediate percentile computations, the at least one global percentile computation utilizing data that is locally accessible in at least two distinct ones of the plurality of data zones; and to utilize results of the intermediate and global percentile computations to populate an interactive user interface associated with at least a given one of the distributed processing nodes;

wherein the intermediate and global percentile computations comprise respective privacy-preserving percentile computations in which corresponding results are expressed as respective ranges of values.

15. The computer program product of claim 14 wherein at least a subset of the receiving, performing and utilizing are repeated in each of a plurality of iterations and wherein a result of the global percentile computation in a first one of the iterations is passed as an input to the intermediate percentile computations in a second one of the iterations.

16. The computer program product of claim 14 wherein the intermediate and global percentile computations comprise respective $k^{th}$ percentile computations for which a value of k is selectable by a user via the interactive user interface.

17. An apparatus comprising:
at least one processing device comprising a processor coupled to a memory;
wherein said at least one processing device is configured:
to identify a plurality of datasets on which a distributed percentile computation is to be performed, the distributed percentile computation comprising at least one global percentile computation and two or more intermediate percentile computations;

to locate respective ones of the plurality of datasets in a plurality of data zones, each of the plurality of datasets being locally accessible within at least one of the plurality of data zones by at least one of a plurality of distributed processing nodes associated with the at least one data zone;

to generate a meta-resource identifying (i) the plurality of datasets, (ii) addresses of respective locations of the plurality of datasets in the plurality of data zones, and (iii) respective ones of the plurality of distributed processing nodes having local access to the plurality of datasets in the plurality of data zones;

to provide the meta-resource to the plurality of distributed processing nodes to initiate the intermediate percentile computations for respective ones of the plurality of datasets;

to receive results of the intermediate percentile computations performed on respective ones of the plurality of datasets in respective ones of the plurality of distributed processing nodes;

to perform the at least one global percentile computation based at least in part on the results of the intermediate percentile computations, the at least one global percentile computation utilizing data that is locally accessible in at least two distinct ones of the plurality of data zones; and to utilize results of the intermediate and global percentile computations to populate an interactive user interface associated with at least a given one of the distributed processing nodes;

wherein the intermediate and global percentile computations comprise respective privacy-preserving percentile computations in which corresponding results are expressed as respective ranges of values.

18. The apparatus of claim 17 wherein at least a subset of the receiving, performing and utilizing are repeated in each of a plurality of iterations and wherein a result of the global percentile computation in a first one of the iterations is passed as an input to the intermediate percentile computations in a second one of the iterations.

19. The apparatus of claim 17 wherein the intermediate and global percentile computations comprise respective $k^{th}$ percentile computations for which a value of k is selectable by a user via the interactive user interface.

20. The apparatus of claim 17 wherein one or more ranges for the privacy-preserving percentile computations are selectable by a user via the interactive user interface.

* * * * *